United States Patent
Hattori et al.

(10) Patent No.: US 10,091,396 B2
(45) Date of Patent: Oct. 2, 2018

(54) INFORMATION ANALYSIS SYSTEM AND INFORMATION ANALYSIS METHOD

(71) Applicants: Haruhiko Hattori, Tokyo (JP); Tetsuya Shinozaki, Tokyo (JP); Koji Muro, Saitama (JP)

(72) Inventors: Haruhiko Hattori, Tokyo (JP); Tetsuya Shinozaki, Tokyo (JP); Koji Muro, Saitama (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/860,012

(22) Filed: Jan. 2, 2018

(65) Prior Publication Data
US 2018/0205851 A1    Jul. 19, 2018

(30) Foreign Application Priority Data

Jan. 19, 2017 (JP) ................. 2017-007445

(51) Int. Cl.
| | |
|---|---|
| G06K 15/00 | (2006.01) |
| H04N 1/44 | (2006.01) |
| H04N 1/00 | (2006.01) |
| H04N 1/387 | (2006.01) |

(52) U.S. Cl.
CPC ......... *H04N 1/4426* (2013.01); *H04N 1/0083* (2013.01); *H04N 1/00331* (2013.01); *H04N 1/00469* (2013.01); *H04N 1/00477* (2013.01); *H04N 1/387* (2013.01); *H04N 1/4413* (2013.01)

(58) Field of Classification Search
USPC .............. 345/594–619, 214, 1.1–2.2, 10, 11, 345/22–26; 358/1.1–3.29, 1.11–1.18, 358/504, 505; 382/135–140, 162–167, 382/181, 317–321, 218–231, 189
See application file for complete search history.

(56) References Cited

U.S. PATENT DOCUMENTS

| | | | |
|---|---|---|---|
| 7,069,240 B2 | 6/2006 | Spero et al. | |
| 8,285,604 B1* | 10/2012 | Trandal | G06Q 30/02 |
| | | | 705/26.7 |
| 2004/0257611 A1* | 12/2004 | Kito | H04N 1/00132 |
| | | | 358/1.15 |

(Continued)

FOREIGN PATENT DOCUMENTS

| | | |
|---|---|---|
| JP | 2006-511896 | 4/2006 |
| JP | 2013-041540 | 2/2013 |
| JP | 2015-165395 | 9/2015 |

*Primary Examiner* — Marcellus Augustin
(74) *Attorney, Agent, or Firm* — IPUSA, PLLC

(57) ABSTRACT

A reading device scans receipts, and transmits image data of the receipts to an analyzer. The analyzer receives the image data, extracts images of the receipts from the image data; counts a number of the images; executes a character recognition process to obtain text data; transmits, to the display device, a number of all of the images, and sequentially transmits, to the display device, the images for which the character recognition process has been completed, together with the text data. The display device sequentially displays each image, together with the text data; and upon detecting that the number of all of the images matches a number of the sequentially transmitted images, receives a command to report to the analyzer that the reception the images is completed.

11 Claims, 39 Drawing Sheets

(56) References Cited

U.S. PATENT DOCUMENTS

2007/0084917 A1* 4/2007 Fajkowski ............ G06Q 20/387
   235/383
2013/0342854 A1* 12/2013 Takamoto .......... G06K 15/1822
   358/1.2
2015/0248391 A1 9/2015 Watanabe

* cited by examiner

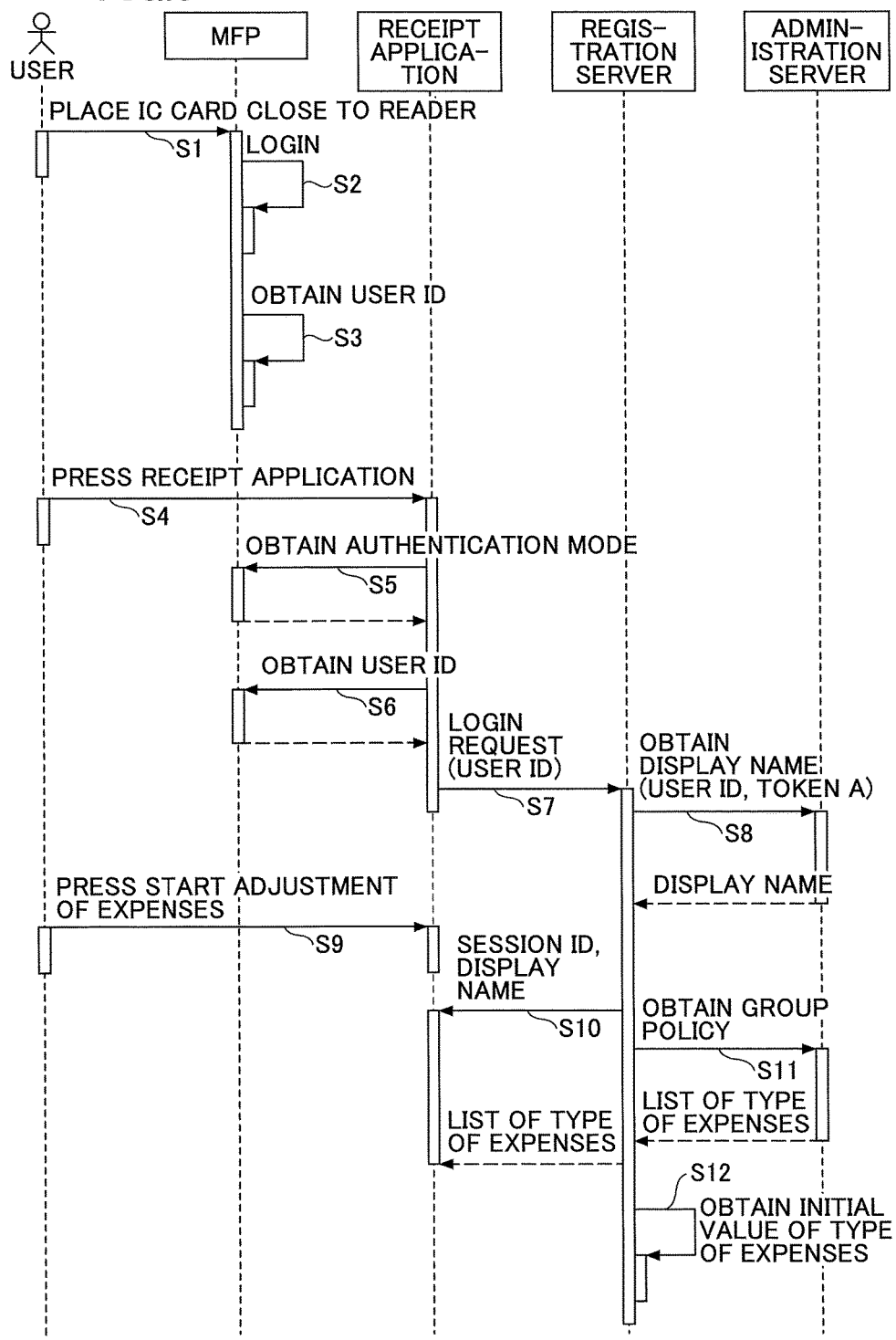

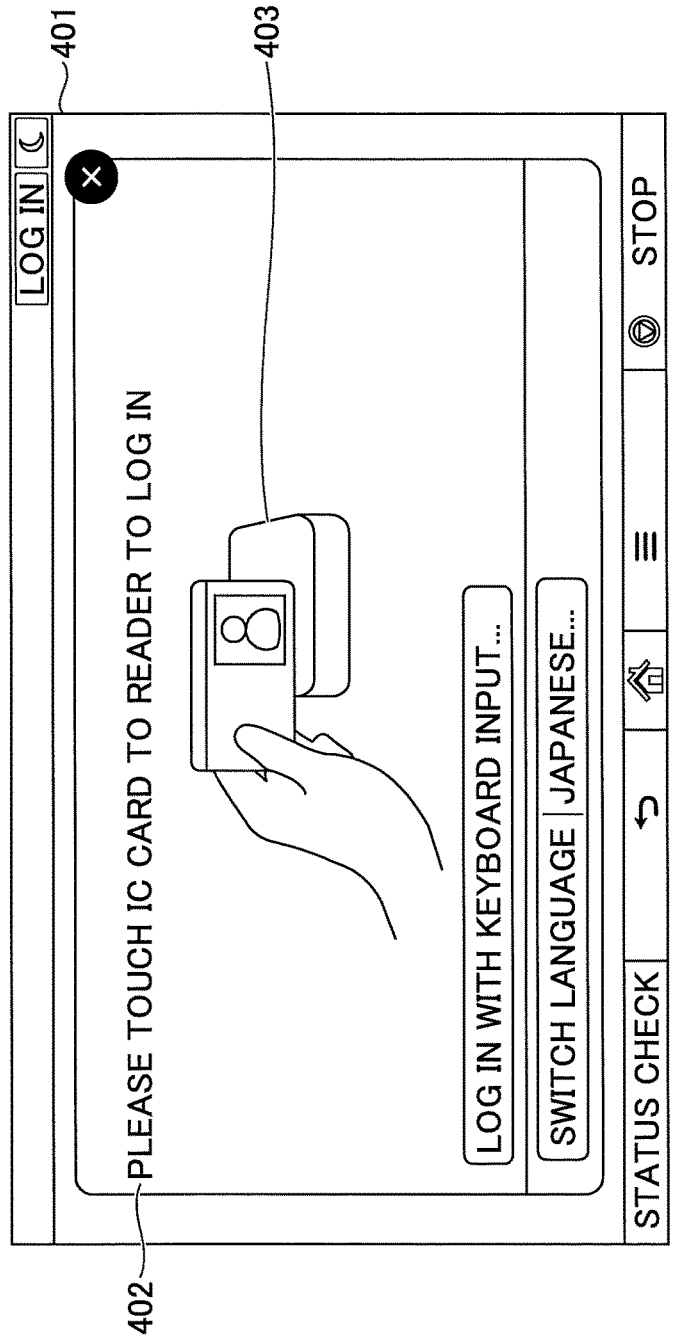

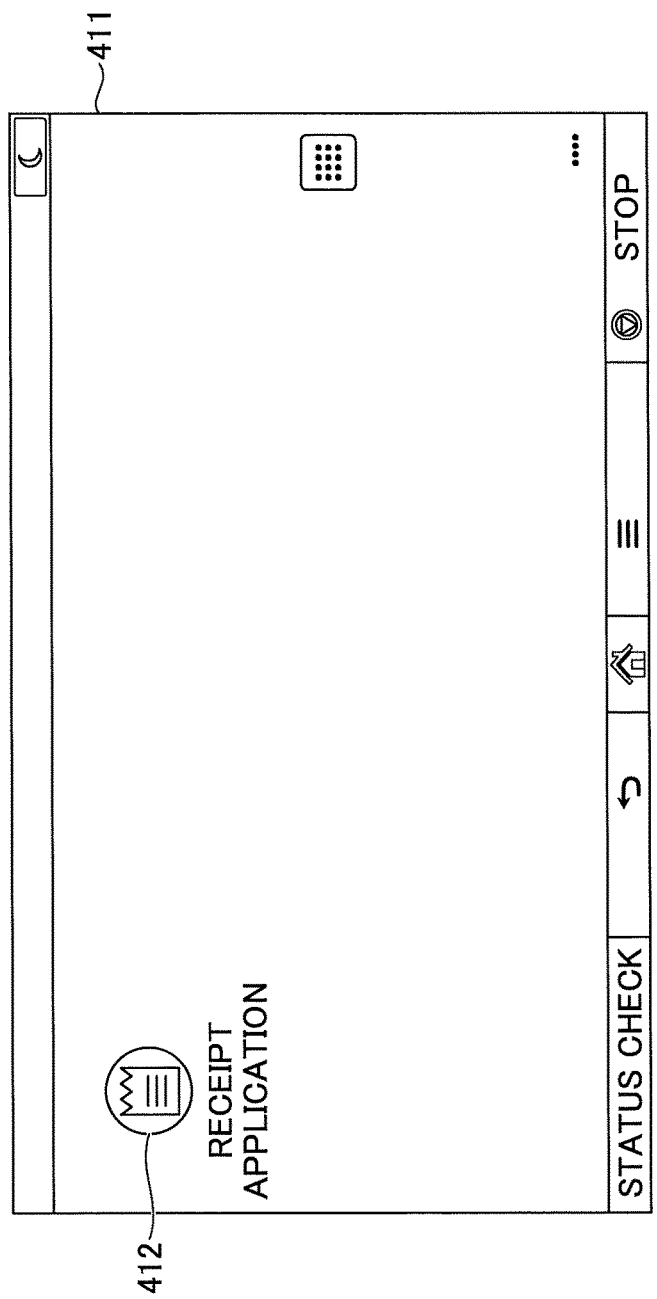

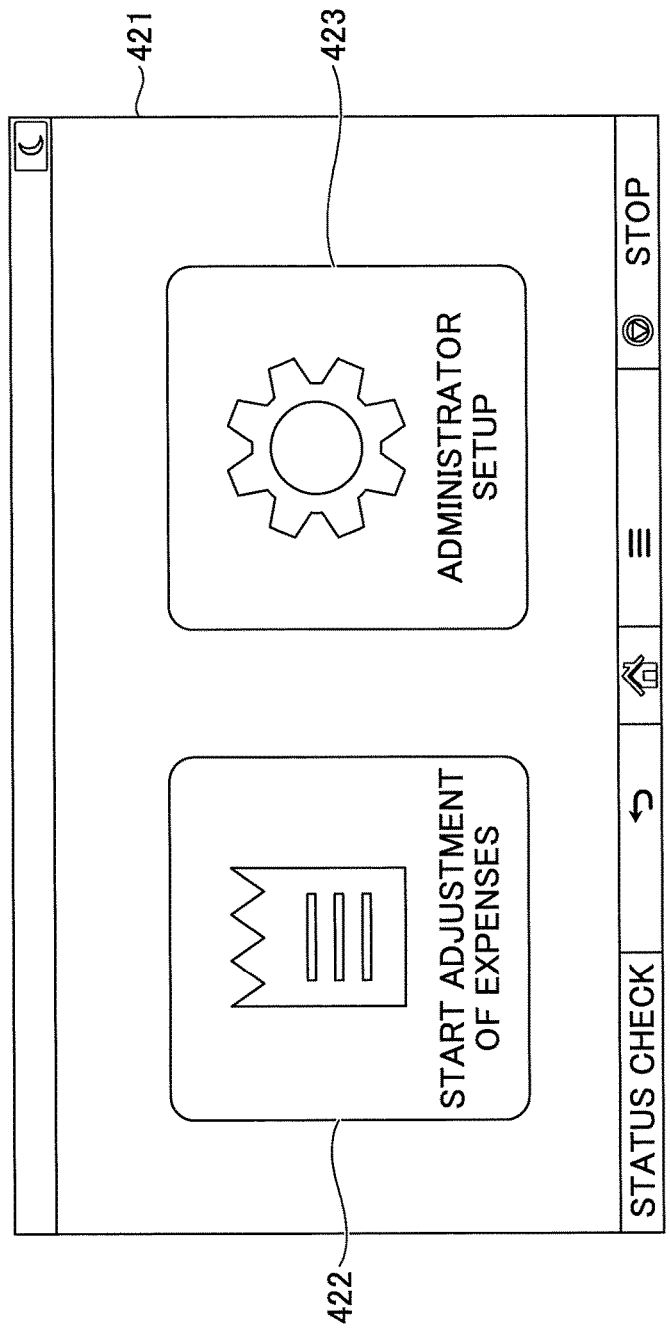

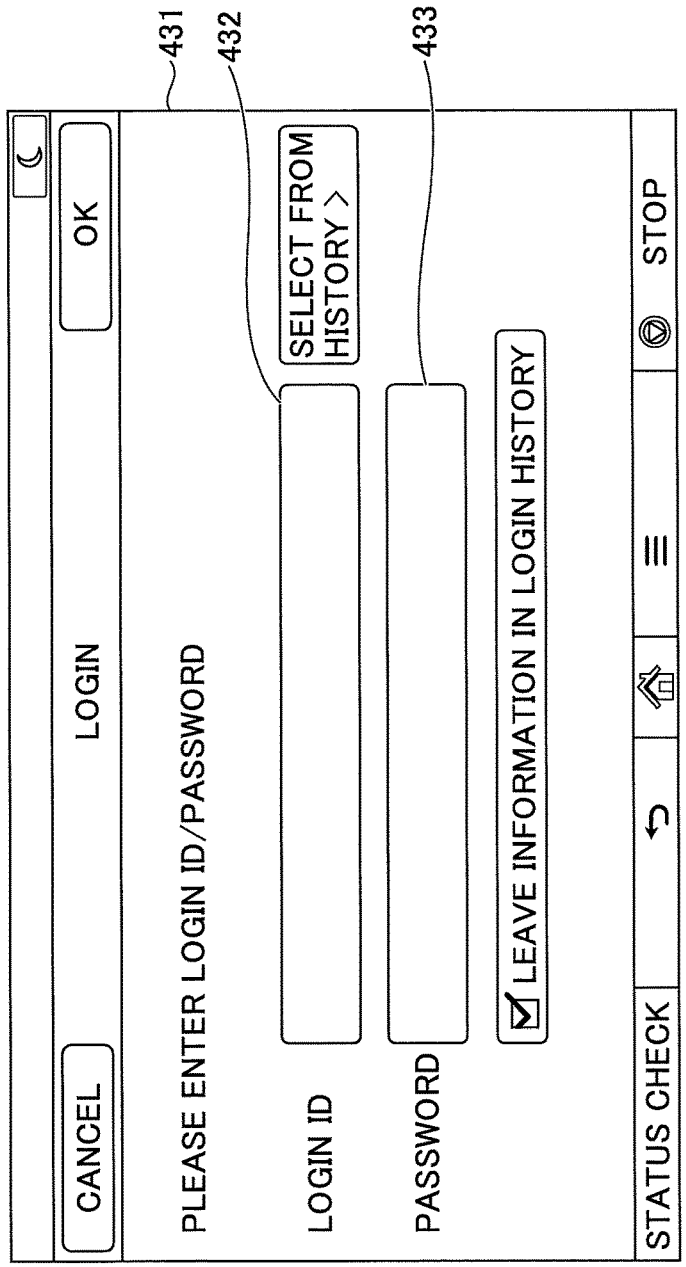

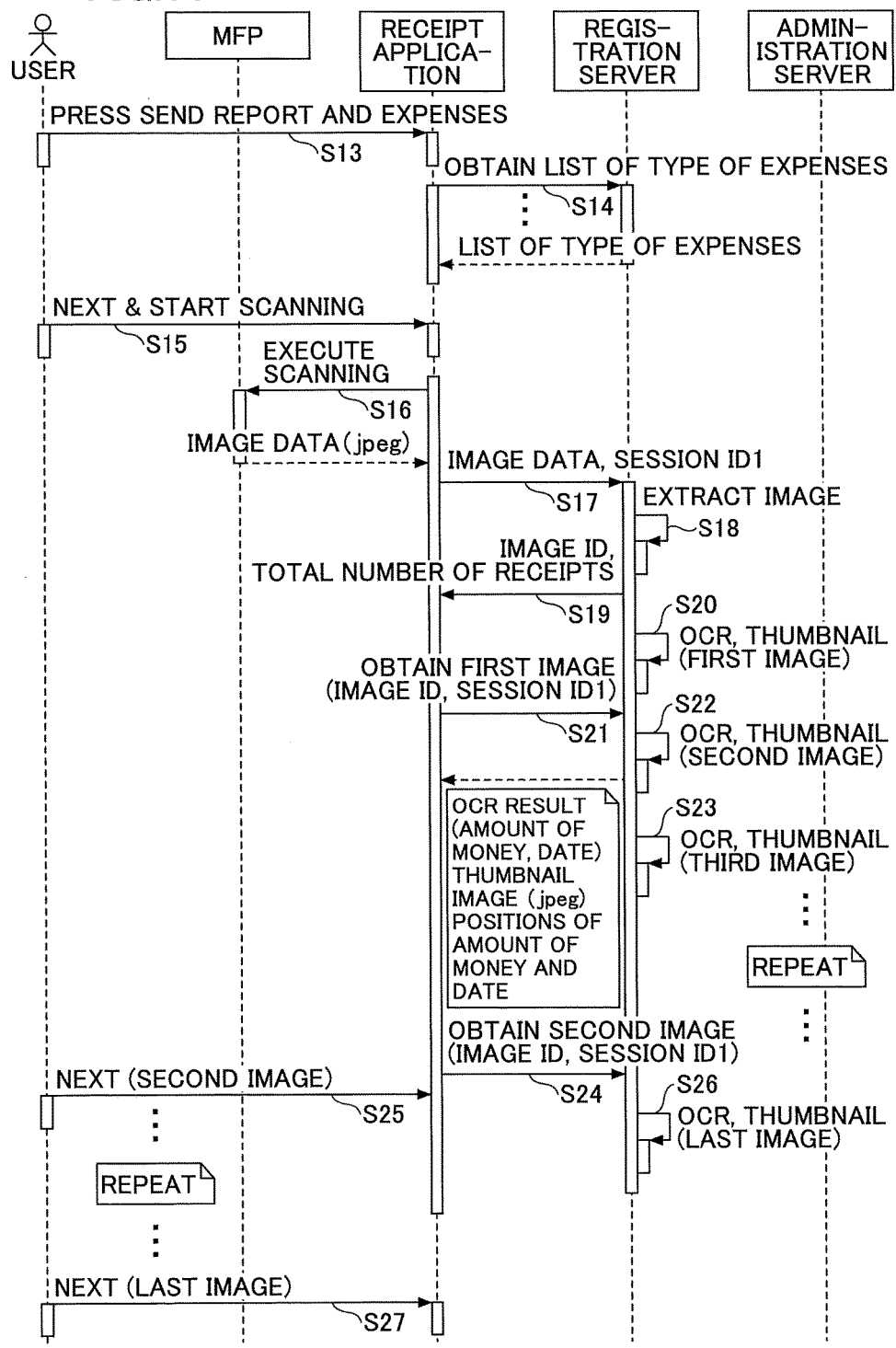

FIG.13A

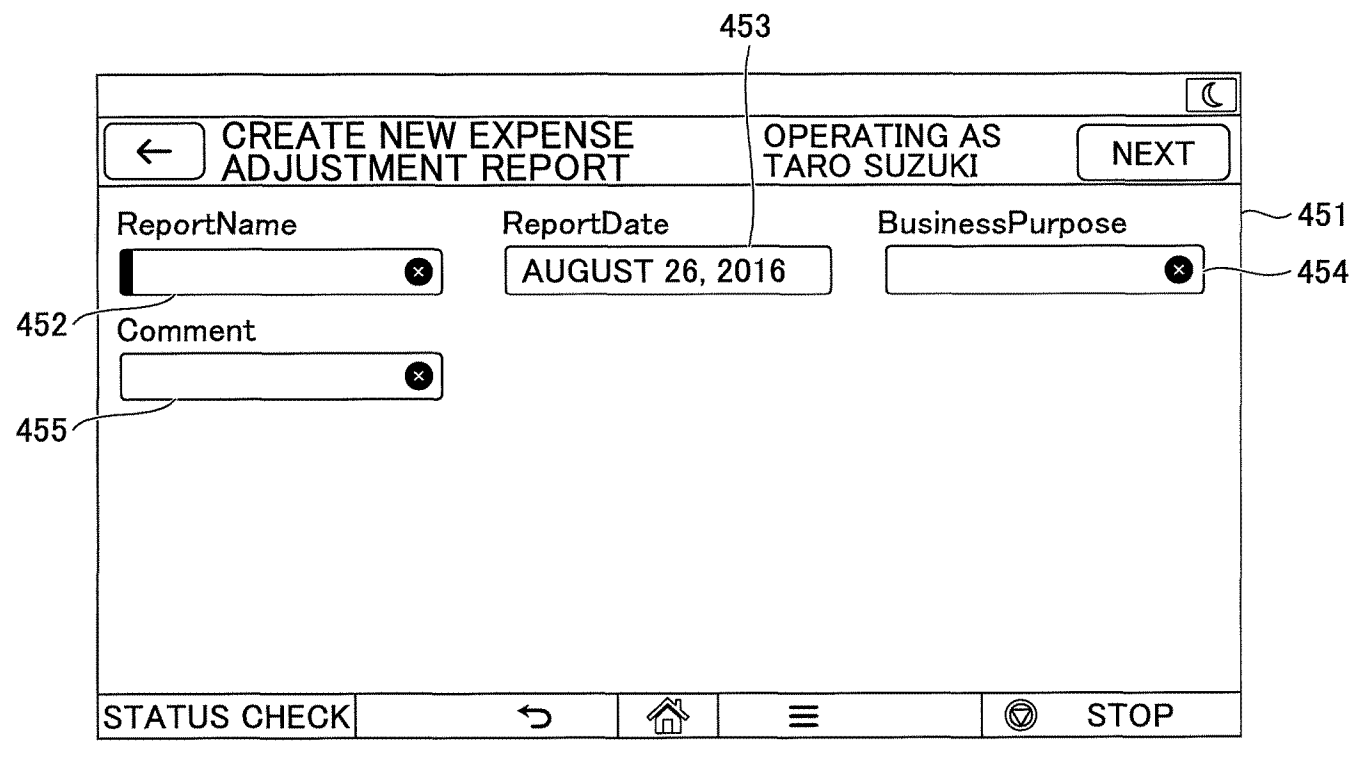

CREATE NEW EXPENSE ADJUSTMENT REPORT — 451
← 
ReportName — 452
ReportDate
AUGUST 26, 2016 — 453
OPERATING AS TARO SUZUKI
BusinessPurpose — 454
NEXT
Comment — 455
STATUS CHECK    STOP

FIG.15B

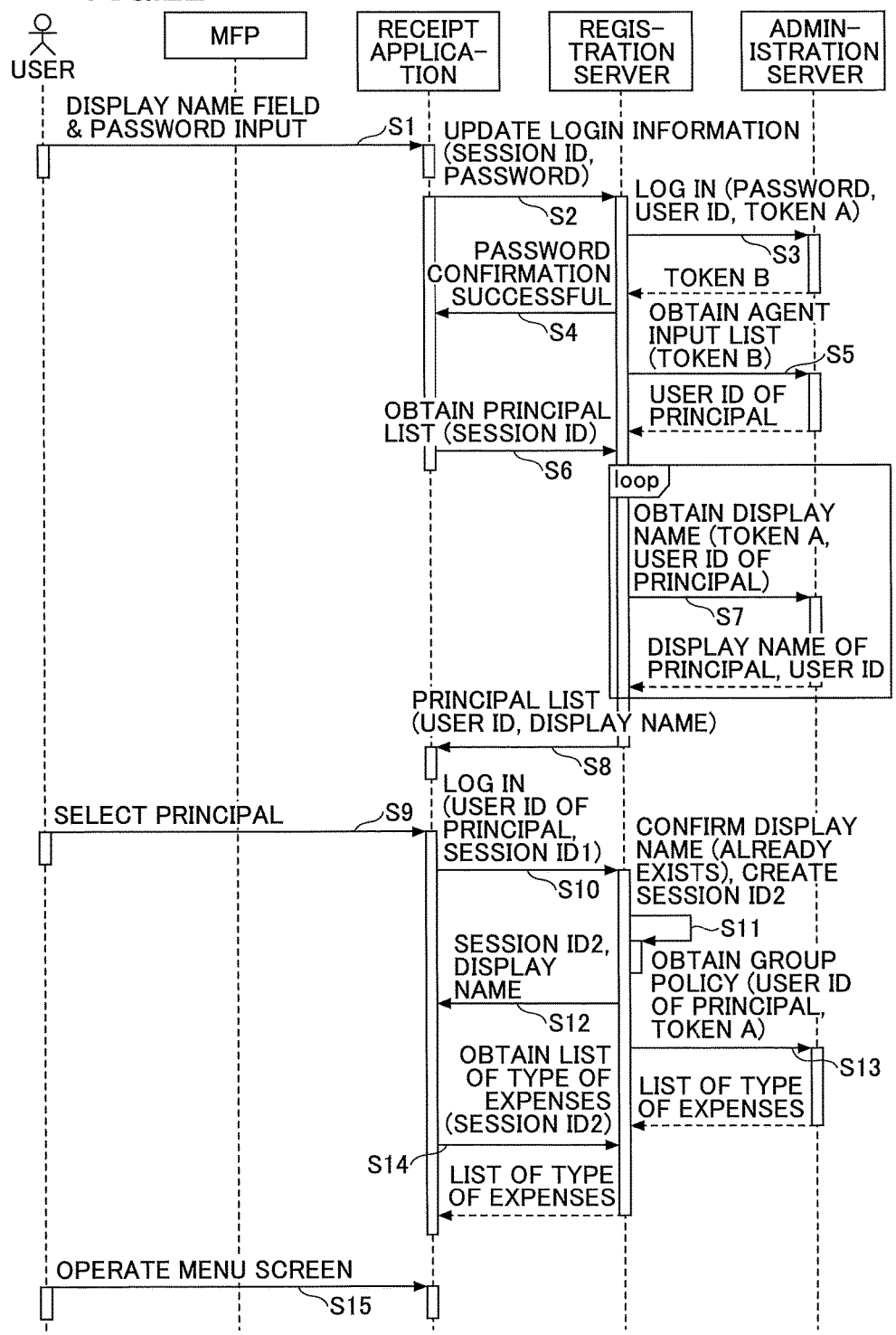

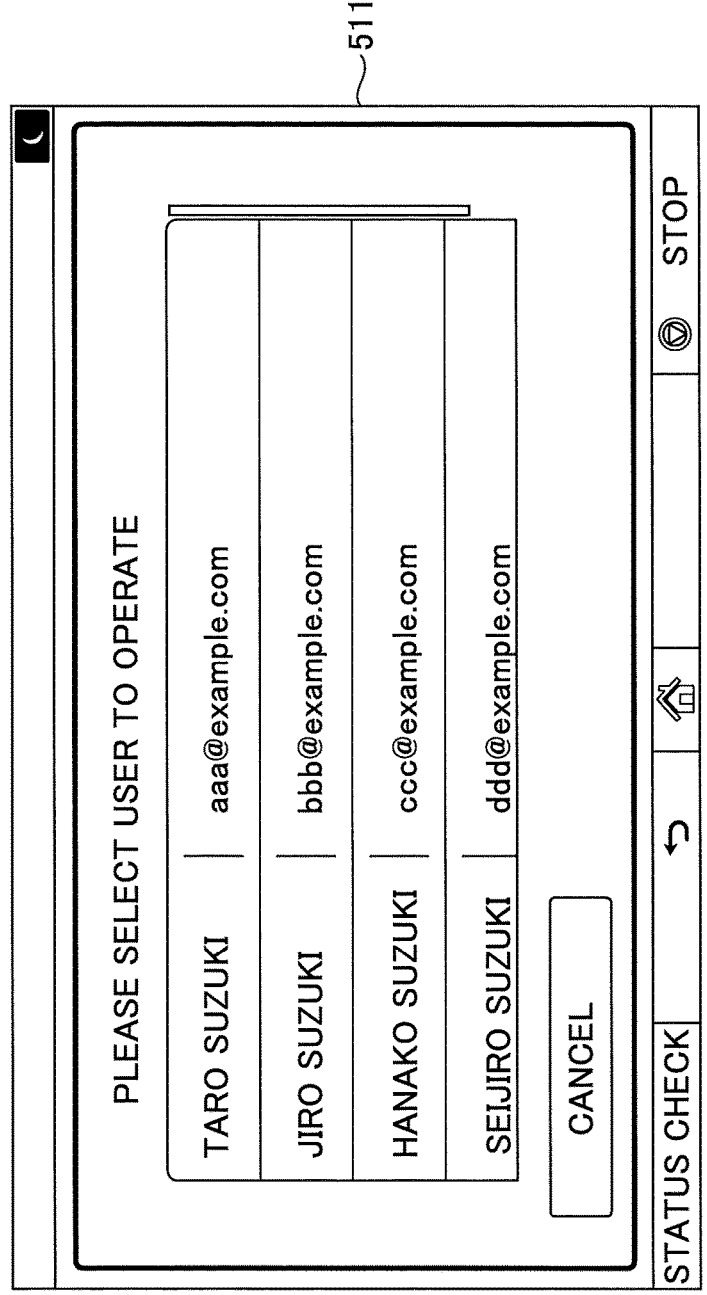

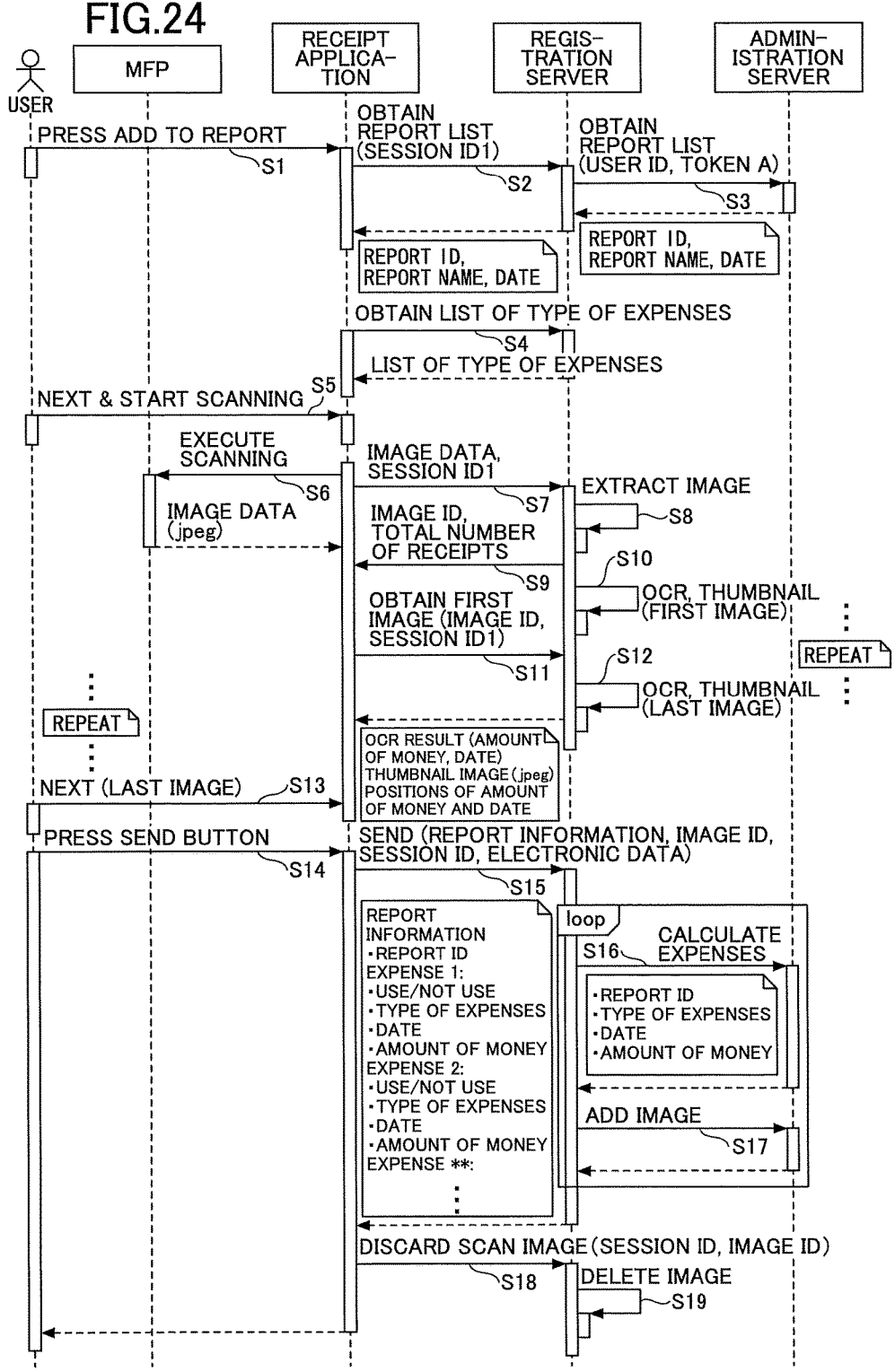

FIG.28B

| FILE | EDIT | DISPLAY | TOOL |

BUSINESS TRIP TO HOKKAIDO — 542

| DATE ▽ | TYPE OF EXPENSES | | AMOUNT OF MONEY |
|---|---|---|---|
| ADD NEW EXPENSES | | | |
| ☐ 10/10/2016 | TRAVEL EXPENSES FOR JUNE | | ¥1,200 |
| ☐ 10/10/2016 | BUSINESS TRIP TO HOKKAIDO | | ¥2,500 |
| | | TOTAL AMOUNT | ¥3,700 |

SUBMIT REPORT — 547

541, 545, 546, 543, 544

INFORMATION ANALYSIS SYSTEM AND INFORMATION ANALYSIS METHOD

BACKGROUND OF THE INVENTION

1. Field of the Invention

The present disclosure relates to an information analysis system and an information analysis method.

2. Description of the Related Art

There are some occasions in which an employee pays an amount of money required for carrying out a duty, and, after that, the employee requests an employer, such as a company, to reimburse the amount of money. For example, an employee visits a customer for business, and, after that, the employee requests a company to reimburse a transportation fee. Usually, an employee hand-writes an amount of money, such as a transportation fee, on a bill. It is desirable to automate this process because hand-writing lowers business efficiency.

A method has been known such that an employee takes a picture of a receipt using, for example, a smartphone to transmit an image of the receipt to a server, and the server registers and manages the image data of the receipt and information about the receipt (e.g., an amount of money).

Patent Document 1 (Japanese Unexamined Patent Publication No. 2013-041540) discloses, for example, an information extraction device in which a result of character recognition by a multifunction peripheral through scanning can be modified on the multifunction peripheral by a user. Using such a character recognition technique, information, such as an amount of money, can be extracted from a receipt.

Unfortunately, with such a technique, even if it is desirable to collectively process a plurality of receipts, it may not be possible to collectively process the plurality of receipts to enhance efficiency. Namely, the above-described technique assumes that one sheet of a receipt is read in a fixed shape. For example, when a plurality of receipts with respective different shapes and sizes is to be processed, a user may be required to perform a complicated operation. It should be noted that such a problem is not limited to a case where a user processes a receipt. There may arise such a problem for an application in which processing has commonality with the processing of the above-described technique.

There is a need for an information analysis system superior in functionality such that a user can easily operate a device to execute a process for electronically storing a receipt, etc.

SUMMARY OF THE INVENTION

According to an aspect of the present disclosure, there is provided an information analysis system including a reading device configured to read data; an analyzer configured to analyze the data read by the reading device; and a display device configured to display an analysis result by the analyzer, wherein the reading device includes a scanner; a transmitter; a first processor; and a first memory that includes instructions, which when executed, cause the first processor to execute the following steps: causing the scanner to scan one or more receipts placed in a reading area; and causing the transmitter to transmit image data to the analyzer, the image data including data of the one or more receipts scanned by the scanner, wherein the analyzer includes a first transceiver; a second processor; and a second memory that includes instructions, which when executed, cause the second processor to execute the following steps: causing the first transceiver to receive the image data; extracting one or more images of the one or more receipts from the image data, and counting a number of the one or more images; executing a character recognition process on each of the one or more images extracted by the step of extracting to obtain text data; causing the first transceiver to transmit, to the display device, a number of all of the one or more images, and to sequentially transmit, to the display device, each image of the one or more images for which the character recognition process has been completed, together with at least a part of the text data of the image; wherein the display device includes a display; a receiver; a third processor; and a third memory that includes instructions, which when executed, cause the third processor to execute the following steps: causing the display to sequentially display each image of the one or more images received from the analyzer, together with the at least the part of the text data of the image; causing the receiver to receive an edit on the at least the part of the text data displayed; and upon detecting that the number of all of the one or more images transmitted from the analyzer matches a number of the sequentially transmitted one or more images of the one or more receipts, configuring the display to be in a state in which the display is capable of receiving a command for indicating the display device to report to the analyzer that the reception of all of the one or more images is completed.

According to another aspect of the present disclosure there is provided an information analysis method executed by a reading device, an analyzer, and a display device, wherein the analyzer analyzes data read by the reading device to display an analysis result on a display device, the method including scanning, by the reading device, one or more receipts placed in a reading area; transmitting, by the reading device, image data to the analyzer, the image data including data of the one or more receipts read by the reading device; receiving, by the analyzer, the image data; extracting, by the analyzer, one or more images of the one or more receipts from the image data, and counting, by the analyzer, a number of the one or more images; executing, by the analyzer, a character recognition process on each of the one or more images extracted by the extracting to obtain text data; transmitting, to the display device by the analyzer, a number of all of the one or more images, and sequentially transmitting, to the display device by the analyzer, each image of the one or more images for which the character recognition process has been completed, together with at least a part of the text data of the image of the one or more images; sequentially displaying, by the display device, each image of the one or more images received from the analyzer, together with the at least the part of the text data of the image of the one or more images; receiving, by the display device, an edit on the at least the part of the text data displayed; and upon detecting, by the display device, that the number of all of the one or more images transmitted from the analyzer matches a number of the sequentially transmitted one or more images of the one or more receipts, configuring, by the display device, a display of the display device to be in a state in which the display is capable of receiving a command for indicating the display device to report to the analyzer that the reception of all of the one or more images is completed.

According to an aspect of the present disclosure, there can be provided an information analysis system superior in functionality such that a user can easily operate a device to execute a process for electronically storing a receipt, etc.

Other objects, features and advantages of the present invention will become more apparent from the following detailed description when read in conjunction with the accompanying drawings.

BRIEF DESCRIPTION OF THE DRAWINGS

FIG. 8 is a sequence diagram illustrating an example of a procedure of the administration server to authenticate a user;

FIG. 9A is a diagram illustrating an example of a lock screen;

FIG. 9B is a diagram illustrating an example of a home screen;

FIG. 9C is a diagram illustrating an example of a start screen;

FIG. 10A is a diagram illustrating an example of a login screen;

FIG. 11 is a sequence diagram illustrating an example of a procedure of the multifunction peripheral to register electronic data of a receipt to the administration server;

FIG. 13A is a diagram illustrating an example of a new report creation screen;

FIG. 15B is a diagram illustrating an example of image data including a plurality of receipts;

FIG. 22 is a sequence diagram illustrating an example of an operation procedure of the information registration system when an agent selects a principal;

FIG. 23B is a diagram illustrating an example of a principal list screen;

FIG. 24 is a sequence diagram illustrating an example of a procedure of the multifunction peripheral to register electronic data of a receipt to the administration server;

FIG. 28B is a diagram illustrating an example of a report screen;

DETAILED DESCRIPTION OF THE PREFERRED EMBODIMENTS

In the following, an embodiment according to the present disclosure is described while referring to the accompanying drawings.

<Outline of Creation of Electronic Data According to the Embodiment>

Figure 1:
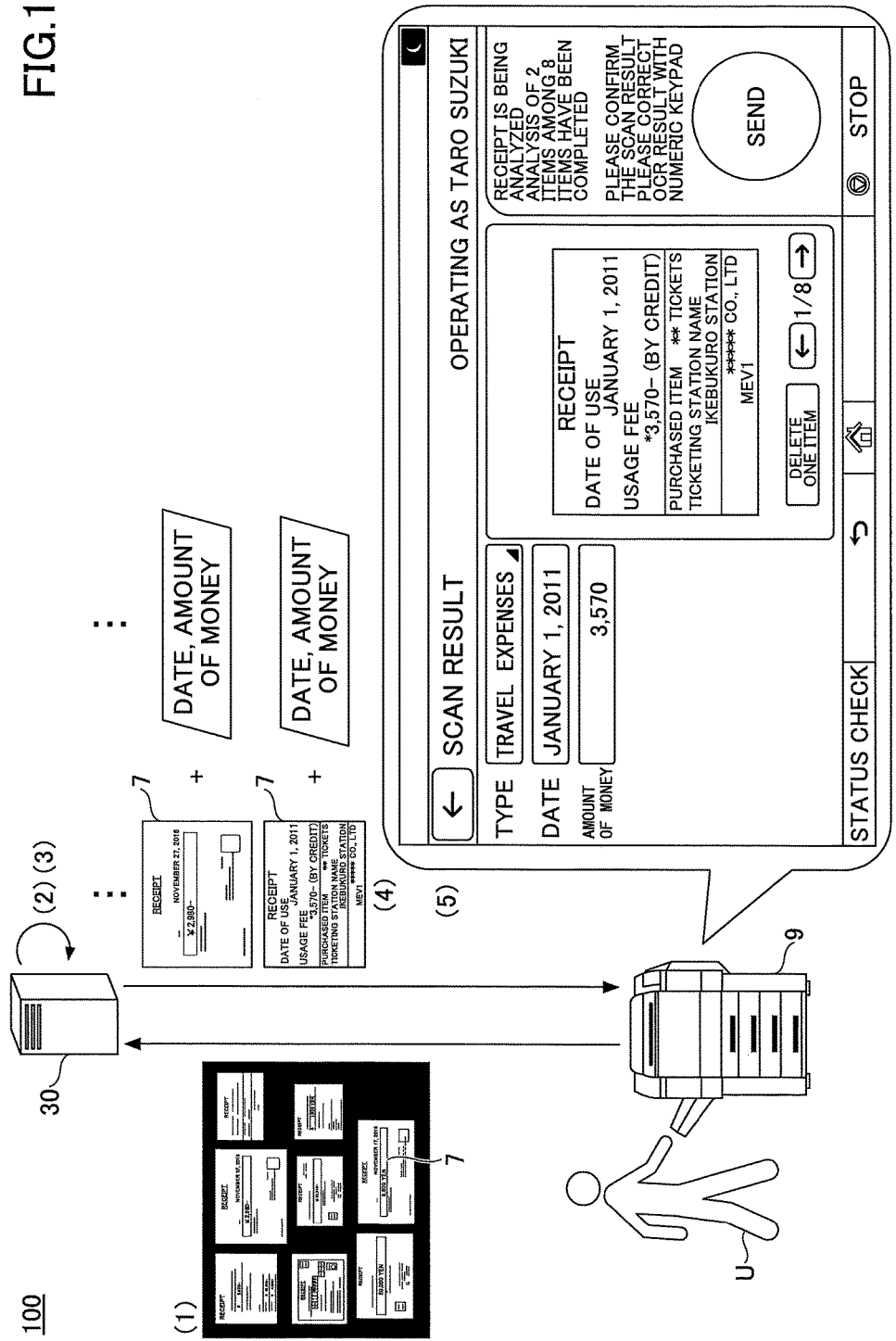
FIG. 1 is a diagram illustrating an example of an outline of an operation of an information registration system.

FIG. 1 is a diagram illustrating an example of an outline of an operation of an information registration system 100 according to the embodiment.

(1) A user U places a plurality of receipts 7 to be converted into electronic data on a contact glass of a multifunction peripheral 9, and the user U operates the multifunction peripheral 9 to scan these receipts 7. As a result, one image data item including images of the plurality of receipts 7 is transmitted to a registration server 30. It should be clear that, instead of the plurality of receipts 7, only one receipt may be placed on the contact glass of the multifunction peripheral 9 to be scanned.

(2) The registration server 30 extracts (trims) the images of the receipts 7 from the one image data item one by one.

(3) The registration server 30 sequentially applies a character recognition process to the images of the receipts 7 to detect, at least, a date and an amount of money.

(4) The registration server 30 sequentially transmits, to the multifunction peripheral 9, electronic data (an image, a date, and an amount of money) of each receipt of the receipts 7 for which the character recognition process has been completed, in the order of completion of the character recognition process.

(5) Upon receiving the electronic data of one of the receipts 7, which is transmitted from the registration server 30, the multifunction peripheral 9 displays the received electronic data of the one of the receipts 7 on an operations panel 27, and updates the display. On the operations panel 27, in accordance with an operation by the user U, an image of one of the receipts 7, the date written on the one of the receipts 7, and the amount of money written on the one of the receipts 7 are displayed.

As described above, in the information registration system 100 according to the embodiment, a plurality of receipts 7 can be converted into one image data item at once, and electronic data of each of the plurality of receipts 7 for which the character recognition process has been completed is sequentially transmitted to the multifunction peripheral 9. Accordingly, the user U can view the result of the character recognition process after a time required for completing the character recognition process for one of the plurality of receipts 7 elapses, without waiting for completion of the character recognition process for all of the receipts 7. The user U can confirm the result of the character recognition process for each of the plurality of receipts 7 in the order of displaying, and the images of the receipts 7 are transmitted one after another while confirming the result of the character recognition process. Thus, confirmation of the result of the character recognition process can be performed in parallel with the character recognition process. Consequently, a waiting time of the user U can be reduced, which is from placing the receipts 7 to be scanned until the result is displayed.

<System Configuration Example>

Figure 2:
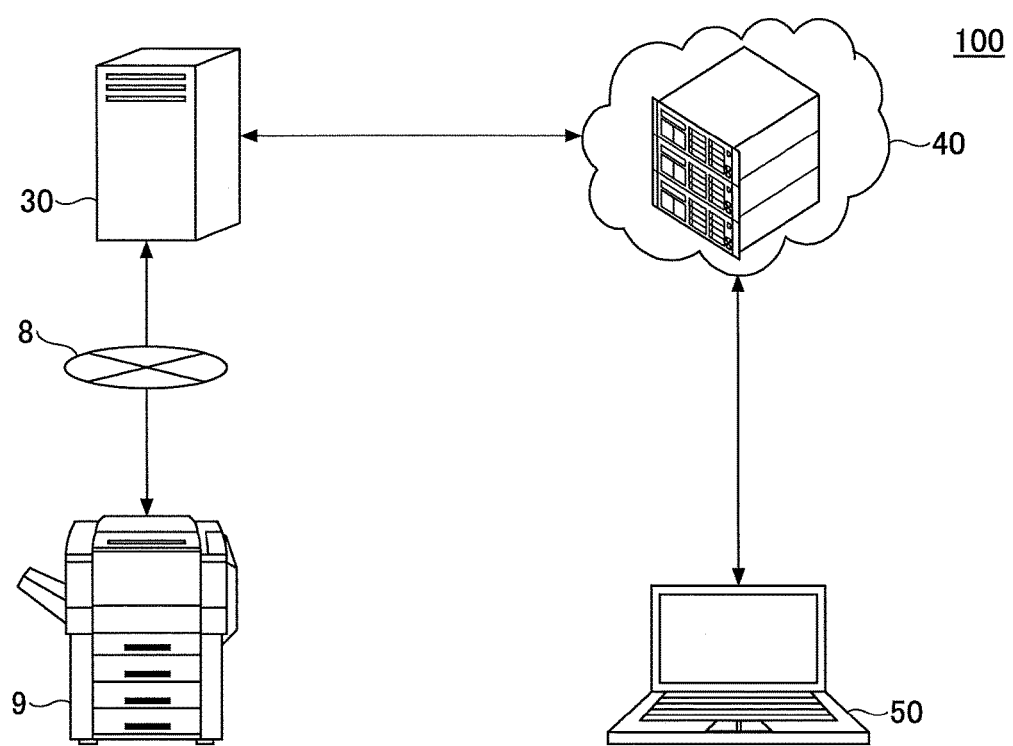
FIG. 2 is a schematic configuration diagram of an example of the information registration system.

FIG. 2 is diagram schematically illustrating an example of a configuration of the information registration system 100 according to the embodiment. The information registration system 100 mainly includes the multifunction peripheral 9; the registration server 30; an administration server 40; and a user terminal 50. The information registration system 100 may be called an information analysis system because the information registration system 100 includes a function for analyzing information. The information registration system 100 analyzes read data, and the information registration system 100 displays the result of the analysis on a display device.

The multifunction peripheral 9 and the registration server 30 are coupled to each other via a network 8. The registration server 30 and the administration server 40 can communicate with each other. The user terminal 50 and the administration server 40 can communicate with each other. Actually, the multifunction peripheral 9, the registration server 30, the administration server 40, and the user terminal 50 are coupled to the network 8. However, for convenience of the description of the configuration, some connection with the network 8 is omitted. Further, it is assumed that the administration server 40 provides a service as a cloud service. The registration server 30 intermediates between the multifunction peripheral 9, which is an entrance of a receipt, and the administration server 40, which is an exit of the receipt. The registration server 30 can support receipt management services that are provided by a respective plurality of vendors. Similarly, the registration server 30 can support multifunction peripherals 9 that are sold by a respective plurality of vendors.

The network 8 for coupling the multifunction peripheral 9 with the registration server 30 may be a local area network (LAN) installed in a facility where the multifunction peripheral 9 is installed; a wide area Ethernet (registered trademark); a wide area network (WAN) in which a plurality of LANs are connected by a router; etc. Note that the coupling may be via the Internet. The network 8 may be formed of wired lines or radio links, or the network 8 may be formed of a combination of a wired line and a radio link. Further, when the network 8 is formed of radio links, the network 8 may include a network that conforms to a communication standard, such as 3G, 4G, or LTE.

The multifunction peripheral 9 is a reading device that optically reads a document and generates image data. Such a device is called a scanner or a scanner device. The multifunction peripheral 9 may include a function other than the function of the reading device, and, thus, the name "the multifunction peripheral 9" includes the characters "multi." The multifunction peripheral 9 may be referred to as an MFP (Multi-Function Peripheral). The multifunction peripheral 9 may further be provided with a printer function for forming an image on a printing medium, such as a sheet of paper; a copy function implemented by a scanner and a printer function; and a facsimile function implemented by a scanner and a telephone line (or a network). Based on these functions, the multifunction peripheral 9 may also be referred to as an image forming apparatus, a printer, a copier, a copying machine, a facsimile machine, and so forth.

The multifunction peripheral 9 according to the embodiment may preferably be provided with a function for capturing a plurality of receipts at once. In view of the above-described function, a document camera mainly used for a video conference, a digital camera, a Web camera, and so forth can be a device provided with a function equivalent to the function provided by the multifunction peripheral 9 according to the embodiment. Alternatively or additionally, the above-described function may be provided by a personal computer (PC) which includes a digital camera, or by a PC to which an external digital camera is coupled.

The multifunction peripheral 9 is provided with the operations panel 27, which is described below; and the multifunction peripheral 9 may cause the operations panel 27 to display electronic data of a receipt. The operations panel 27 is provided with a function of an input device for receiving a command for editing electronic data, such as that of a touch panel or a keyboard; and a function of a display or a display device.

The multifunction peripheral 9 is provided with a main body 10 and an operation unit 20, which are described below. One or more applications can be installed on the main body 10; and one or more applications can be installed on the operation unit 20. In the embodiment, in order to register image data of a plurality of receipts with the administration server 40, an application (which is referred to as a receipt application 60, hereinafter) for coordinating with the registration server 30 is installed on the operation unit 20. Alternatively, the receipt application 60 may be installed on the main body 10.

The registration server 30 is an information processing apparatus for registering electronic data of a receipt with the administration server 40. Namely, the registration server 30 executes trimming and a character recognition process for each image of the receipt included in the image data of the plurality of receipts, and the registration server 30 transmits electronic data of the receipt to the multifunction peripheral 9. After the user confirms the content, the user U presses a transmission button, which is described below. In response to detecting that the user U presses a transmission button, the registration server 30 receives electronic data of the receipt other than the image of the receipt, and the registration server 30 transmits the electronic data of the receipt other than the image of the receipt to the administration server 40 together with a user ID (mail address) of the user U.

The administration server 40 is an information processing apparatus for maintaining electronic data of one or more receipts. The administration server 40 adopts a management scheme such that one or more individual users U are managed while associating the one or more individual users U with an administrator. An administrator can register one or more individual users U based on the administrator authority; and the administrator has authority to execute a predetermined process for each of the one ore more registered users, as described below. Namely, the administrator can use the administration server 40 with the administrator authority, and the administrator can execute a predetermined process for a registered user. Accordingly, for example, when a company A desires to use a service provided by the administration server 40, it suffices if one administrator is registered and other employees are registered based on the administrator. In other words, it is not required to register all employees as administrators. In addition, at a service provider providing the service using the administration server 40, a usage scheme may not be desirable such that each employee is registered as an administrator. At the service provider, it may be desirable to manage the service provided by the administration server 40 in units of companies, organizations, or individuals.

An administrator: a user 1, a user 2, . . . , a user N.

An administrator is defined to be a person who maintains a state of being logged-in to the management server 40, on behalf of each user. The administrator can be said to be a predetermined person responsible for collectively handling a plurality of users U in a company using a service provided by the administration server 40. However, it is not necessary that the person in charge actually exists. As described below in detail, a complicated process or operation is required for each of the users U to log in to the administration server 40 through the registration server 30. Accordingly, in principle, the administrator logs in to the administration server 40, and each user U using the multifunction peripheral 9 uses the administration server 40 with the authority of the administrator. In the administration server 40, the administrator ID is associated with a user ID of each user U registered based on the administrator ID, and electronic data transmitted by each user U is registered while being associated with the user ID of the user U. However, each user can log in to the administration server 40.

Note that "ID" is an abbreviation for identification, and "ID" means an identifier or identification information. An ID is said to be a name, a symbol, a character string, a numerical value, or a combination of one or more of these, which are used for uniquely distinguishing a specific object from a plurality of objects. The same applies to IDs other than the user ID. In the embodiment, a mail address is used as the user ID; however, the user ID is not limited to the mail address provided that the user U can be identified.

The user terminal 50 is an information processing device for a user U to confirm or edit electronic date on the registration server 30, or for the user U to submit electronic data to the registration server 30. Browser software or application software provided with a function that is the same as the function of the browser software runs on the user terminal 50. A user U operates the user terminal 50 to log in to the user terminal 50 with the authority of the user U, and the user U operates the user terminal 50 to display electronic data of a receipt associated with a user ID. After confirming and editing the receipt, the electronic data is sent to an application workflow for approval of the receipt. Then, a supervisor approves the receipt, and an accounting department performs a payment process. Further, the user terminal 50 can access the administration server 40 to register the retained image data of the receipt with the administration server 40. Furthermore, when the user terminal 50 is provided with an image capturing function, such as a function of a camera, image data obtained by capturing an image of the receipt may be registered with the administration server 40.

Specifically, the user terminal 50 may be a PC; a smartphone; a tablet terminal; a wearable PC, such as a sunglass type wearable PC or a wristwatch type wearable PC; a personal digital assistant (PDA), a game machine, or a navigation device. However, the user terminal 50 is not limited to these, and the user terminal 50 can be any device, provided that the device can execute browser software or application software equivalent to the browser software. For example, when the user terminal 50 is a smartphone, a service provider of the administration server 40 may generate a dedicated application that runs on the smartphone. The application can be distributed by being downloaded onto the user terminal 50.

<Example of a Hardware Configuration>
<<Multifunction Peripheral>>

Figure 3:
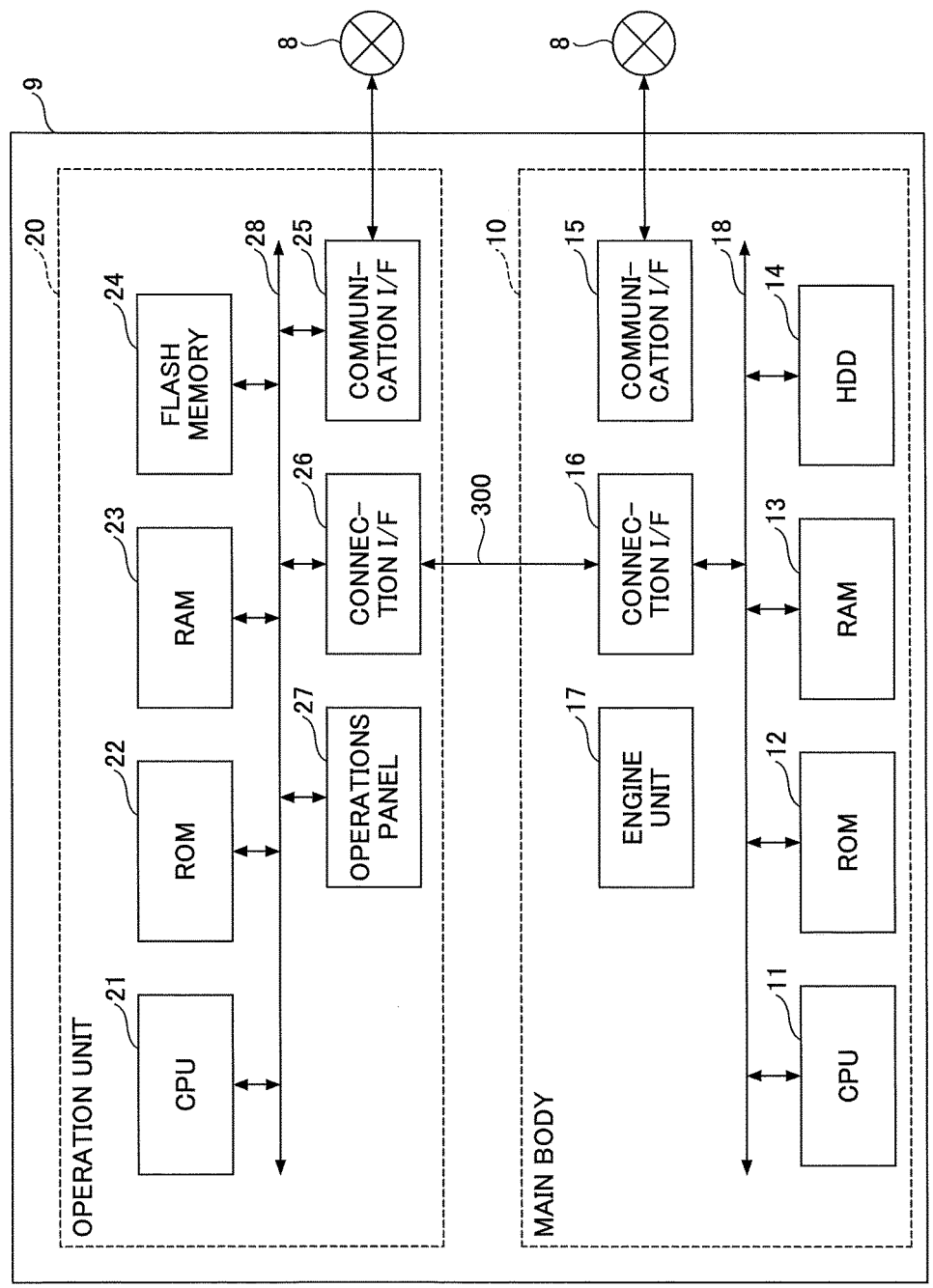
FIG. 3 is a diagram illustrating an example of a hardware configuration of a multifunction peripheral.

FIG. 3 is a diagram illustrating an example of a hardware configuration of the multifunction peripheral 9. As illustrated in FIG. 3, the multifunction peripheral 9 is provided with the main body 10 and the operation unit 20. The main body 10 and the operation unit 20 are coupled to each other through a dedicated communication path 300, so that the main body 10 and the operation unit 20 can communicate with each other. As the communication path 300, for example, a communication path conforming to a Universal Serial Bus (USB) standard may be used. However, the communication path 300 is not limited to this, and a communication path conforming to any standard can be used, regardless of whether the standard is a standard for a wired line or a standard for a wireless channel.

Note that the main body 10 can execute an operation corresponding to an operation received on the operation unit 20. Further, the main body 10 can communicate with an external device, such as a client PC (Personal Computer), and the main body 10 can execute an operation corresponding to a command received from the external device.

Next, a hardware configuration of the main body 10 is described. As illustrated in FIG. 3, the main body 10 is provided with a central processing unit (CPU) 11; a read-only memory (ROM) 12; a random access memory (RAM) 13; a hard disk drive (HDD) 14; a communication interface (I/F) 15; a connection I/F 16; and an engine unit 17, and these are coupled to each other through a system bus 18. For convenience of the description, in FIG. 3, the example is described in which the main body 10 includes the HDD 14. However, a configuration may be such that, for example, there is no HDD 14, and a sufficient storage area may not be ensured.

The CPU 11 integrally controls the operation of the main body 10. The CPU 11 controls the operation of the entire main body 10 by executing one or more programs stored in the ROM 12 and/or the HDD 14 while using the RAM 13 as a work area (workspace) so as to implement various types of functions, such as the above-described copy function, the scanner function, the facsimile function, and the printer function.

The communication I/F 15 is an interface for coupling to the network 8. The connection I/F 16 is an interface for communicating with the operation unit 20 through the communication path 300.

The engine unit 17 is hardware for executing processing other than generic information processing and communication processing so as to implement the copy function, the scanner function, the facsimile function, and the printer function. For example, the engine unit 17 is provided with a scanner that scans and reads an image of a document (which corresponds to a reading unit 33 described below); a plotter (image forming unit) for executing printing on a sheet material, such as a paper sheet; and a facsimile unit for executing facsimile communication. Additionally, the engine unit 17 may be provided with a specific optional component, such as a finisher for sorting printed sheet materials and an automatic document feeder (ADF) for automatically feeding an original document.

Next, the hardware configuration of the operation unit 20 is described. As illustrated in FIG. 3, the operation unit 20 is provided with a CPU 21; a ROM 22; a RAM 23; a flash memory 24; a communication I/F 25; a connection I/F 26; and an operations panel 27, and these are coupled to each other through a system bus 28. For convenience of the description, in FIG. 3, the example is described in which the operation unit 20 includes the flash memory 24. However, a configuration may be such that, for example, there is no flash memory 24. In other words, the multifunction peripheral 9 may not be provided with a storage device for storing received content.

<<The Registration Server 30, the Administration Server 40, and the User Terminal 50>>

Figure 4:
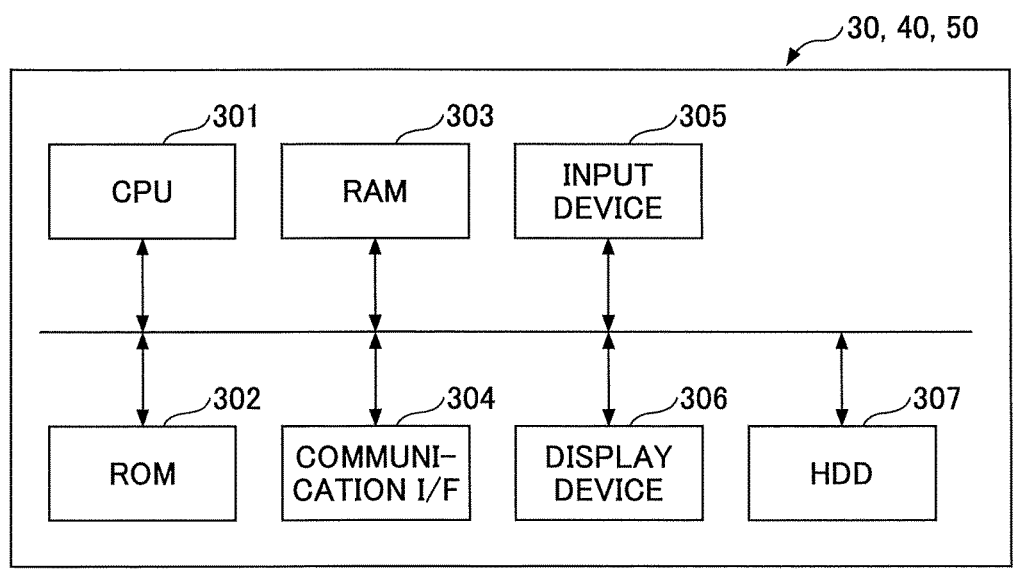
FIG. 4 is a diagram illustrating an example of a hardware configuration of any one of a registration server, an administration server, and a user terminal.

FIG. 4 is a diagram illustrating an example of a hardware configuration of any one of the registration server 30, the administration server 40, and the user terminal 50. Here, the registration server 30 is exemplified and described. The registration server 30 is provided with a CPU 301; a ROM 302; a RAM 303, a communication I/F 304; an input device 305; and a display device 306. The CPU 301 integrally controls the operation of the registration server 30. The ROM 302 is a non-volatile memory for storing various types of data, such as a program. The RAM 303 is a volatile memory that functions as a work area (workspace) for various types of processes executed by the CPU 301. The communication I/F 304 is an interface for coupling to the network 8. The input device 305 is a device used for inputting an operation by the user U. The input device 305 is formed of, for example, a mouse and a keyboard. The display device 306 is a device for displaying various types of information. The display device 306 is formed of, for example, a liquid crystal display device.

The hardware configurations of the administration server 40 and the user terminal 50 can be the same as the hardware configuration of the registration server 30. Even if the hardware configuration of the administration server 40 or the hardware configuration of the user terminal 50 is different from the hardware configuration of the registration server 30, the difference can be negligible for the purpose of the description of the embodiment.

Note that the administration server 40 may preferably support cloud computing. However, the support of the cloud computing is not required. It is assumed that the registration server 30 is installed in a network constructed by a company using the multifunction peripheral 9. The registration server 30 may support cloud computing and may provide the function of the registration server 30 as a cloud service. The cloud computing is said to be a mode of usage such that a resource on a network is used without awareness of a specific hardware resource.

The depicted hardware configuration is not required to be accommodated in a single casing. The depicted hardware configuration is not required to be provided as a single device. Instead, the depicted hardware configuration illustrates the hardware elements that are preferably provided in the registration server 30 or the administration server 40. Further, in order to support could computing, the physical configuration of the registration server 30 or the administration server 40 according to the embodiment may not be static. The physical configuration of the registration server 30 or the administration server 40 according to the embodiment may be configured such that hardware resources are dynamically connected or disconnected depending on a load.

<Software Configuration>

Figure 5:
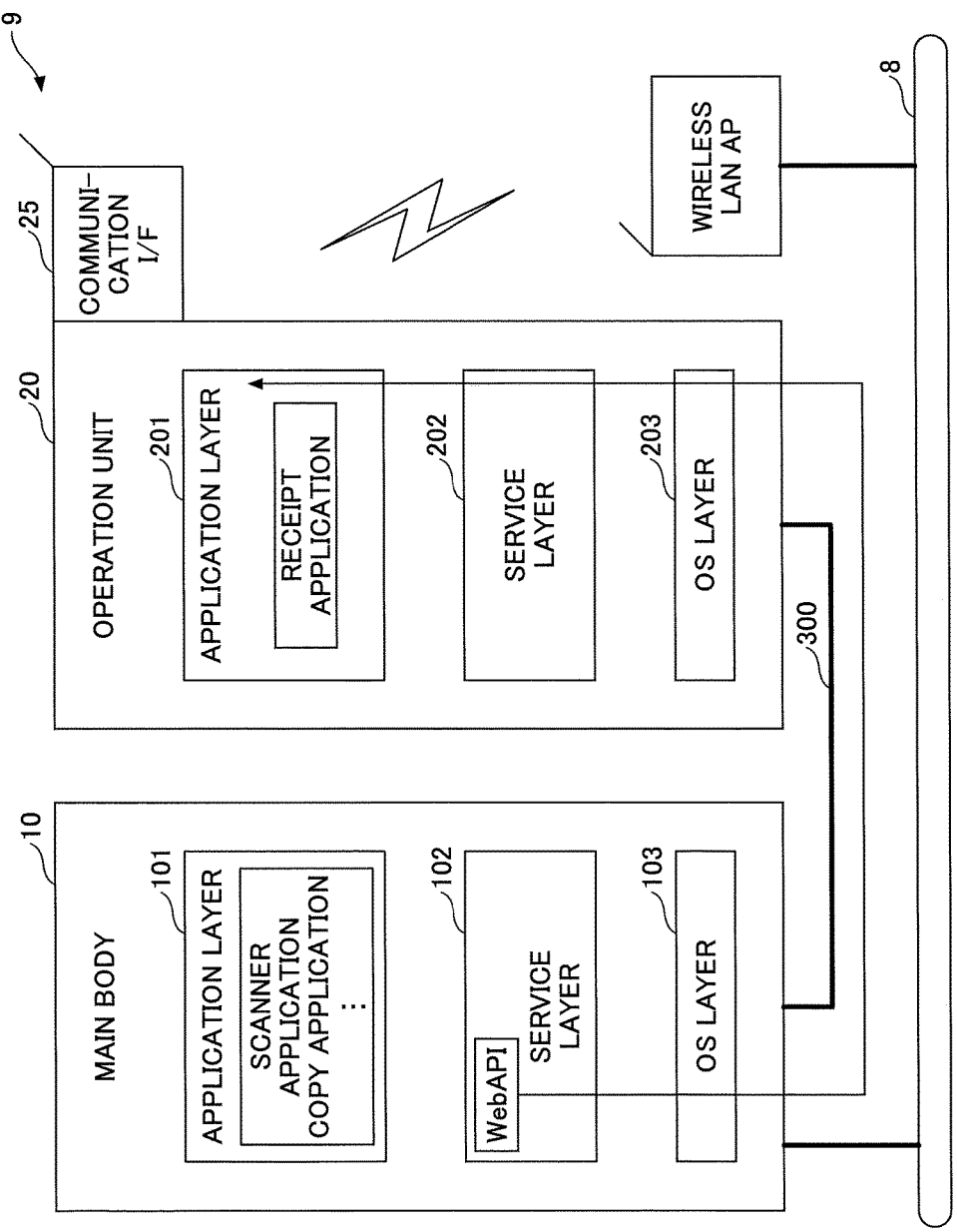
FIG. 5 is a schematic diagram illustrating an example of a software configuration of the multifunction peripheral.

FIG. 5 is a schematic diagram illustrating an example of a software configuration of the multifunction peripheral 9. As illustrated in FIG. 5, the main body 10 is provided with an application layer 101; a service layer 102; and an operating system (OS) layer 103. A real substance of each of the application layer 101, the service layer 102, and the OS layer 103 is various types of software components stored in the ROM 12 and/or the HDD 14. Various types of functions are provided by executing these software components by the CPU 11.

The software of the application layer 101 is application software (which may be referred to simply as the "application," in the following description) for providing a predetermined function by operating hardware resources. For example, as applications, there are a copy application for providing a copy function, a scanner application for providing a scanner function, a facsimile application for providing a facsimile function, a printer application for providing a printer function, and a device information reporting application for reporting information on the multifunction peripheral 9.

The software of the service layer 102 is interposed between the application layer 101 and the OS layer 103, and the software of the service layer 101 is for providing, to an application, an interface for using the hardware resources included in the main body 10. More specifically, the software of the service layer 102 is for providing a function for receiving an operation request to a hardware resource and a function for arbitrating operation requests to a hardware resource. As examples of an operation request received by the service layer 102, there are a request for reading by a scanner and a request for printing by a plotter.

Note that the interface function by the service layer 102 is not only provided to the application layer 101 of the main body 10, but also to an application layer 201 of the operation unit 20. Namely, the application layer 201 (application) of the operation unit 20 may also implement a function using a hardware resource of the main body 10 (e.g., the engine unit 17) through the interface function of the service layer 102. For example, the interface function of the service layer 102 is provided by a Web application program interface (WebAIP). The operation unit 20 and the main body 10 can communicate with each other through the communication path 300 as a network.

The software of the OS layer 103 is a system software (operating system (OS)) for providing basic functions for controlling the hardware included in the main body. The software of the service layer 102 converts requests for using hardware resources from various types of applications into commands interpretable by the OS layer 103, and passes the commands to the OS layer 103. Then, as the commands are executed by the software of the OS layer 103, the hardware resources operate in accordance with the requests from the applications.

Similarly, the operation unit 20 is provided with the application layer 201; a service layer 202; and an OS layer 203. The hierarchical structure of the application layer 201, the service layer 202, and the OS layer 203 included in the operation unit 20 is the same as the hierarchical structure of the application layer 101, the service layer 102, and the OS layer 103 of the main body 10. However, functions provided by applications of the application layer 201 are different from the functions provided by the applications of the application layer 101 of the main body 10, and types of operation requests that can be received by the service layer 202 are different from the types of the operation requests that can be received by the service layer 102 of the main body 10. An application of the application layer 201 can be software for providing a predetermined function by causing one or more hardware resources included in the operation unit 20 to operate. However, the application of the application layer 201 is software for mainly providing a function of a user interface (UI) (e.g., a UI function for copying, a UI function for scanning, a UI function for facsimile transmission, a UI function for a printer, and a UI function for initial setup) for operating and displaying functions of the main body 10 (the copy function, the scanner function, the printer function, and an initial setup function) and a browser function. Here, examples of the application of the application layer 201 include the receipt application 60.

Note that, in the embodiment, in order to maintain independence of functions, the software of the OS layer 103 of the main body 10 is different from the software of the OS layer 203 of the operation unit 20. Namely, the main body 10 and the operation unit 20 are independently operated by respective different operating systems. For example, Net-BSD (registered trademark) may be used as the software of the OS layer 103 of the main body 10, and Android (registered trademark) may be used as the software of the OS layer 203 of the operation unit 20.

As described above, in the multifunction peripheral 9 according to the embodiment, the main body 10 and the operation unit 20 are operated by the different operating systems. As a result, communication between the main body 10 and the operation unit 20 is executed as communication between different devices, instead of interprocess communication within a common device. The operation for transmitting the information received by the operation unit 20 (details of the indication by the user U) to the main body 10 (command communication) and the operation, by the main body 10, of reporting an event to the operation unit 20 correspond to such communication between the different devices. Here, the function of the main body 10 can be used by executing, by the operation unit 20, the command communication to the main body 10. As examples of the event to be reported from the main body 10 to the operation unit 20, there are an execution state of the operation by the main body 10 and details of the configuration set up by the main body 10.

Further, in the embodiment, power supply to the operation unit 20 is executed from the main body 10 through the communication path 300. As a result, the power control of the operation unit 20 can be executed separately (independently) from the power control of the main body 10.

<The Functions>

Figure 6:
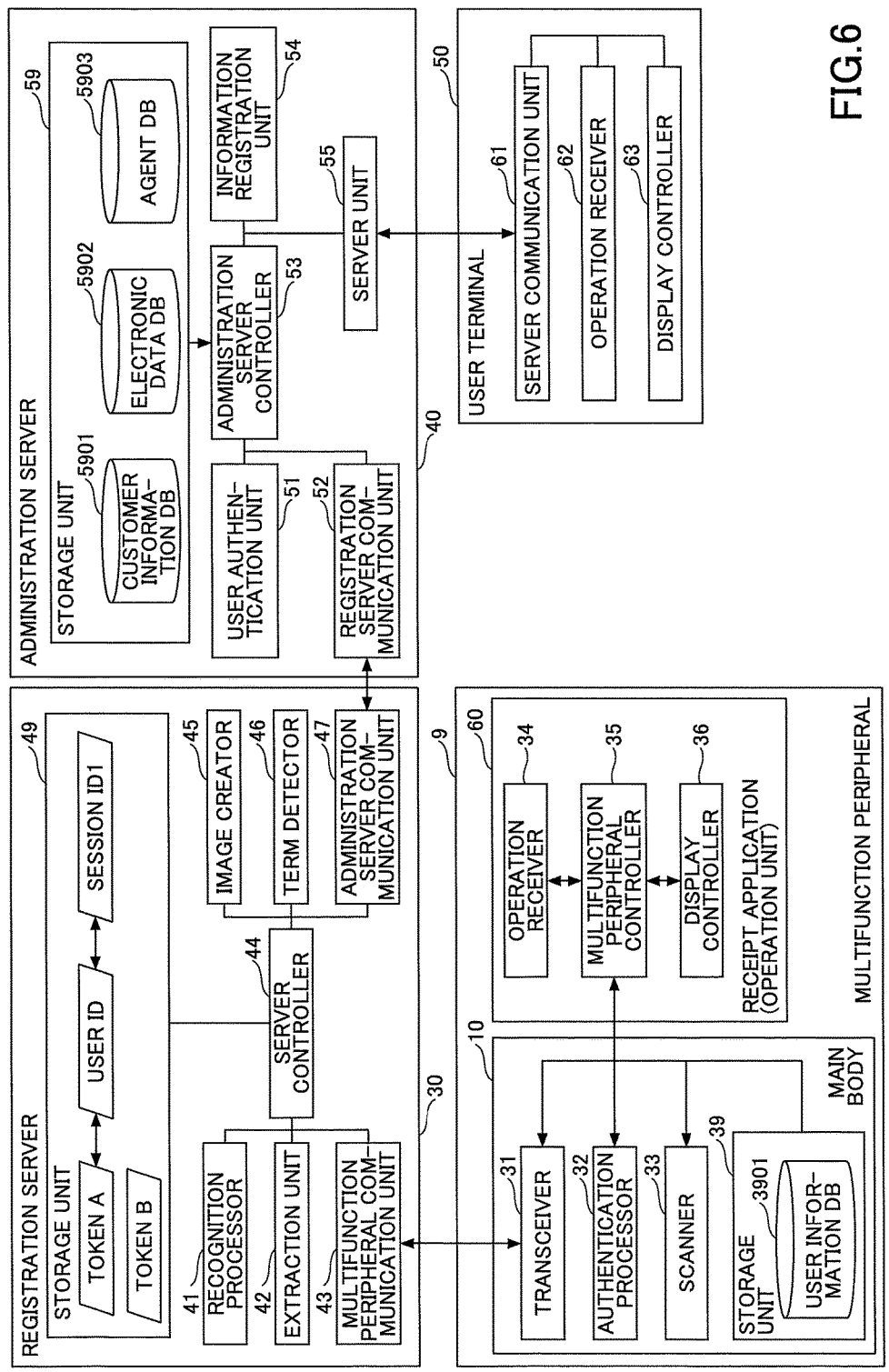
FIG. 6 is a diagram illustrating functions of each device of the information registration system.

Functions of the devices of the information registration system 100 are described by referring to FIG. 6. FIG. 6 is a block diagram illustrating examples of the functions of the multifunction peripheral 9, the registration server 30, the administration server 40, and the user terminal 50, which are included in the information registration system 100.

<<Multifunction Peripheral 9>>

The multifunction peripheral 9 is provided with the main body 10 and the operation unit 20. The main body 10 is provided with a transceiver 31; an authentication processor 32; and a scanner 33. Each of these functional units of the main body 10 is a function or a unit implemented by operating any of the components depicted in FIG. 3 by a command from the CPU 11 in accordance with a program from the HDD 14 developed in RAM 13. This program is distributed from a program distribution server, or distributed in a state in which the program is stored in a storage medium.

The main body 10 is also provided with a storage unit 39. The storage unit 39 is a storage device for storing various types of information, which is implemented by the HDD 14, the ROM 12, and/or the RAM 13 of FIG. 3. A user information database (DB) 3901 is constructed in the storage unit 39.

TABLE 1

| IC card information | User ID | Password | Attribute information |
|---|---|---|---|
| 1234567890 | user1@sample.com | **** | Sales department, Taro Suzuki, Authority rank 1 |
| 2345678901 | user2@sample.com | **** | General affairs department, Taro Sato, Authority rank 1 |
| 3456789012 | user3@sample.com | **** | Accounting department, Taro Saito, Authority rank 1 |
| ... | ... | ... | ... |

Table 1 illustrate an example of information stored in the user information DB 3901 in a table form. For example, the IC card information, the user ID, the password, and the attribute information are registered with the user information DB 3901. The IC card information, or the user ID and the password are authentication information for the user U to log in to the multifunction peripheral 9. Note that authentication information to log in to the administration server 40 is not registered with the user information DB 3901. If authentication information for various types of servers were registered with the user information DB 3901, it would be complicated to manage the user information DB 3901. In the embodiment, when the user U logs in to the multifunction peripheral 9, the user U can use the administration server 40 with the administrator authority. Thus, it suffices if the user information DB 3901 maintains the authentication information to log in to the multifunction peripheral 9. Accordingly, the user U can use the multifunction peripheral 9 and the administration server 40 with one authentication operation, similar to the case of single sign-on.

For example, Active Directory (registered trademark) may be applied to the authentication of the user U. Note that, it is not necessary that the multifunction peripheral 9 is provided with the user information DB 3091. The user information DB 3901 may be stored in a resource on a network with which the multifunction peripheral 9 can communicate.

(Function of the Main Body)

The transceiver 31 is implemented by the CPU 11 of FIG. 3 by executing a program to control the communication I/F 15. The transceiver 31 transmits various types of data to the registration server 30 and receives various types of data from the registration server 30 through the network 8.

The authentication processor 32 is implemented by the CPU 11 of FIG. 3 by executing a program. The authentication processor 32 authenticates the user U by referring to the user information DB 3901. The authentication processor 32 reads IC card information of an IC card carried by the user U by using a reader/writer. Upon detecting that the IC card information matches the IC card information in the user information DB 3901, the authentication processor 32 determines that authentication is established. Upon detecting that the IC card information does not match the IC card information in the user information DB 3901, the authentication processor 32 determines that the authentication is not established. Alternatively, upon detecting that the user ID and the password input by the user U matches the user ID and the password in the user information DB 3901, the authentication processor 32 determines that the authentication is established. Upon detecting that the user ID and the password input by the user U does not match the user ID and the password in the user information DB 3901, the authentication processor 32 determines that the authentication is not established. When the authentication is established, the authentication processor 32 allows the user to log in. Namely, the receipt application 60 can be used. Note that biometric information, such as a finger print, may be used for the IC card.

The scanner 33 is implemented by the CPU 11 of FIG. 3 by executing a program to control the engine unit 17. The scanner 33 reads an original document on a contact glass using the scanner function of the multifunction peripheral 9 to generate image data.

(Function of the Receipt Application 60)

The receipt application 60 is provided with an operation receiver 34; a multifunction peripheral controller 35; and a display controller 36. Each of the functional units included in the receipt application 60 is a function or a unit that is implemented by operating any of the components depicted in FIG. 3 by a command from the CPU 21 in accordance with a program from the flash memory 24 developed in the RAM 23. The program can be distributed from a program distribution server, or can be distributed in a state in which the program is stored in a storage unit.

The operation receiver 34 is implemented by the CPU 21 of FIG. 3 by executing a program to control the operations panel 27. The operation receiver 34 receives various types of operation from the user U.

The multifunction peripheral controller 35 is implemented by the CPU 21 of FIG. 3 by executing a program. The multifunction peripheral controller 35 controls the overall operation of the receipt application 60.

The display controller 36 is implemented by the CPU 21 of FIG. 3 by executing a program to control the operations panel 27. The display controller 36 displays a screen of the receipt application 60 on the operations panel 27. The receipt application 60 is provided with screen parts to be displayed on the screen in advance. By arranging electronic data and information transmitted from the management server 40 together with the screen parts, the receipt application 60 forms the screen.

Note that the separation of the main body 10 and the receipt application 60 in FIG. 6 is merely an example. The receipt application 60 may be provided with the functions of the main body 10.

Alternatively, the main body 10 may be provided with the functions of the receipt application 60.

<<Registration Server 30>>

The registration server 30 includes a recognition processor 41; an extraction unit 42; a multifunction peripheral communication unit 43; a server controller 44; an image creator 45; a term detector 46; and an administration server communication unit 47. Each of the functional units included in the registration server 30 is a function or a unit implemented by operating any of the components depicted in FIG. 4 by a command from the CPU 301 in accordance with a program from the HDD 307 developed in the RAM 303. The program may be distributed from a program distribution server, or may be distributed in a state in which the program is stored in a storage medium.

Additionally, the registration server 30 includes a storage unit 49. The storage unit 49 is a storage device for storing various types of information, which is implemented by any of the HDD 307, the ROM 302, and the RAM 303 depicted in FIG. 4. In the storage unit 49, a token A and a token B are created. The token A is login completion information transmitted from the administration server 40 to the registration server 30 when the administrator logs in to the administration server 40. Namely, during a state in which the administrator logs in to the administration server 40, the registration server 30 maintains the token A. The administration server 40 maintains the login state for approximately one year from the time at which the administrator has logged in to the administration server 40 for the last time. As a result that the administrator logs in to the administration server 40, each user is able to use the administration server 40 with the authority of the administrator. Further, when the user ID of the user U logged in to the multifunction peripheral 9 is registered with the administration server 40, the token A is associated with the user ID and a session ID1. The multifunction peripheral 9 communicates with the registration server 30 using this session ID1.

The token B is the login completion information transmitted from the administration server 40 to the registration server 30 when a below-described agent logs in to the administration server 40. The agent is able to register electronic data of a receipt with the administration server 40 on behalf of a principal.

The multifunction peripheral communication unit 43 is implemented by the CPU 301 depicted in FIG. 4 by executing a program to control the communication I/F 304. The multifunction peripheral communication unit 43 is for communicating various types of information with the multifunction peripheral 9.

The extraction unit 42 is implemented by the CPU 301 depicted in FIG. 4 by executing a program. The extraction unit 42 is for extracting (trimming) an image of each receipt form image data including a plurality of receipts.

The recognition processor 41 is implemented by the CPU 301 depicted in FIG. 4 by executing a program. The recognition processor 41 applies a character recognition process to each image to convert the image into text data. The text data includes, at least, a date and an amount of money.

The image creator 45 is implemented by the CPU 301 depicted in FIG. 4 by executing a program. The image creator 45 is for creating a thumbnail of each image. A thumbnail is an image obtained by shrinking or enlarging an original image.

A term detector 46 is implemented by the CPU 301 depicted in FIG. 4 by executing a program. The term detector 46 is for detecting, in text data obtained by a character recognition process, a fixed term, such as an amount of money and a date.

The server controller 44 is implemented by the CPU 301 depicted in FIG. 4 by executing a program. The server controller 44 is for controlling an overall operation of the registration server 30.

The administration server communication unit 47 is implemented by the CPU 301 depicted in FIG. 4 by executing a program to control the communication I/F 304. The administration server communication unit 47 is for communicating various types of information through a Web Application Programming Interface (WebAIP) published by the administration server 40. A WebAPI is said to be an arrangement (e.g., a process request method and a data specifying method) for executing a process by two devices through a network.

<<Administration Server 40>>

The administration server 40 includes a user authentication unit 51; a registration server communication unit 52; an administration server controller 53; an information registration unit 54; and a server unit 55. Each unit included in the administration server 40 is a unit or a function implemented by operating any of the components depicted in FIG. 4 by a command from the CPU 301 in accordance with a program from the HDD 307 developed in RAM 303. The program may be distributed from a program distribution server, or may be distributed in a state in which the program is stored in a storage medium.

Additionally, the administration server 40 includes a storage unit 59. The storage unit 59 is a storage device for storing various types of information, which is implemented by any of the HDD 307, the ROM 302, and the RAM 303 depicted in FIG. 4. In the storage unit 59, a customer information DB 5901, an electronic data DB 5902, and an agent DB 5903 are created.

TABLE 2

| Administrator ID | Administrator password | User ID | Password | Display name | Type of expenses |
|---|---|---|---|---|---|
| kanri@sample.com (token A) | **** | user1@sample.com | **** | Taro Suzuki | Traveling expenses, food expenses, ... |
| | | user2@sample.com | **** | Taro Sato | Travelling expenses, food expenses, ... |
| | | user3@sample.com | **** | Taro Saito | Travelling expenses, food expenses, ... |
| | | ... | | | |
| | | userN@sample.com | **** | President Taro | Travelling expenses, food expenses, ... |

Table 2 illustrates an example of information registered in the customer information DB 5901 in a table form. In the customer information DB 5901, the administrator password, the user ID, the password, the display name, and the type of expenses are registered while associated with the administrator ID. The administrator ID is information for identifying an administrator. The administrator ID may be, for example, a mail address of an administrator. The administrator ID and the administrator password are authentication information for the administrator to log in to the administration server 40. The user ID represents a user U who is administered by the administrator. Here, "being administered" means that the corresponding unit U can register electronic data with the authority of the administrator. The password is a password of each user U. A user U is able to log in to the administration server 40 with the user ID and the password. The display name is a name for indicating a user U who logs in to the administration server 40 by the receipt application 60 of the multifunction peripheral 9. The type of expenses is a list of types of expenses of each user displayed by the receipt application 60.

Additionally, the administrator ID may be associated with the token A. As described above, the token A is the login completion information of the administrator. Once the administrator logs in, the token A is maintained for approximately one year. Upon detecting that the token A is transmitted, the administration server 40 allows the user to use the administration server 40.

TABLE 3

(a)

User ID: user1@sample.com

| Receipt ID | Date | Amount of money | Image |
|---|---|---|---|
| 1 | Mar. 13, 2016 | 1000 Yen | /.../use1/20160313-1.jpg |
| 2 | Mar. 13, 2016 | 3000 Yen | /.../use1/20160313-2.jpg |
| 3 | Mar. 18, 2016 | 8000 Yen | /.../use1/20160318-1.jpg |
| 4 | Mar. 21, 2016 | 2000 Yen | /.../use1/20160321-1.jpg |
| ... | ... | ... | ... |

(b)

| Report ID | Report name | Date of creation of report | Total amount of money | Status |
|---|---|---|---|---|
| 1 | Business trip to Hokkaido | Oct. 20, 2016 | 14000 Yen | Not submitted |
| 2 | Traveling expenses for June | Jun. 30, 2016 | 9800 Yen | Not Submitted |
| ... | ... | ... | ... | ... |

Table 3 (a) illustrates an example of information about each receipt registered with the electronic data DB 5902 in a table form. As the information about the receipt, the report ID, the receipt ID, the date, the amount of money, and the image are registered while associated with the user ID. For applying receipts by a user (e.g., an employee), it may be convenient for the employee and a company to aggregate the plurality of receipts. The report represents a unit of application for the plurality of receipts. A plurality of receipts that are highly related with each other are associated with a single report. As described below, a user U can register receipts on report-by-report basis. The date and the amount of money are results obtained by the character recognition process, and the image is image data of each receipt. A receipt ID is attached to each single receipt. The receipt ID is for managing the single receipt by the administration server 40. It is not necessary for the user U to aware of the receipt ID.

The Table 3(b) illustrates an example of report information of each report registered with the electronic data DB 5902 in a table format. As the report information, the report name, the date of creation of report, the total amount of money, and the status are registered while associated with the report ID. The report name is a name of the report that is provided by the user U. The date of creation of report represents the year, the month, and the date of creation of a new report by the user U. The total amount of money is a total of the amounts of money in the respective receipts in the report. The status represents a status of a report. As example of the status, there are "not submitted" representing that the application has not been completed, "applied" representing that the application has been completed, "application permitted" representing that the application is permitted by the company, and "returned" representing that the application is denied by the company.

TABLE 4

| Principal | Agent |
|---|---|
| userN@sample.com (President Taro) | user1@sample.com (Taro Suzuki) |

Table 4 illustrates an example of the information registered in the agent DB 5903 in a table form. In the agent DB 5903, the principal is associated with the agent, and the principal and the associated agent are registered. The principal is the user himself/herself, and the agent is the user U who represents the principal. For example, the principal may be a president and the agent may be a secretary. In such a case, a usage scenario can be considered such that the secretary registers a receipt on behalf of the president. Alternatively, for example, the principal may be a salesperson, and the agent may be a general clerk. In such a case, a usage scenario can be considered such that the general clerk registers a receipt on behalf of the salesperson.

Note that, a single user U may specify a plurality of other users U as the agents; and a single user U may be specified as agents by a plurality of other users U.

(Registration Server 40)

The registration server communication unit 52 is implemented by the CPU 301 depicted in FIG. 4 by executing a program to control the communication I/F 304. The registration server communication unit 52 communicates various types of information with the registration server 30.

The user authentication unit 51 is implemented by the CPU 301 depicted in FIG. 4 by executing a program. The user authentication unit 51 authenticates a user U. When a token A and a user ID are transmitted, the user authentication unit 51 determines that the administrator is to be logged in using the token A. Additionally, upon detecting that the user ID is registered with the customer information DB 5901, the user authentication unit 51 allows the user U to use the administration server 40. When a user ID and a password are transmitted, in response to detecting that the user ID and the password are registered in the customer information DB 5901, the user authentication unit 51 determines that authentication of the user U is established and allows the user U to user the administration server 40.

The administration server controller 53 is implemented by the CPU 301 depicted in FIG. 4 by executing a program. The administration server controller 53 controls the entire operation of the administration server 40.

The information registration unit 54 is implemented by the CPU 301 depicted in FIG. 4 by executing a program. The information registration unit 54 registers electronic data that includes no image and that is transmitted from the multifunction peripheral 9 through the registration server 30 and an image maintained in the registration server 30 with the electronic data DB 5902.

The server unit 55 is implemented by the CPU 301 depicted in FIG. 4 by executing a program. The server unit 55 operates as a Web server, and the server unit 55 provides a Web application. Namely, upon receiving a request from the user terminal 50, the server unit 55 transmits screen information described in a language, such as HTML, a script language, or Cascading Style Sheets (CSS).

<<User Terminal 50>>

The user terminal 50 includes a server communication unit 61; an operation receiver 62; and a display controller 63. Each of the functional units included in the user terminal 50 is a function or a unit implemented by operating any of the components depicted in FIG. 4 by a command from the CPU 301 in accordance with a program from the HDD 307 developed in the RAM 303 and the screen information transmitted from the server unit 55. The program may be distributed from a program distribution server, or may be distributed in a state in which the program is stored in a storage unit.

The server communication unit 61 is implemented by the CPU 301 depicted in FIG. 4 by executing a program with the screen information to control the communication I/F 304. The server communication unit 61 communicates with the administration server 40 in accordance with a communication protocol, such as HTTP and HTTPs.

The operation receiver 62 is implemented by the CPU 301 depicted in FIG. 4 by executing a program with the screen information to control the input device 305. The operation receiver 62 receives various types of operations on the user terminal 50 by a user U.

The display controller 63 is implemented by the CPU 301 depicted in FIG. 4 by executing a program with the screen information to control the display device 306. The display controller 63 parses the screen information transmitted from the administration server 40 to display a screen on the display device 306.

<Registration of the Agent>

Figure 7:
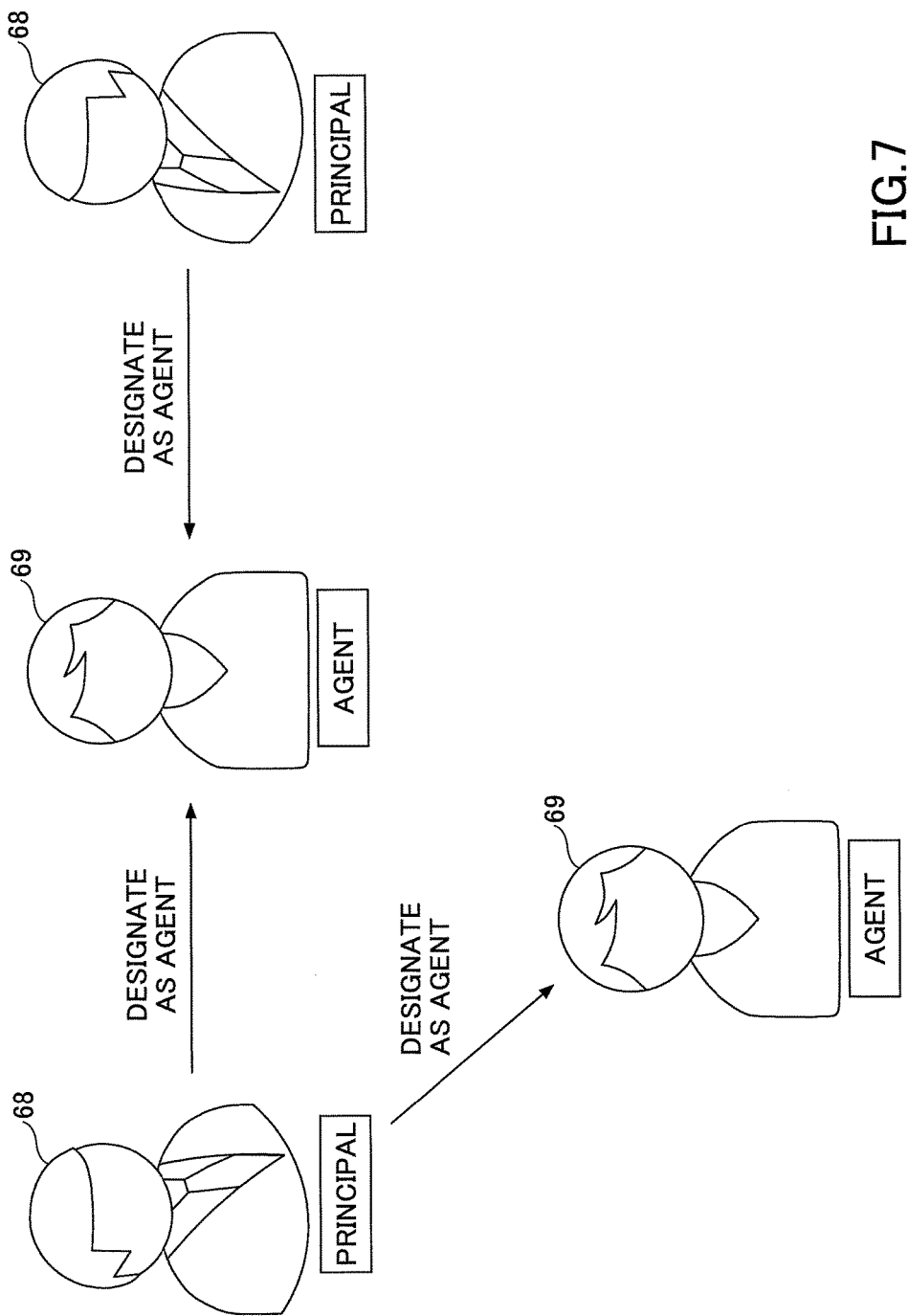
FIG. 7 is a diagram illustrating an example of relation between a principal and an agent.

FIG. 7 is a diagram illustrating an example of relation between a principal 68 and an agent 69. The relation between the principal 68 and the agent 69 is established by specifying, by the principal 68, a user U other than the principal 68. A user U who is the principal logs in to the administration server 40 with the user's right and specifies a user U other than the principal 68 as the agent 69 because the principal 68 may not be allowed to specify the agent 69 with the authority of the administrator. An e-mail that indicates the display name of the principal 68 and that indicates that the user U is specified as the agent 69 is transmitted to the specified user U. The user U specified as the agent 69 permits or rejects the designation. For example, the user U opens a Web page by clicking a uniform resource locator (URL) of the e-mail and presses Yes or No. When the user U presses Yes, the principal 68 is associated with the agent 69, and the principal 68 and the associated agent 69 are registered in the agent DB 5903 of the management server 40.

As illustrated in FIG. 7, a plurality of principals 68 may specify a single agent 69; and a single principal 68 may specify a plurality of agents 69.

<Operation Procedure for Authentication>

FIG. 8 is a sequence diagram illustrating an example of a procedure for authenticating a user U by the administration server 40.

S1: The user U places an IC card in a close proximity to the multifunction peripheral 9. At this time point, the multifunction peripheral 9 displays a lock screen 401, and the user U is allowed to use only a part of the functions of the multifunction peripheral 9, such as a function for authenticating the user U. FIG. 9A illustrates an example of the lock screen 401.

S2: The authentication processor 32 determines whether the authentication is established by comparing the obtained IC card information with the user information DB 3901. Here, it is described on the assumption that the authentication is established. In response to the login to the multifunction peripheral 9 by the user U, a home screen 411 depicted in FIG. 9B is displayed on the operations panel 27.

S3: The authentication processor 32 retrieves the user ID of the authenticated user U from the user information DB 3901.

S4: The user U presses the receipt application 60 in the home screen 411. The operation receiver 34 receives the operation by the user U of pressing the receipt application 60, and thereby the receipt application 60 is activated. As a result, a start screen 421 depicted in FIG. 9C is displayed.

S5: The multifunction peripheral controller 35 obtains a current authentication mode (locked, logged in, etc.) from the authentication processor 32.

S6: As the current authentication mode is a logged-in mode, the multifunction peripheral controller 35 obtains the user ID of the logged-in user U from the authentication processor 32.

S7: The multifunction peripheral controller 35 transmits a user ID of the user U logged-in to the multifunction peripheral 9 as a login request. When the multifunction peripheral 9 communicates with the registration server 30, more precisely, the multifunction peripheral controller 35 executes communication using the transceiver 31 of the main body 10. However, for simplicity, this procedure is omitted. The same applies to the communication described below.

S8: The multifunction peripheral communication unit 43 of the registration server 30 receives the user ID and the login request, and the multifunction peripheral communication unit 43 transmits the user ID and the login request to the server controller 44. Upon detecting that the login request is received, the server controller 44 transmits a request for obtaining a display name to the administration server 40 together with the user ID and the token A. The registration server communication unit 52 of the administration server 40 receives the request for obtaining the display name, and the administration server controller 53 obtains the user ID and the token A. The administration server controller 53 allows the user U to use the administration server 40 based on the token A, and the administration server controller 53 reads out the display name associated with the user ID from the customer information DB 5901. The registration server communication unit 52 of the administration server 40 transmits the display name to the registration server 30.

S9: When the user U presses a "start adjustment of expenses" button 422 on the start screen 421, the operation receiver 34 receives the operation, and the display controller 36 of the receipt application 60 displays a menu screen 441 depicted in FIG. 10B on the operations panel 27.

S10: The administration server communication unit 47 of the registration server 30 receives the display name, and the administration server communication unit 47 of the registration server 30 transmits the display name to the server controller 44. Upon receiving the display name, the server controller 44 determines that the user U is allowed to use the administration server 40 because the user ID is registered with the administration server 40. Then, the server controller 44 creates a session ID1 for specifying a session, and the server controller 44 associates the token A with the session ID1 and the user ID. Further, the multifunction peripheral communication unit 43 transmits the session ID 1 and the display name to the receipt application 60. The display controller 36 of the receipt application 60 displays the menu screen 441 while arranging display names in respective items of the screen corresponding to the button pressed by the user U.

S11: Upon receiving the display name, the server controller 44 of the registration server 30 requests a group policy from the administration server 40. A group policy is a rule for registration of a receipt of a user U. For example, a group policy may define an item name (e.g., a type of expenses) to be displayed by the receipt application 60. The registration server communication unit 52 of the administration server 40 transmits, to the registration server 30, text to be used for an item (e.g., a type of expenses) as the group policy.

S12: The server controller 44 of the registration server 30 retrieves an initial value of the type of expenses from the text used for the item of the screen.

As described above, when a user U logs in to the multifunction peripheral 9 using an IC card, the registration server 30 communicates with the administration server 40 using the token A. Consequently, the user U can register a receipt to the administration server 40 with a single authentication operation.

<Screen Example>

FIG. 9A illustrates an example of the lock screen 401. FIG. 9B illustrates an example of the home screen 411. FIG. 9C illustrates an example of the start screen 421. In the lock screen 401, a message 402 is displayed together with an icon 403. The message 402 indicates that an IC card is to be placed in a close proximity to the reader/writer. As a result, a user U can find that the IC card is to be placed in the close proximity to the reader/writer for releasing the lock screen 401. In the home screen 411, an icon 412 representing the receipt application 60 is displayed. In many cases, icons representing a plurality of applications are displayed. However, in FIG. 9B, icons representing applications other than the receipt application 60 are omitted.

In the start screen 421, the "start adjustment of expenses" button 422 and an "administrator setup button" 423 are displayed. The "start adjustment of expenses" button 422 is a button for displaying the menu screen 441. The administrator setup button 423 is a button for displaying a screen for setting up, by an administrator, a network configuration and an administrator's password.

Here, when no display name is detected that is associated with the user ID at step S8 of FIG. 8, information indicating that no user ID is found is transmitted to the receipt application 60 from the administration server 40 through the registration server 30. In this case, the receipt application 60 displays, for example, a login screen 431 depicted in FIG. 10A. The login screen 431 includes a login ID field 432 and a password field 433. Even if there is no user ID that is associated with the administrator ID (token A) in the administration server 40, the user U might have registered a combination of another user ID and another password with the administration server 40. In this case, the user U can log in to the administration server 40 by performing a second authentication operation for inputting the own user ID and password after logging in to the multifunction peripheral 9 using the IC card.

Figure 10B:
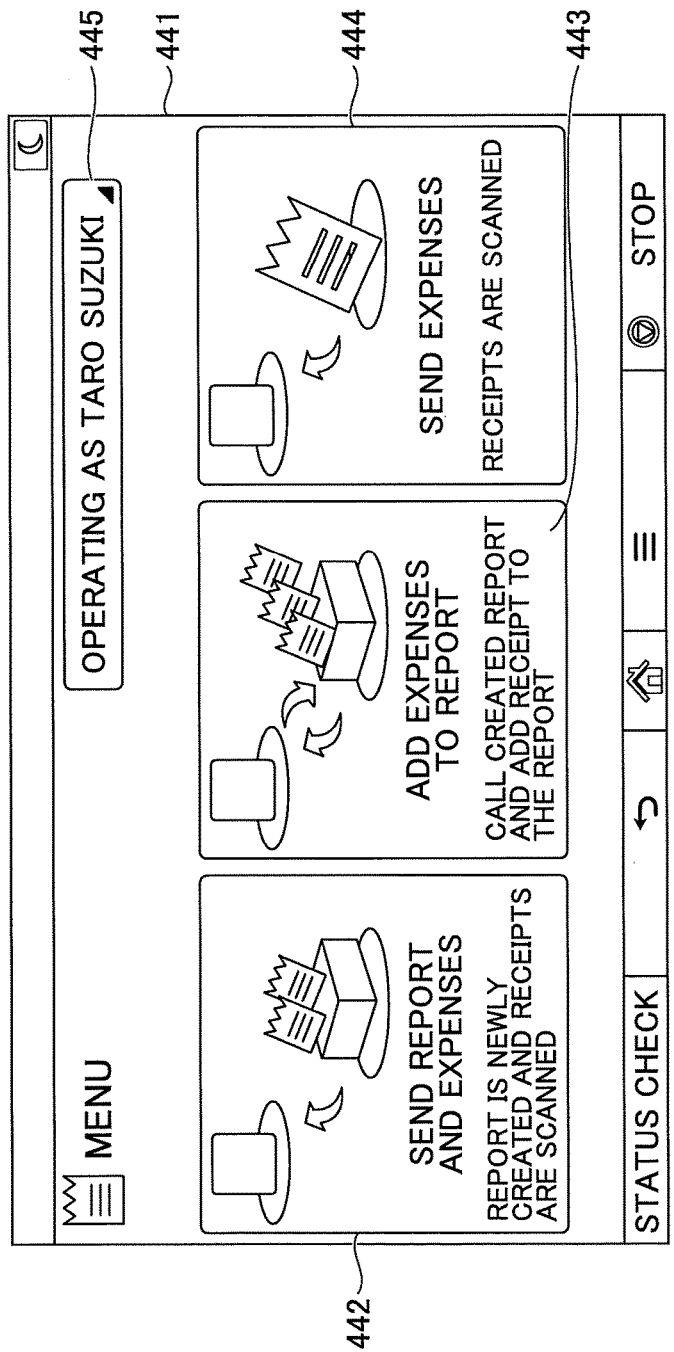
FIG. 10B is a diagram illustrating an example of a menu screen.

FIG. 10B illustrates an example of the menu screen 441. The menu screen 441 includes three buttons, which are a "send report and expenses" button 442, an "add expenses to report" button 443, and a "send expenses" button 444. The "send report and expenses" button 442 is a button for the user U to newly create a report and to further register (scan) one or more receipts. The "add expenses to report" button 443 is a button for adding a receipt to a created report. The "send expenses" button 444 is a button for registering one or more receipts without associating the one or more receipts with a report.

Additionally, the menu screen 441 includes a display name field 445. In the display name field 445, a display name of a user U retrieved from the administration server 40 is displayed. Namely, the display name of the user U logged-in to the multifunction peripheral 9 is displayed.

<The Operation when the "Send Report and Expenses" Button is Pressed>

Figure 12:
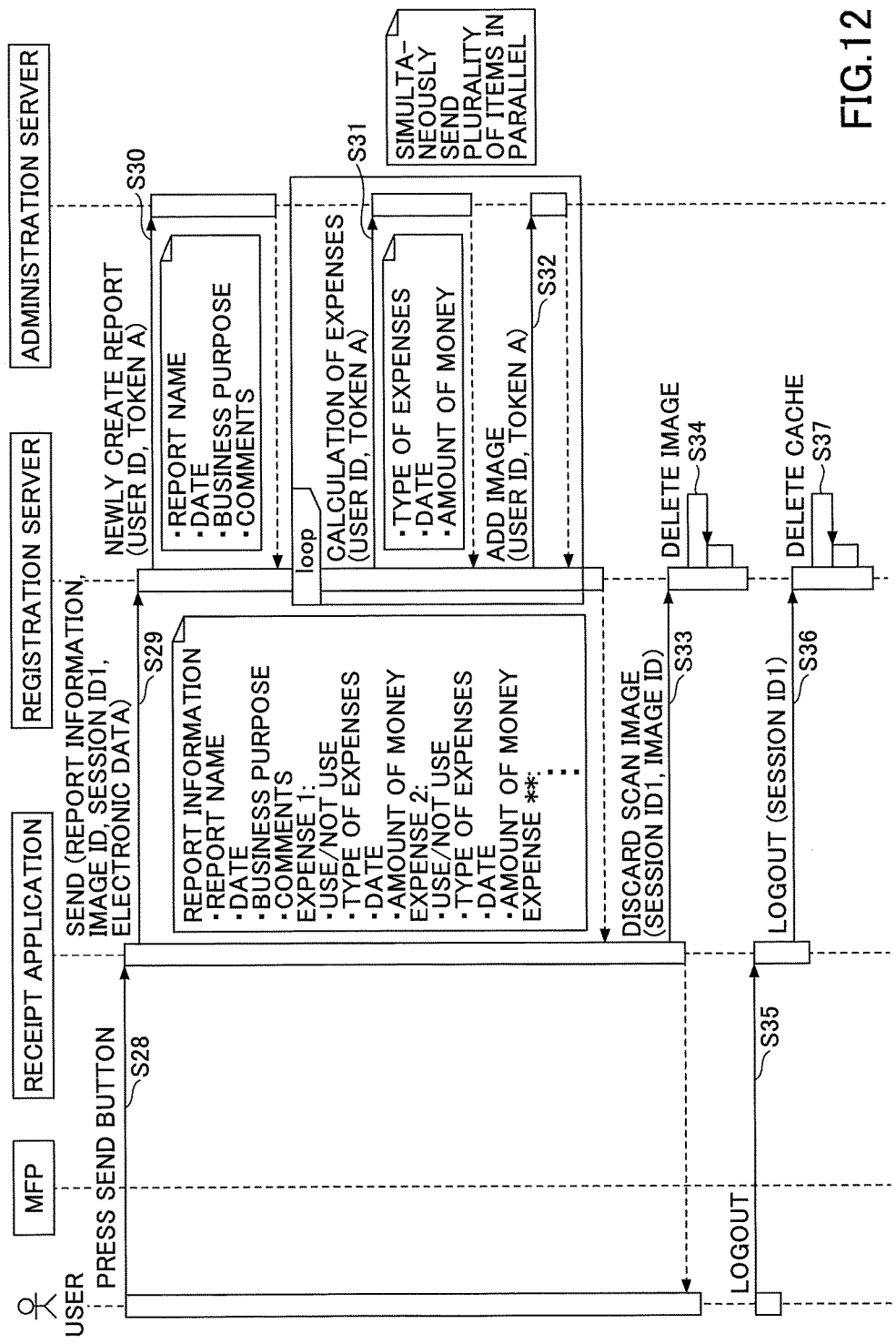
FIG. 12 is a sequence diagram illustrating an example of a procedure of the multifunction peripheral to register electronic data of a receipt to the administration server.

FIG. 11 and FIG. 12 are sequence diagrams illustrating an example of a procedure for the multifunction peripheral 9 to register electronic data of receipts with the administration server 40.

S13: Among the three buttons in the menu screen 441, a user U presses the "send report and expenses" button 442, and the operation receiver 34 receives the operation by the user U to press the "send report and expenses" button 442.

S14: The multifunction peripheral controller 35 of the receipt application 60 requests a list of a type of expenses from the registration server 30 to retrieve the list of the type of expenses and an initial value from the registration server 30. As a result, the display controller 36 of the receipt application 60 displays a new report creation screen 451. FIG. 13A illustrates an example of the new report creation screen 451.

Figure 13B:
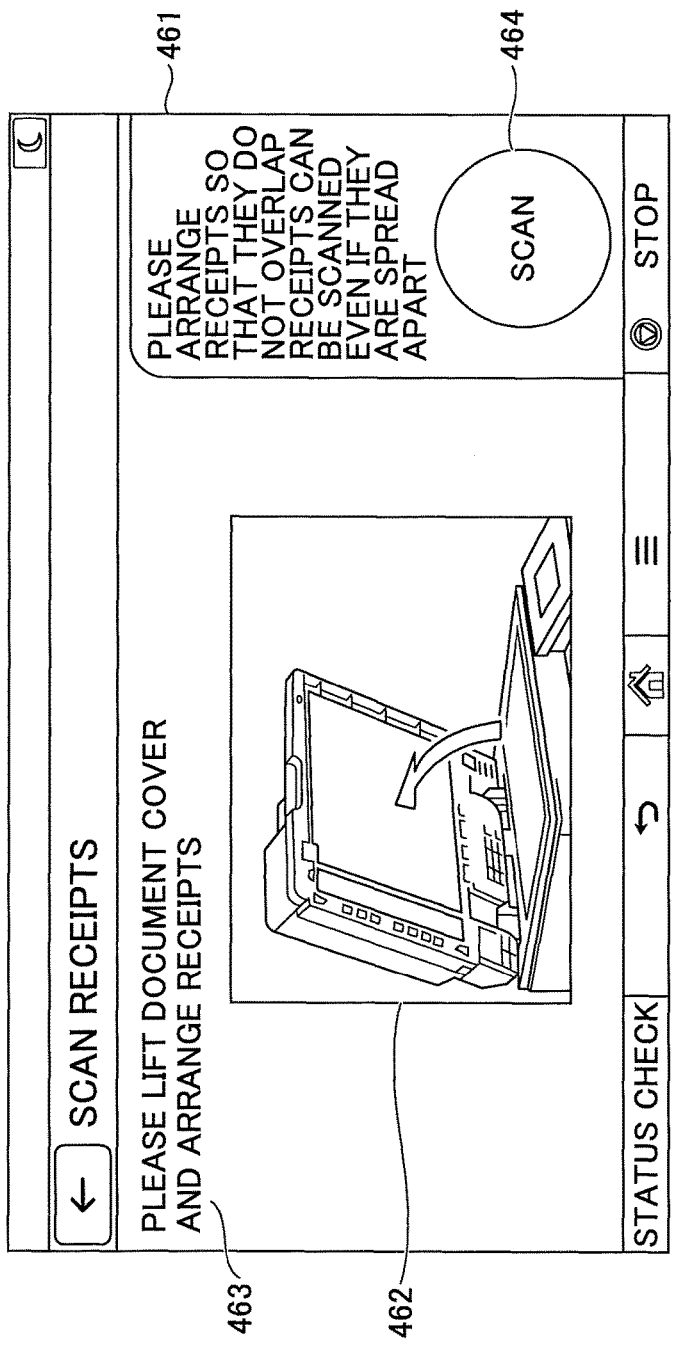
FIG. 13B is a diagram illustrating an example of a scan screen.

S15: When the user U inputs necessary items to cause the screen to transition, the display controller 36 displays a scan screen 461. FIG. 13B illustrates an example of the scan screen 461.

Figure 14A:
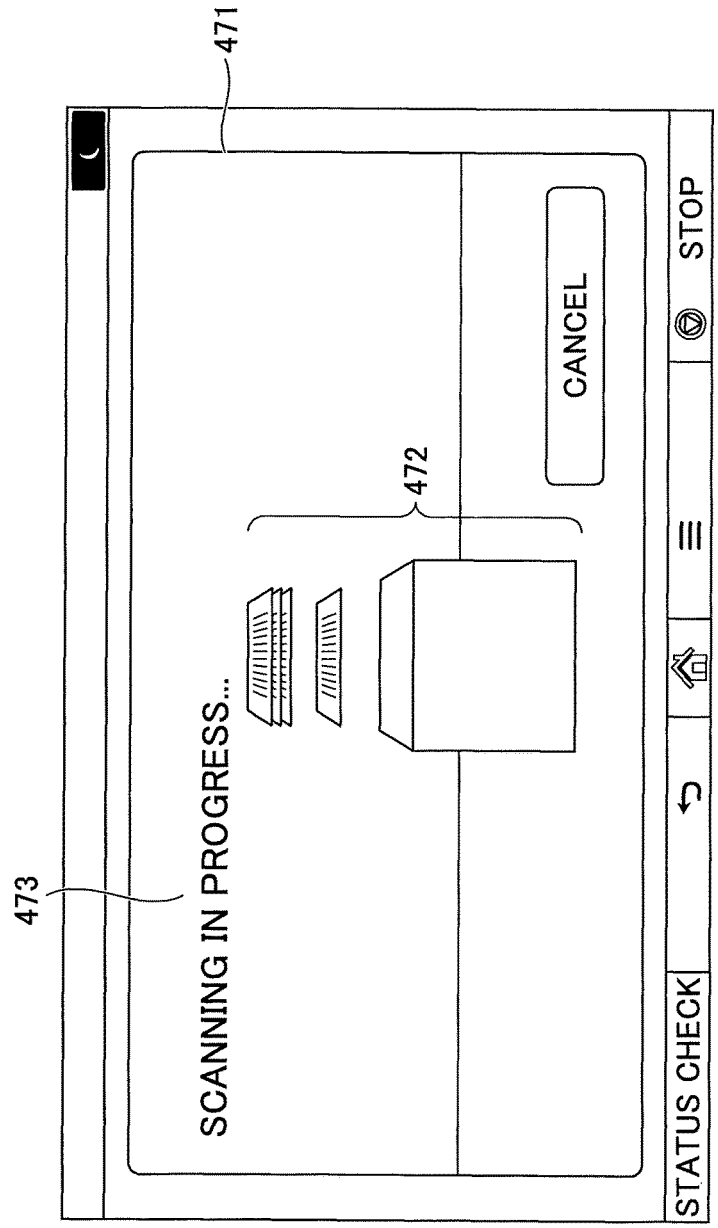
FIG. 14A is a diagram illustrating an example of a scan-in-progress screen.

S16: When the user U places a plurality of receipts on a contact glass (which is an arrangement region for physically arranging the receipts to be scanned, and which is a reading region to be scanned by the scanner device), the user U presses a scan button, and the operation receiver 34 receives the operation, the multifunction peripheral controller 35 of the receipt application 60 indicates the scanner 33 of the main body 10 to execute scanning. The multifunction peripheral controller 35 retrieves image data including a plurality of images of receipts. Note that, in response to detecting that the user U presses the scan button, the display controller 36 displays a scan-in-progress screen 471. FIG. 14A illustrates an example of the scan-in-progress screen 471.

S17: The multifunction peripheral controller 35 transmits, to the registration server 30, an image processing request together with the session ID1 and the image data.

S18: The multifunction peripheral communication unit 43 of the registration server 30 receives the image processing request together with the session ID 1 and the image data, and the multifunction peripheral communication unit 43 transmits, to the server controller 44, the image processing request together with the session ID and the image data. In response to receiving the image processing request, the server controller 44 determines that each of the receipts can be extracted. The extraction unit 42 extracts each of the receipts from a single image data item. The extraction is described below by referring to FIG. 15 and FIG. 16.

S19: After completing the extraction, the server controller 44 transmits an image ID and a total number of the receipts to the receipt application 60. The image ID is information for identifying the image data including the plurality or receipts. The transceiver 31 of the multifunction peripheral 9 receives the image ID and all the receipts.

S20: Next, the server controller 44 causes the recognition processor 41 to execute a character recognition process for the image of each of the receipts. Additionally, the server controller 44 causes the image creator 45 to generate a thumbnail of the image.

Figure 14B:
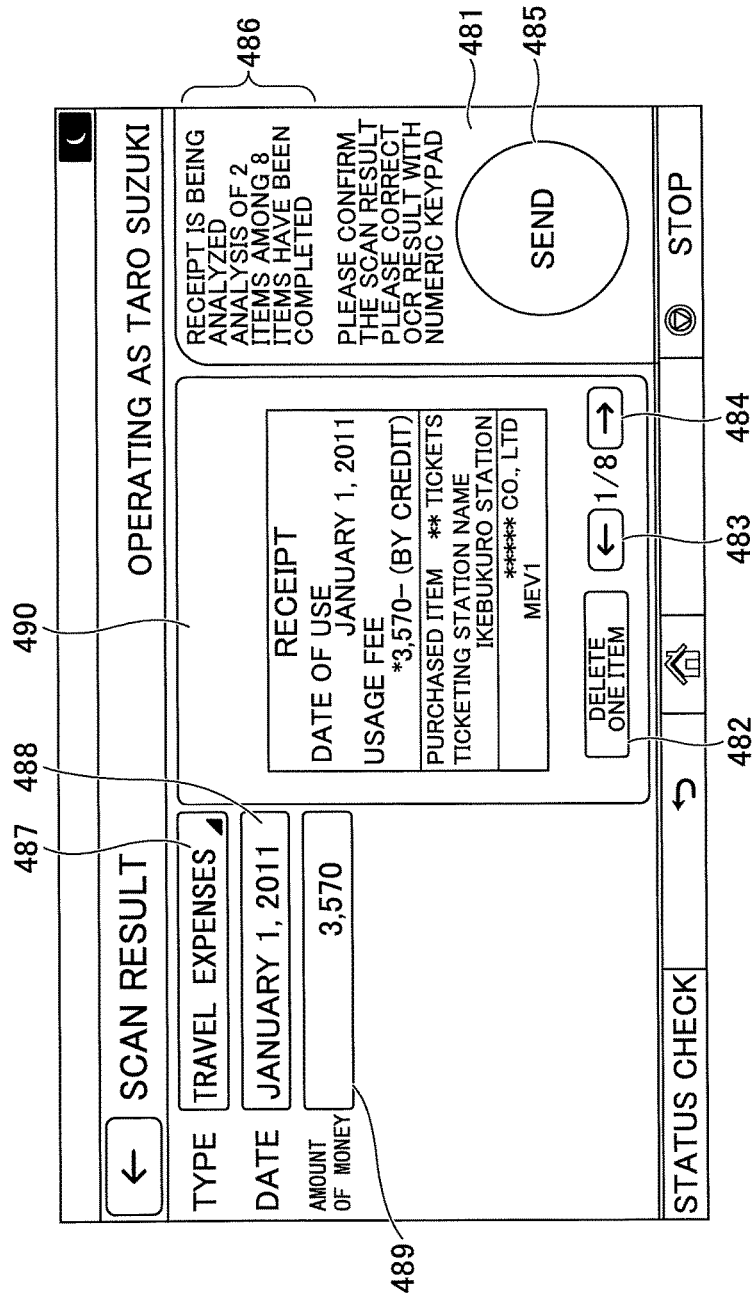
FIG. 14B is a diagram illustrating an example of a result display screen.

S21: The receipt application 60 specifies the image ID to request the images of the receipts from the registration server 30. As the multifunction peripheral 9 requests the images, the registration server 30 can transmit the images through a firewall. Each of the electronic data items includes an amount of money, a date, and an image (a thumbnail image); and positions of the amount of money and the date, which are described below. In response to receiving the electronic date item, the display controller 36 of the receipt application 60 displays a result display screen 481. FIG. 14B illustrates an example of the result display screen 481.

S22, S23, and S26: The server controller 44 of the registration server 30 executes, sequentially for all the images, the character recognition process and a process of creating a thumbnail image. Instead of executing sequentially, threads of processes for the plurality of receipts may be executed in parallel.

S24: The multifunction peripheral controller 35 of the receipt application 60 continues to sequentially request the registration server 30 to send the electronic data item of each of the receipts by specifying the corresponding image ID until the image data items of all the receipts are obtained. Upon receiving a new electronic data item, the display controller 36 of the receipt application 60 updates the result display screen 481.

S25, S27: By pressing a forward button 484 in the result display screen 481, the user U can switch the electronic data to display the updated electronic data. The multifunction peripheral controller 35 of the receipt application 60 counts a number of the received electronic data items; and, upon detecting that the electronic data items of all of the receipts are received, the multifunction peripheral controller 35 allows a transmission button 485 to be pressed. As a result, the user U becomes able to send the electronic data items of the receipts (and information indicating that the reception of the electronic data is completed) to the registration server 30. In other words, the information indicating that the reception of all of the electronic data items is completed can be transmitted to the registration server 30.

S28: The user U presses the transmission button 485 in the result display screen 481.

S29: The operation receiver 34 receives an operation, and the multifunction peripheral controller 35 transmits, to the registration server 30, the electronic data items of the receipts together with report information, the image ID, and the session ID1. The report information is input in the new report creation screen 451, and the report information may include, for example, a name of the report, a date (a date of creation of the report, instead of the date of the receipt), a purpose of the business, and comments. Further, each of the electronic data items may include "to use/not to use," "type of expenses," "date," and "amount of money." The image of the corresponding receipt is not included in the corresponding electronic data item. The reason is that the image of the corresponding receipt can be identified by the image ID. As a result, the communication time can be reduced. The "to use/not to use" indicates whether the electronic data item of the receipt is to be registered (which is selected by the user U).

S30: The multifunction peripheral communication unit 43 of the registration server receives the electronic data items of the receipts (which do not include the thumbnail images)

together with the report information, the image ID and the session ID1. The server controller 44 transmits, to the administration server 40, a request for newly creating a report together with the user ID and the token A, which are identified by the session ID1.

S31: In response to receiving the report, the server controller 44 of the registration server 30 identifies images of the corresponding receipts using the image ID through the administration server communication unit 47; and, for each electronic data item with the value "to use," the server controller 44 of the registration server 30 transmits, to the administration server 40, a request for calculating the expenses together with the type of the expenses, the date, and the amount of the money. In this case, the user ID and the token A are attached to the request for calculating the expenses.

S32: Next, the server controller 44 of the registration server 30 transmits, to the administration server 40 through the administration server communication unit 47, the image of the receipt for which the request for calculating the expenses has been transmitted. Namely, the electronic data item in step S31 and the image in step S32 are paired. Note that the image is not a thumbnail, and the image is the original image extracted by the extraction unit 42. As a result, the administration server 40 can store the image of the receipt with less deterioration in image quality. The server controller 44 of the registration server 30 repeats steps S30 and S31 by the total number of the receipts.

S33: In response to detecting that the completion of the registration of the electronic data items corresponding to the total number of the receipts is reported, the multifunction peripheral controller 35 of the receipt application 60 requests the registration server 30 to discard the image data by specifying the image ID while including the session ID1.

S34: The multifunction peripheral communication unit 43 receives the session ID1, the image ID, and the discard request, and the server controller 44 discards the image data and all the images (which include the thumbnails) specified by the image ID.

S35: The user U logs out.

S36: The authentication processor 32 of the main body 10 receives a logout request, and the authentication processor 32 transmits the logout request together with the session ID1 to the registration server 30.

S37: The server controller 44 of the registration server 30 deletes the session ID1 and the user ID. As a result, even if the user U attempts to operate the multifunction peripheral 9, the multifunction peripheral 9 is unable to communicate with the registration server 30; however, the registration server 30 maintains the token A (i.e., the registration server 30 can communicate with the registration server 40).

<Examples of the Screens>

FIG. 13A illustrates an example of the new report creation screen 451. FIG. 13B illustrates an example of the scan screen 461. The new report creation screen 451 includes a report name field; a report date field 453; a business purpose field 454; and a comment field 455. The user U may input, at least, a report name into the report name field 452. The date in the report date field 453 indicates the creation date of the report.

The scan screen 461 includes an icon 462 for prompting a user U to place receipts on the contact glass; a message 463 for prompting the user U to place the receipts on the contact glass; and the scan button 464. The user U arranges the receipts on the contact glass surface and presses the scan button 464; however, the user U does not close the cover of the multifunction peripheral 9. As a result, a part of the image data where no receipt is placed is imaged with black pixels, and thereby the extraction unit 42 is facilitated to extract each of the receipts.

FIG. 14A illustrates an example of a scan-in-progress screen 471. FIG. 14B illustrates an example of the result display screen 481. The scan-in-progress screen 471 includes an icon 472 indicating that scanning is in progress; and a message 473 indicating that scanning is in progress.

The result display screen 481 includes a type field 487; a date field 488; a money amount field 489; an image field 490; the forward button 484; a return button 483; a delete button 482; the transmission button 485; and progress information 486. In the type field 487, a list of a type of expenses is displayed; and if the user U does not operate the type field 487, the initial value is displayed. In the date field 488 and the money amount field 489, the date and the amount of money are displayed, respectively, which are the result of the character recognition. The image field 490 is a field for displaying an image; and, in the image field 490, an image (a thumbnail image) of a receipt is displayed. The forward button 484 is a button for causing the registration server 30 to display, among a plurality of receipts, an electronic data item of a receipt for which a character recognition process and creation of a thumbnail image are completed immediately after the completion of the character recognition process and the creation of the thumbnail image for the currently displayed receipt. The return button 483 is a button for causing the registration server 30 to display, among a plurality of receipts, an electronic data item of a receipt for which a character recognition process and creation of a thumbnail image are completed immediately prior to the completion of the character recognition process and the creation of the thumbnail image for the currently displayed receipt. The delete button 482 is a button for a user U to delete an electronic data item. This electronic data item is determined to be the electronic data item with the value "not to use," and it is reported to the registration server 30 that this electronic data item is determined to be the electronic data item with the value "not to use."

The transmission button 485 is a button for the multifunction peripheral 9 to receive an indication, by a user U, to transmit the electronic data items corresponding to the total number of the receipts to the registration server 30. Prior to completion, by the receipt application 60, of reception of the electronic data items corresponding to the total number of the receipts from the registration server 30, the transmission button 485 is displayed in a state in which the brightness is lowered (or in a semi-transparent state), or the transmission button 485 is not displayed. The state in which the brightness is lowered represents a mode in which the transmission button 485 is incapable of being pressed, and if the user U presses the transmission button 485 in this state, the operation receiver 34 ignores pressing of the transmission button 485. After completing the reception of the electronic data items corresponding to the total number of receipts, the multifunction peripheral controller 35 displays the transmission button 485 in a state with normal brightness in which the transmission button 485 can be pressed.

The progress information 486 indicates a number of electronic data items received by the receipt application 60, among the electronic data items corresponding to the total number of the receipts. In the message "M out of N," the display controller 36 assigns the total number of the receipts to N and assigns the number of the electronic data items received from the registration server 30 so far to M. The "M" is sequentially updated each time the receipt application 60 receives the electronic data item from the registration server 30. During the waiting time, the user U can find the degree of the progress of the process by the progress information 486. Thus, by the progress information 486, the multifunction peripheral 9 can report to the user U whether the process successfully proceeds.

When the user presses the date field 488, the operation receiver 34 detects that the date field 488 is pressed, and the display controller 36 displays soft keys (a numeric keypad) corresponding to 0 through 9 on the operations panel 27. Further, the display controller 36 obtains the position of the date from the metadata attached to the image, and the display controller 36 places the image by aligning the position of the date of the image with the center of the image field 490. As a result, when the user edit the date, the date of the image is automatically displayed at the center, and the user can easily confirm the date. The same applies to a case where the money amount field 489 is pressed.

Further, when the display controller 36 displays the date and the amount of money, the display controller 36 may magnify the image and display the magnified image at the center of the image field 490. By magnifying the image, the user U can easily confirm the date and the amount of money, even if the operations panel 27 is small.

<Extraction of Each Receipt from the Image Data>

Figure 15A:
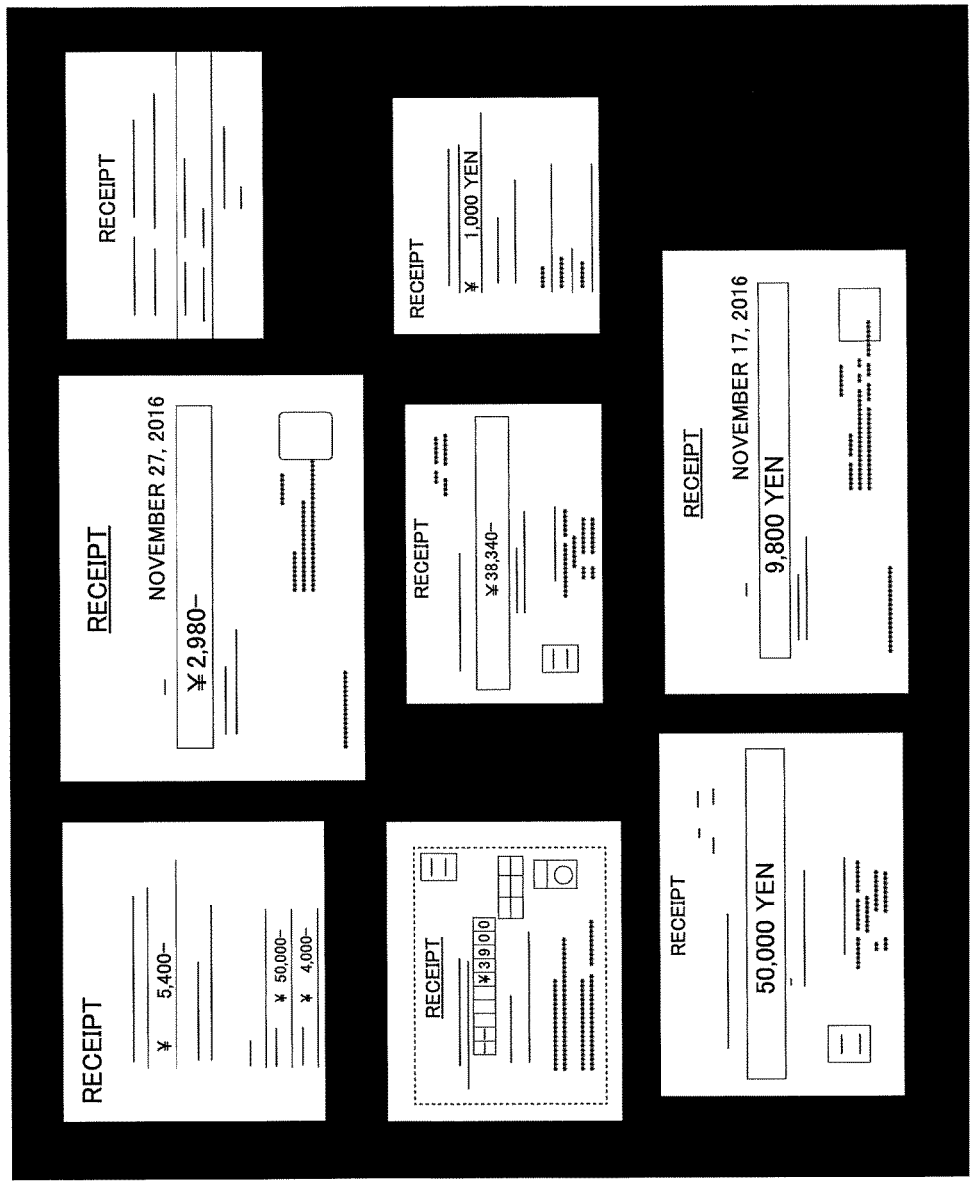
FIG. 15A is a diagram illustrating an example of image data including a plurality of receipts.
Figure 15B:
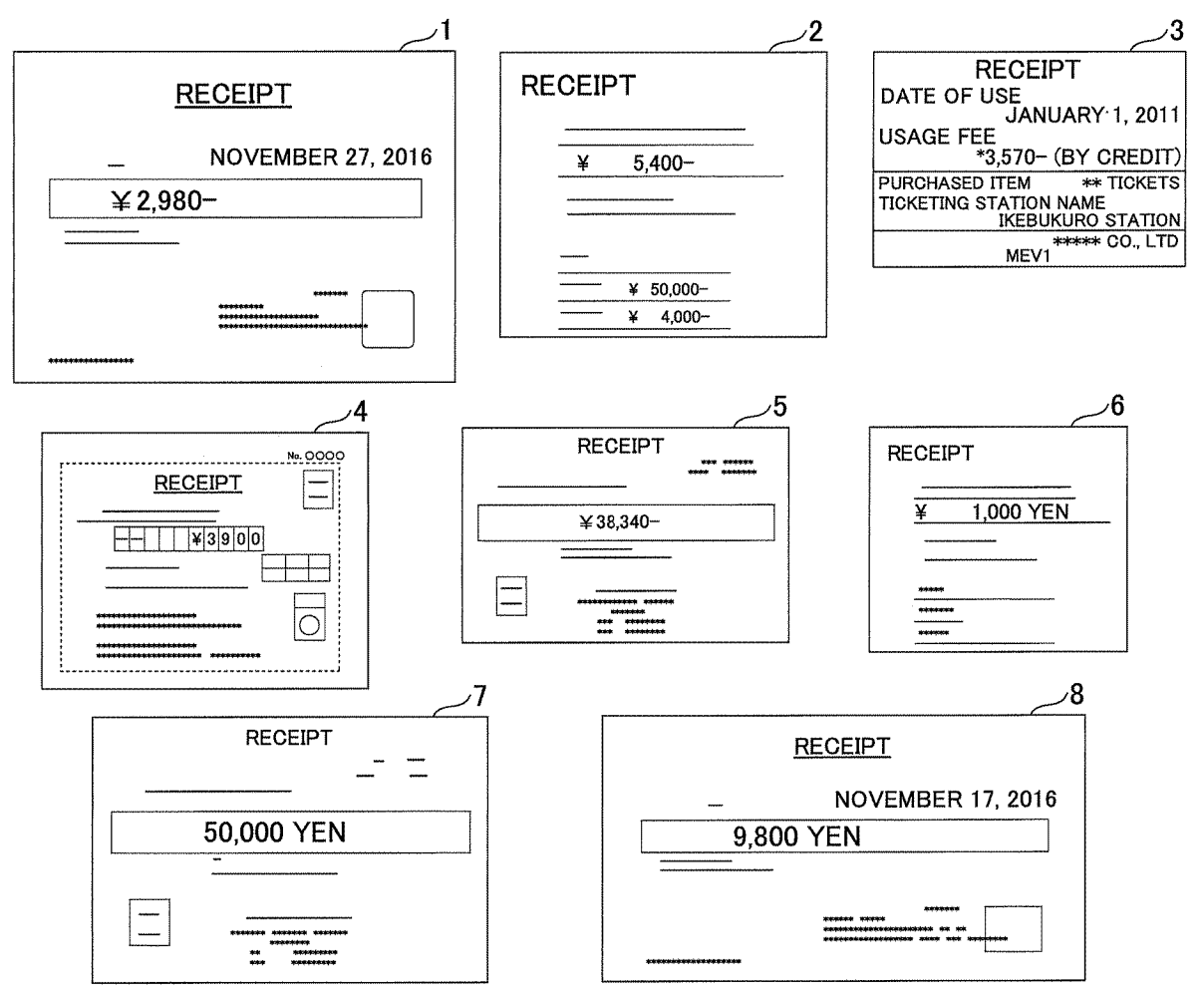
Figure 16:
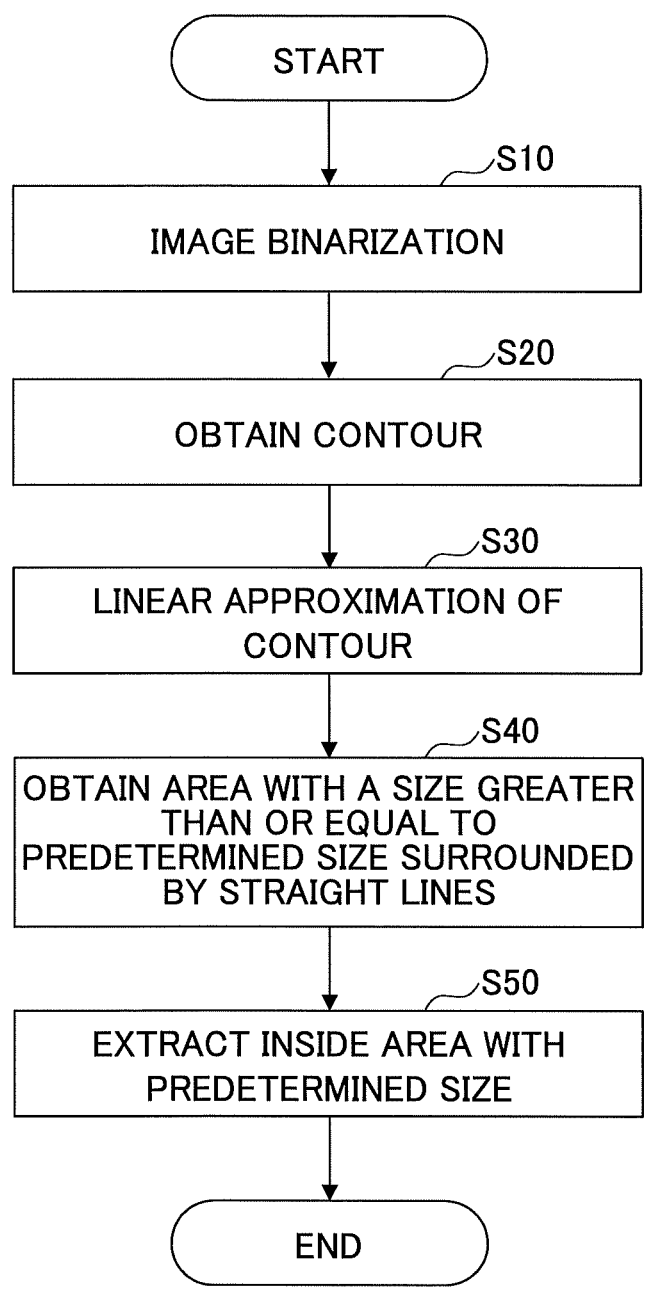
FIG. 16 is a flowchart illustrating an example of a procedure of an extraction unit to detect a receipt.

Next, extraction of each receipt from the image data is described by referring to FIG. 15 and FIG. 16. FIG. 15A is a diagram illustrating an example of the image data including the plurality of receipts. FIG. 16 is a flowchart illustrating an example of a procedure for detecting the receipts by the extraction unit 42.

It suffices if the extraction unit 42 extracts the portions other than the consecutive black pixels because the plurality of receipts are surrounded by the consecutive black pixels. First, the extraction unit 42 binarizes the image data with a predetermined threshold value (S10). The threshold value may preferable close to the pixel value of the black pixel (the pixel value is 0) because it suffices if the consecutive black pixels can be separated from the other portions.

Next, the extraction unit 42 obtains a contour (S20). As a method for obtaining the contour, a method for detecting a vertical edge and a horizontal edge has been known. By the edge detection, the boundaries between the receipts and the black pixels, and the characters can be detected.

Next, the extraction unit 42 approximates the contour by straight lines (S30). There are several methods for detecting the straight lines. For example, a known method may be used, such as Hough transform.

Next, the extraction unit 42 obtains an area surrounded by the straight lines that has a size that is greater than or equal to a predetermined size (S40). First, by extracting straight lines longer than a predetermined length, the straight lines at the boundaries between the consecutive black pixels and the receipts are narrowed down. Next, intersecting straight lines are traced. If the original straight line is detected again, it can be determined that the traced lines surround an area. By the condition that the area has the size that is greater than or equal to the predetermined size, it can be suppressed that a character or a symbol within a receipt is detected. The threshold value of step S40 can be determined based on the minimum size of the receipt.

Then, the extraction unit 42 extracts information inside the area with the predetermined size (S50). As a result, the receipts can be extracted from the image data.

As illustrated in FIG. 15B, the extraction unit 42 assigns numbers to the images, of the receipts, respectively, in an order from the top left, for example. The maximum number (8 in the figure) is the total number of the receipts. The numbers may be assigned in any order. The numbers may be assigned in an order from the top light, from the bottom right, from the bottom left, or from the middle. Alternatively, the numbers may be randomly assigned. Alternatively, the numbers may be assigned in an order of the size (in a descending order of the number of the pixels, or in an ascending order of the number of the pixels). Alternatively, the numbers may be assigned in an ascending order of the number of the edges. When the size is small or the number of the edges is small, it can be expected that the character recognition process is completed in a shot time, and that the waiting time of the user U can be reduced.

<Character Recognition Process>

Figure 17:
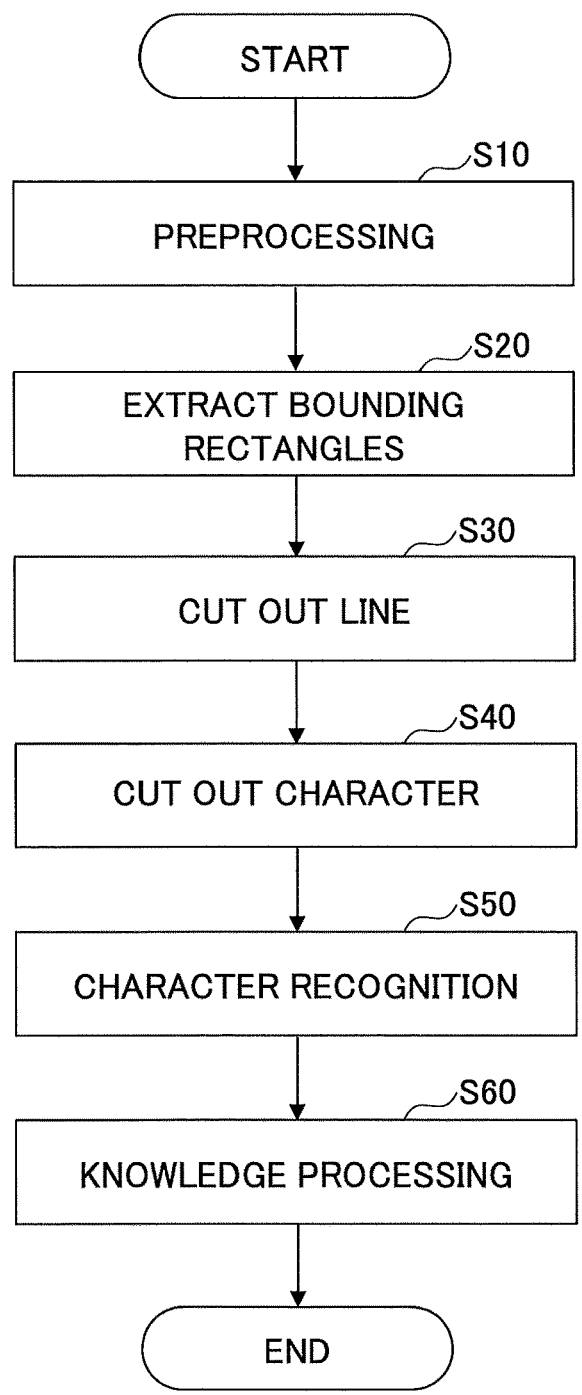
FIG. 17 is a flowchart illustrating an example of a procedure of a recognition processor of the registration server to execute a character recognition process.

FIG. 17 is a flowchart illustrating an example of a procedure for the recognition processor 41 of the registration server 30 to execute a character recognition process. The recognition processor 41 executes the character recognition process for the receipts extracted by the extraction unit 42 one by one.

Figure 18A:
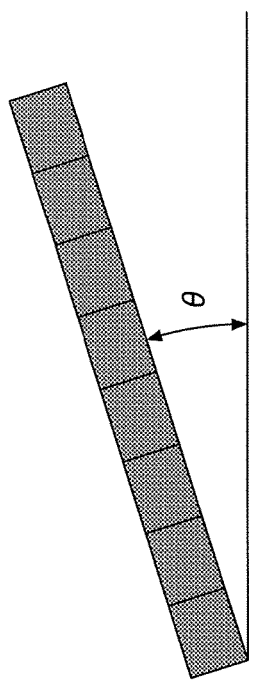
FIGS. 18A-18D are diagrams illustrating examples of the character recognition process.
Figure 18B:
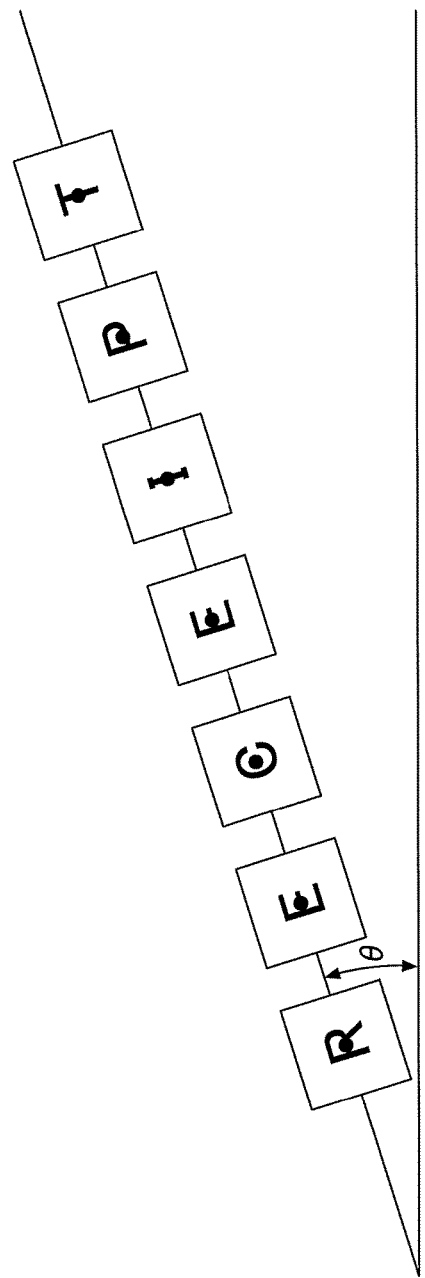

First, the recognition processor 41 executes preprocessing on the receipt (S10). The preprocessing may be, for example, binarization processing, skew correction processing, and top and bottom recognition. In order to detect a skew of the image data, in general, a ruled line or a plurality of consecutive characters are used. For example, when the ruled line is to be used, the ruled line can be extracted by extracting a black run in which black pixels continue more than a predetermined number in the main scanning direction or in the sub-scanning direction (FIG. 18A).

When the characters are to be used, the centers of bounding rectangles are obtained for some characters, and a skew is calculated by approximating the centers of the adjacent bounding rectangles by a straight line (FIG. 18). A bounding rectangle of a character can be detected by searching for consecutive black pixels. Considering a character in which the left-hand side of the character and the right-hand side of the character are separated from each other, black pixels within a predetermined distance are regarded as one character.

The recognition processor 41 applies an affine transformation to the ruled line or the characters, so that the inclination e of the line of the ruled line or the characters with respect to the main scanning direction or the sub-scanning direction becomes zero. By the skew correction processing, even if the user U places the receipt on the contact glass randomly, the extraction unit 42 can correct the skew.

In the top and bottom recognition, one or more characters to which the character recognition process is applied are selected based on the aspect ratio of each of the one or more characters. Even if characters, such as "–" and "1," are recognized, these characters are excluded because it is difficult to specify a direction of such a character. Furthermore, small characters such as "." and "," are excluded. The recognition processor 41 recognizes approximately 100 characters to which the character recognition process is applied. The character recognition process is repeated while changing the direction of the characters by 90 degrees each time. For each of the directions, a degree of accuracy of the character recognition is detected, and the detected degrees of accuracy are compared. Then, the top and bottom correction is applied, so that the direction corresponding to the largest degree of accuracy becomes the north direction. By the top and bottom recognition, even if the user U places all the receipts on the contact glass without aligning the top and the bottom, the recognition processor 41 can correct the top and the bottom of each of the receipts.

Figure 18C:
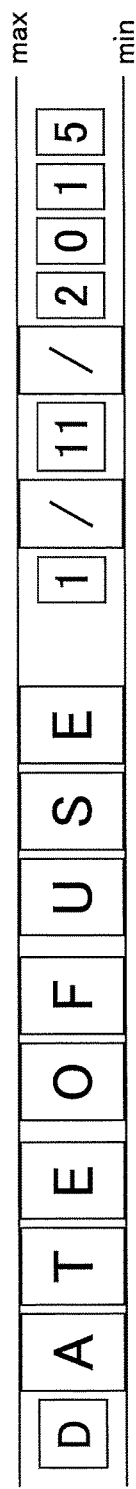

Next, the recognition processor 41 obtains a bounding rectangle of the black pixels (S20). The method for obtaining the bounding rectangle may be the same as the above-described method. Then, a plurality of bounding rectangles with approximately the same height (for horizontal writing) are cut out as one line (S30). FIG. 18C illustrates an example of the extracted one line. Among the plurality of bounding rectangles with approximately the same height, a distance from a bottom edge "min" of the bounding rectangle at the lowest position to an upper edge "max" of the bounding rectangle at the highest position may be defined to be the height of the one line. For vertical writing, a plurality of bounding rectangles with approximately the same width is cut out as one line.

Figure 18D:
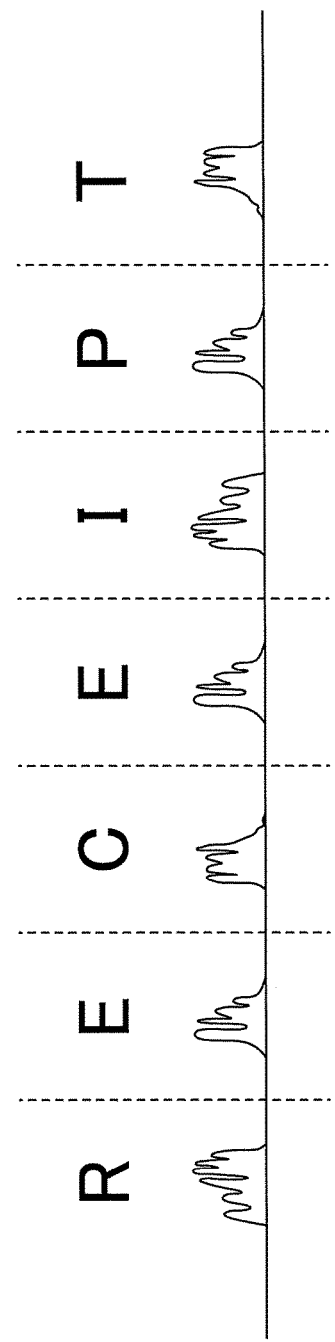

Next, the recognition processor 41 further cut out individual characters from the cut line (S40). As depicted in FIG. 18D, for each line, a histogram representing black pixels with respect to pixel positions can be obtained. From the histogram, it can be seen that the frequency becomes zero at a boundary between characters. Thus, using such a histogram, characters can be cut out.

Next, the recognition processor 41 executes a character recognition process (S50). Specifically, processes of normalization, feature extraction, and matching are executed. The normalization is a process of scaling one cut out character to be a predetermined size (a square for Japanese language, in general). As a result, deformation (e.g., a vertical length and a horizontal length) of a character can be absorbed, and a precision of the matching can be enhanced.

The feature extraction is for extracting information characterising a character. A method has been known such that one character is represented by a bitmap of N×N elements, and a feature vector is used that indicates whether each element of a vector of N×N elements is 1 or 0. Additionally, a method has been known such that directional components of a character are extracted as a feature of the character to enhance a recognition precision. The N×N bitmap of one character is decomposed into four components of the right and left, the upward right direction, the up and down, and the upward left direction. Namely, in response to detecting that the black pixels continue in one of these directions to the extent that the number of the continued black pixels is greater than or equal to a threshold value, a determination is made that there is a component in the one of these directions. Similarly, a feature vector corresponding to each direction can be obtained in which the black pixel of the bitmap is represented by 1 and the white pixel of the bitmap is represented by 0.

The matching is for comparing all registered features of characters (standard patterns) with a character to be recognized using the feature of the character. Note that the standard patterns are created by averaging characters printed under various conditions, so that various types of fonts (Mincho, Gothic, textbook, etc.), "blurred" letters, and "collapsed" characters can be stably recognized. Note that, for the comparison, the feature of the character to be recognized and the each of the features of the standard patterns are represented by vectors, and a Euclidean distance between the vectors is calculated. The character of the standard pattern with the smallest Euclidean distance is adopted as the recognized character.

Next, the recognition processor 41 corrects a conversion error by applying knowledge processing (S60). Actually, there may be similar characters, so that a character may not be uniquely determined. In such a case, the recognition processor 41 refers to a dictionary, extracts characters before and after the character to be recognized so as to process these characters as a word, and selects a character from a plurality of candidates, so that the characters match a word registered with the dictionary.

<Detection of a Predetermined Term>

Figure 19:
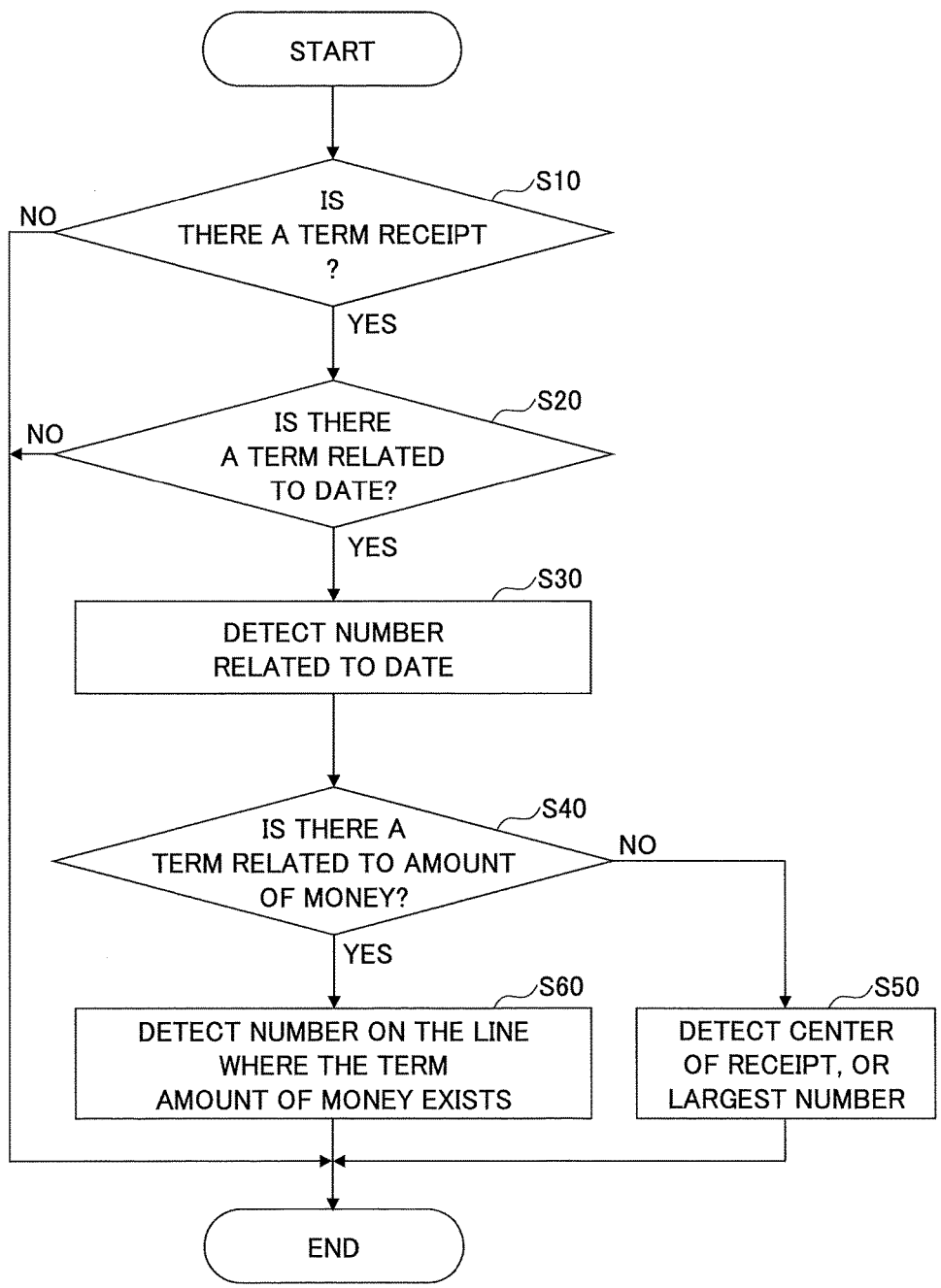
FIG. 19 is a flowchart illustrating an example of a procedure of a term detection unit to detect a term.

After the recognition processor 41 completes the character recognition process, the term detector 46 detects a predetermined term. FIG. 19 is a flowchart illustrating an example of a procedure for detecting a word by the term detector 46.

First, the term detector 46 determines whether a term "receipt" exist (S10). This is for suppressing that an amount of money is extracted from a document other than a receipt. The synonyms of "receipt," such as an accountable receipt and a voucher, may be detected.

When the result of the determination at step S10 is No, the subsequent process may not be executed in FIG. 19. However, considering a case in which the character "receipt" is not detected due to a low level of precision for the character recognition process, the process on and after step S20 may be executed, by way of caution.

In response to detecting that the result of the determination at step S10 is Yes, the term detector 46 determines whether a term related to a date exists (S20). The term related to a date includes, in addition to "date" itself, a term that is used in association with a date, such as "month/date/year," "date of use," and "utilization date."

In response to detecting that the result of the determination at step S20 is Yes, the term detector 46 detects a number related to the date (S30). For example, one or more numbers representing the month, date, and year in the line that is the same as the line including the "date," the "date of use," or the "utilization date" are detected. Alternatively, "mm," "dd," and "yyyy" in "mm/dd/yyyy" may be detected.

Subsequently, the term detector 46 determines whether a term "amount of money" exists (S40). Alternatively, the term detector 46 may detect a mark, such as "¥" or "$," "numbers+Yen," or "numbers+dollars."

In response to detecting that the result of the determination at step S40 is No, the term detector 46 detects a number, and the term detector 46 weights the detected number with the position and size of the number to determine an amount of money (S50). An example of weighting is described with reference to FIG. 20.

In response to detecting that the result of the determination at step S40 is Yes, the term detector 46 detects a number in a line that is the same as the line including the term "amount of money" as the amount of money (S60). Here, the position at which the amount of money is detected is not limited to a position in the line including the term "amount of money." For example, a number may be detected at a position such that the distance from the term "amount of money" is less than or equal to a threshold value. For example, a number at a position immediately below the term "amount of money" may be detected, or a number at a lower right position of the term "amount of money" may be detected.

As a result, even if positions of an amount of money and a date are not always fixed in a receipt, the term detector 46 can detect the amount of money and the date.

Figure 20:
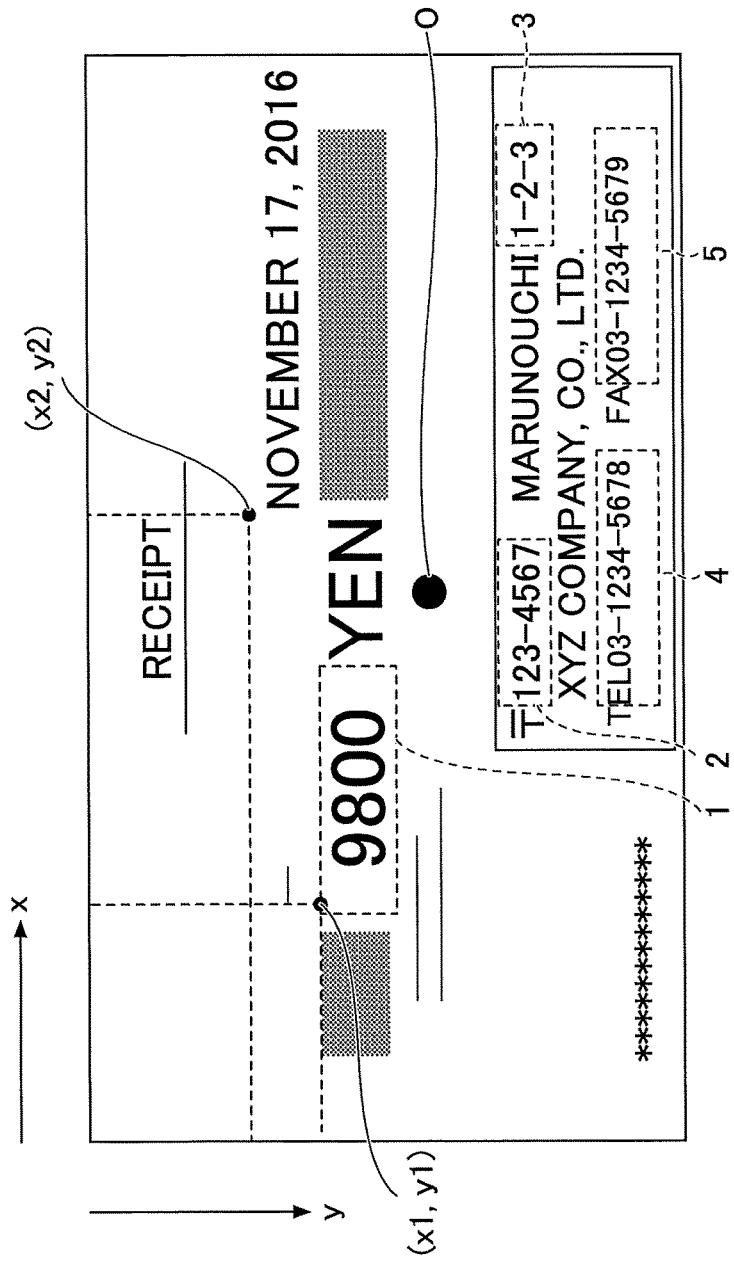
FIG. 20 is a diagram illustrating an example of detection of a date and an amount of money in a receipt.

FIG. 20 is a diagram illustrating an example of detection of a date and an amount of money in a receipt. First, a number related to the date is detected. The number related to the date may be excluded from a target for detecting the amount of money. As a result, in the receipt of FIG. 20, five numbers are detected. Usually, an amount of money is described in the vicinity of the center of the receipt, and the amount of money is represented by large characters. Using this knowledge, the term detector 46 obtains bounding rectangles 1 through 5 of the respective numbers, and the term detector 46 calculates distances between the center O and the upper left corners of the bounding rectangles 1 through 5. Then, the term detector 46 weights the numbers in the ascending order of the distances, such as 8 points, 5 points, 3 points, and 2 points for the rest of the numbers.

Further, the term detector 46 obtains the heights of the respective bounding rectangles 1 through 5, and the term detector 46 weights the bounding rectangles 1 through 5 in the descending order of the heights, such as 10 points, 8 points, 6 points, and 3 points for the rest of the numbers.

Then, the term detector 46 estimates that the number included in the bounding rectangle with the largest total points is the amount of money. By doing this, the amount of money can be detected with high precision.

By the detection of the date and the amount of money, the positions of the date and the amount of money can be identified. As illustrated in FIG. 20, the upper left corner of the image of the receipt is defined to be an origin, and the upper left corners of the bounding rectangles are represented by (x, y). The position of the amount of money (x1, y1) and the position of the date (x2, y2) are attached to each image as metadata. As a result, the multifunction peripheral 9 can display an image in such a manner that the date and the amount of money are displayed at the center of the image field 490 of the result display screen 481.

<Creation of the Thumbnail Image>

As described above, the image displayed by the multifunction peripheral 9 is processed to be a thumbnail image. In general, an image is processed to be a thumbnail image with a same size, regardless of the size of the original receipt. As a result, the sizes of the images of the receipts displayed on the operations panel 27 of the multifunction peripheral 9 are the same, and the user U can easily view the images of the receipts. However, when the size of the original receipt is large and the image is processed to be a thumbnail image with a predetermined size, the user U may not be able to easily view the amount of money. Accordingly, the image creator 45 of the registration server 30 creates a thumbnail image with an appropriate size depending on the size of the original receipt.

Figure 21:
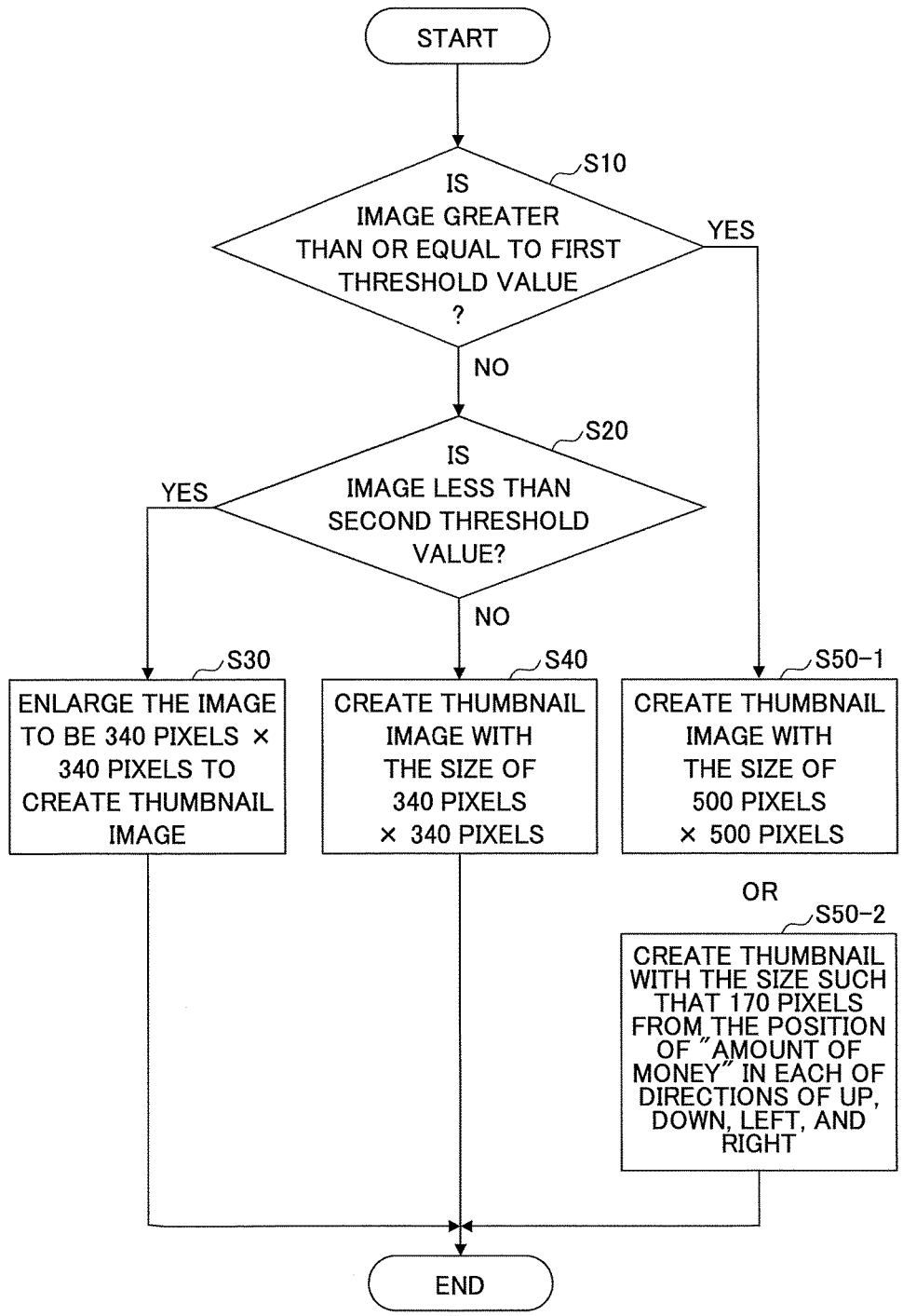
FIG. 21 is a flowchart illustrating an example of a procedure of an image creation unit to create a thumbnail image.

FIG. 21 is a flowchart illustrating an example of a procedure for creating a thumbnail image by the image creator 45. Note that, in FIG. 21, the example of the procedure is described while assuming that a size of a standard thumbnail image is 340 pixels×340 pixels.

The image creator 45 determines whether the size of the image is greater than or equal to a first threshold value (S10). The first threshold value is defined to be a threshold value such that, when the size of the image corresponding to the first threshold value is reduced to be the standard size, deterioration of the image quality is so severe that the visibility of the user U is affected. The first threshold value is determined depending on the resolution and the size of the operations panel 27. For example, the first threshold value may be determined to be 500 pixels. When the thumbnail image is a square image, the vertical size or the horizontal size of the image is compared with the first threshold value. When the thumbnail image is a rectangle, the vertical size and the horizontal size of the image are compared with the first vertical threshold value and the first horizontal threshold value, respectively.

In response to detecting that the result of the determination at step S10 is No, the image creator 45 determines whether the size of the image is less than a second threshold value (S20). The second threshold value is approximately the same as the standard size. The second threshold value is a threshold value for enlarging the image to the standard size.

In response to detecting that the result of the determination at step S20 is Yes, the image creator 45 enlarges the image to be 340 pixels×340 pixels so as to create a thumbnail image (S30). As a result, a small character can be enlarged to enhance visibility, and the image can be processed to be the standard size.

When the result of the determination at step S20 is No, the size of the image is greater than or equal to the second threshold value, and the size of the image is less than the first threshold value. Thus, the image creator 45 reduces the image to be 340 pixels×340 pixels so as to create a thumbnail image (S40). As a result, the image can be reduced within a range in which the image quality is not deteriorated, and the image can be processed to be the standard size.

When the result of the determination at step S10 is Yes, the original image is too large. Thus, the image creator 45 reduces the image to be 500 pixels×500 pixels so as to create a thumbnail image (S50-1). The multifunction peripheral 9 may be unable to display the whole image with the size of 500 pixels×500 pixels on the operations panel 27 at once. Accordingly, the image creator 45 may preferably attach, to the image, the position of the amount of money, which is obtained by detecting the term. As a result, the multifunction peripheral 9 can display the image in such a manner that the amount of money is displayed approximately at the center.

As an alternative process of step S50-1, in response to detecting that the result of the determination at step S10 is Yes, the image creator 45 may create a thumbnail image with a size such that 170 pixels in an upward direction from the position of the amount of money, 170 pixels in a downward direction from the position of the amount of money, 170 pixels in a left direction from the position of the amount of money, and 170 pixels in a right direction from the position of the amount of money (S50-2). As a result, the thumbnail image with the standard size can be created, and the amount of money can be displayed. As for the date, the image can be created similarly.

<The Case where an Agent Registers a Receipt with the Registration Server 30 on Behalf of a Principal>

Next, a case is described in which an agent registers a receipt with the registration server 30 on behalf of a principal. In the menu screen 441 illustrated in FIG. 10B, in response to detecting that a user U presses the display name field 445 of the menu screen 441, the multifunction peripheral controller 35 of the receipt application 60 starts obtaining information about the principal who designates the user U as the agent. In the following, this process is described.

FIG. 22 is a sequence diagram illustrating an example of a procedure of the information registration system 100 when the agent selects the principal. Here, it is assumed that the menu screen 441 is displayed on the operations panel 27.

Figure 23A:
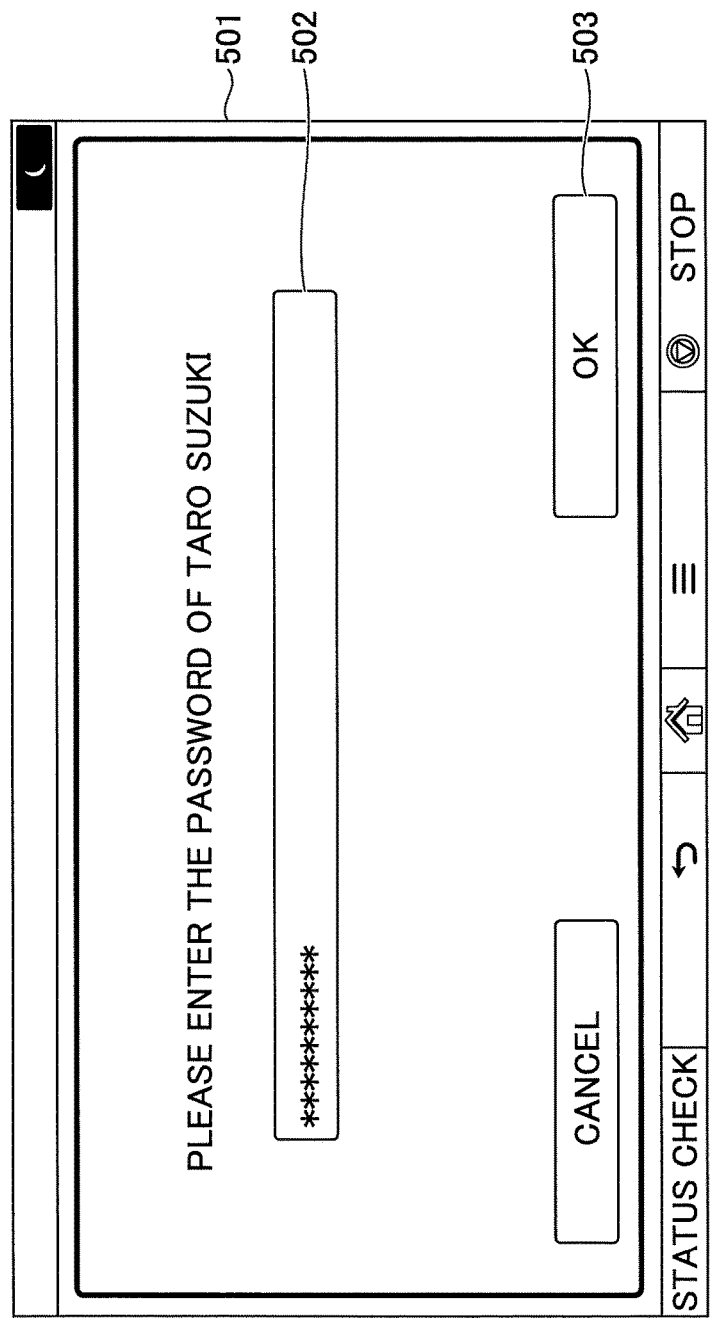
FIG. 23A is a diagram illustrating an example of a password input screen.

S1: The user U presses the display name field 445. By pressing the display name field 445, the user U can input information indicating that the user U represents the principal. The operation receiver 34 receives this operation, and the display controller 36 causes the operations panel 27 to display a password input screen 501. FIG. 23A illustrates an example of the password input screen 501. The user U enters the own password, and presses the OK button 503. In order to authenticate, by the administration server 40, that the agent is designated by the principal, the password of the user U (the agent) is required. The administrator has logged in to the administration server 40, and the user U has not logged in to the administration server 40. The operation receiver 34 receives the input of the password.

S2: The multifunction peripheral controller 35 of the receipt application 60 transmits a login update request to the registration server 30 together with a session ID1 and the password.

S3: The multifunction peripheral communication unit 43 of the registration server receives the session ID1 and the password, and the server controller 44 obtains the user ID and the token A that are associated with the session ID1. The administration server communication unit 47 transmits, to the administration server 40, the login update request including the password, the user ID, and the token A.

The registration server communication unit 52 of the administration server 40 receives the login update request, and the user authentication unit 51 authenticates the user U. Namely, the user authentication unit 51 determines whether the password and the user ID are registered with the customer information DB 5901. Upon detecting that the password and the user ID are registered with the customer information DB 5901, the user authentication unit 51 creates a token B, and the registration server communication unit 52 transmits the token B to the registration server 30. The token B is login completion information indicating that the user U who is the agent has logged in. The token B is created because the user U who is the agent is unable to obtain customer information of the principal with the administrator authority.

S4: When the administration server communication unit 47 of the registration server 30 receives the token B, the server controller 44 determines that login has been completed, and the multifunction peripheral communication unit 43 transmits, to the multifunction peripheral 9, information indicating that the login is successful.

S5: When the administration server communication unit 47 of the registration server 30 receives the token B, the server controller 44 requests an agent input list from the administration server 40 using the token B. As a result, the administration server 40 obtains the user ID of the principal who designates token B (the user who is the agent) as the agent from the agent DB 5903, and the administration server 40 transmits the obtained user ID to the registration server 30.

S6: In response to receiving the information indicating that the login is successful, the multifunction peripheral controller 35 of the receipt application 60 transmits a request for obtaining a principal list to the registration server 30 together with the session ID1.

S7: The multifunction peripheral communication unit 43 of the registration server 30 receives the request for obtaining the principal list, and the multifunction peripheral communication unit 43 identifies the token A by the session ID1. The administration server communication unit 47 of the registration server 30 transmits a request for a display name of the principal to the administration server 40 together with the token A and the user ID of the principal obtained at step S5. The display name can be obtained with the administrator authority of the token A.

The registration server communication unit 52 of the administration server 40 receives the request for the display name of the principal together with the token A and the user ID of the principal, and the administration server controller 53 reads out the display name of the principal specified by the user ID from the customer information DB 5901. As a result, a list of display names of principals and user IDs is transmitted to the registration server 30.

S8: The multifunction peripheral communication unit 43 of the registration server 30 transmits, to the multifunction peripheral 9, a list of display names of principals together with the user IDs of the principals. As a result, the display controller 36 of the receipt application 60 displays a principal list screen 511 on the operations panel 27. FIG. 23B illustrates an example of the principal list screen 511.

S9: The user U selects a principal to be represented by the user U himself/herself. The operation receiver 34 receives the selection.

S10: The multifunction peripheral controller 35 of the receipt application 60 transmits a login request to the registration server 30 together with the session ID1 and the user ID of the principal.

S11: Upon receiving the login request, the multifunction peripheral communication unit 43 of the registration server 30 recognizes that the user ID of the principal has already been registered with the administration server 40. Thus, the server controller 44 creates a session ID2. The session ID2 is for operating the multifunction peripheral 9 by the user U as the principal. The user ID of the principal is associated with the session ID2. Namely, the principal is also capable of using the administration server 40 with the administrator authority.

S12: The multifunction peripheral communication unit 43 of the registration server 30 transmits the session ID2 to the multifunction peripheral 9.

S13: The administration server communication unit 47 of the registration server 30 transmits, to the administration server 40, a request for a group policy for the principal, together with the user ID of the principal and the token A. In response to the request, a list of a type of expenses is returned.

S14: The multifunction peripheral controller 35 of the receipt application 60 transmits, to the server 30, a request for the list of the type of expenses for the principal, together with the session ID2. As the user ID of the principal is identified by the session ID2, the receipt application 60 can obtain the list of the type of expenses for the principal. After that, when the multifunction peripheral 9 communicates with the registration server 30, the multifunction peripheral 9 transmits the session ID2 to the registration server 30, and the registration server 30 transmits, to the administration server 40, the user ID of the principal, which is associated with the session ID2, and the token A. Accordingly, the user U who is the agent can register the electronic date of the receipt with the administration server 40 while associating the electronic data of the receipt with the user ID of the principal.

S15: After that, the user U presses one of the "send report and expenses" button 442, the "add expenses to report" button 443, and the "send expenses" button 444 on the menu screen 441 of FIG. 10B.

As described above, by specifying the principal by the agent, the agent can register, as the principal, the electronic data of the receipt with the administration server 40. The subsequent process is the same for both the principal and the agent.

<Examples of the Screens>

FIG. 23A illustrates an example of the password input screen 501. FIG. 23B illustrates an example of the principal list screen 511. In the password input screen 501, a password input field 502 and the OK button 503 are arranged. The user U as the agent inputs the user U's password into the password input field 502. Then, when the OK button 503 is pressed, the password is transmitted to the registration server 30.

In the principal list screen 511, user IDs of principals who designate the user U as the agent and the display names are displayed as a list. When the user U as the agent selects the principal, the OK button appears. When the OK button is pressed, the type of expenses of the principal is transmitted from the administration server 40.

<The Operation when the "Add Expenses to Report" Button is Pressed>

Next, a process and a screen example are described when the "add expenses to report" button 443 is pressed in the menu screen 441.

FIG. 24 is a sequence diagram illustrating an example of a procedure for the multifunction peripheral 9 to register the electronic data of the receipt with the administration server 40. Note that, the operation of this process is the same for the agent and the principle. Accordingly, the process is described while assuming that a usual user U operates the multifunction peripheral 9.

S1: Among the three buttons on the menu screen 441, the user U presses the "add expenses to report" button 443, and the operation receiver 34 receives the information indicating that the button is pressed.

S2: The multifunction peripheral controller 35 of the receipt application 60 transmits a request for a report list to the registration server 30 together with a session ID1. The multifunction peripheral communication unit 43 of the registration server 30 receives the request for the report list, together with the session ID1.

Figure 25:
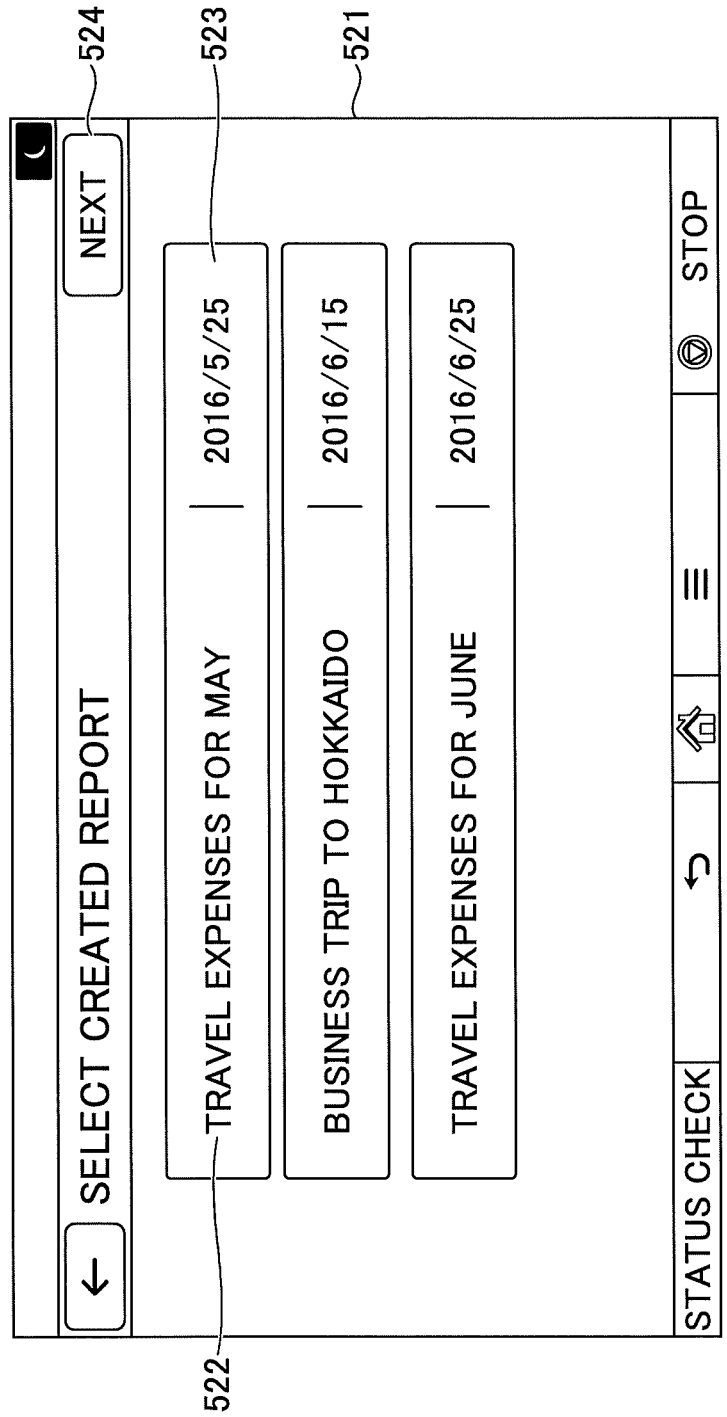
FIG. 25 is a diagram illustrating an example of a report list screen.

S3: The server controller 44 of the registration server 30 identifies the user ID associated with the session ID1, and the administration server communication unit 47 of the registration server 30 transmits the request for the report list to the administration server 40 together with the user ID and the token A. The administration server controller 53 of the administration server 40 retrieves a report ID associated with the user ID from the electronic data DB 5902. As a result, the report ID, the report name, and the data are transmitted from the administration server 40 to the multifunction peripheral 9 through the registration server 30. Then, a report list screen 521 is displayed on the operations panel 27 of the multifunction peripheral 9. FIG. 25 illustrates an example of the report list screen 521.

S4: The multifunction peripheral controller 35 of the receipt application 60 obtains, from the registration server 30, a list of a type of expenses, which is for subsequent screen display.

S5 through S13: The user U selects a report name of a destination to which electronic data of a receipt to be scanned is to be added. The operation receiver 34 receives the selection, and the operation receiver 34 identifies the report ID. After that, the electronic data is read similar to S15 through S27 of FIG. 11.

S14 through S19: The process is the same as the process S28 through S34 of FIG. 12. However, at step S15 and S16, the report ID is transmitted to the administration server 40. As a result, the information registration unit 54 of the administration server 40 can register the electronic data of the receipt while associating the electronic data of the receipt with the report ID of the electronic data DB 5902.

<Example of the Screen>

FIG. 25 is a diagram illustrating an example of the report list screen 521. In the report list screen 521, a list of report names 522 of the reports registered by the user U is displayed. A date 523 is attached to the report name 522. The date 523 indicates the date on which the report is created by the user U on the new report creation screen 451. When the user U selects the report name 522, the operation receiver 34 receives the selection, and the display controller 36 changes a color or brightness of the report. The user U confirms the selection result, and the user U presses a NEXT button 524. As a result, the report ID of the report selected by the user U is transmitted to the administration server 40.

<The Operation when the "Send Expenses" Button is Pressed>

Next, a process and a screen example are described when the "send expenses" button 444 is pressed in the menu screen 441.

Figure 26:
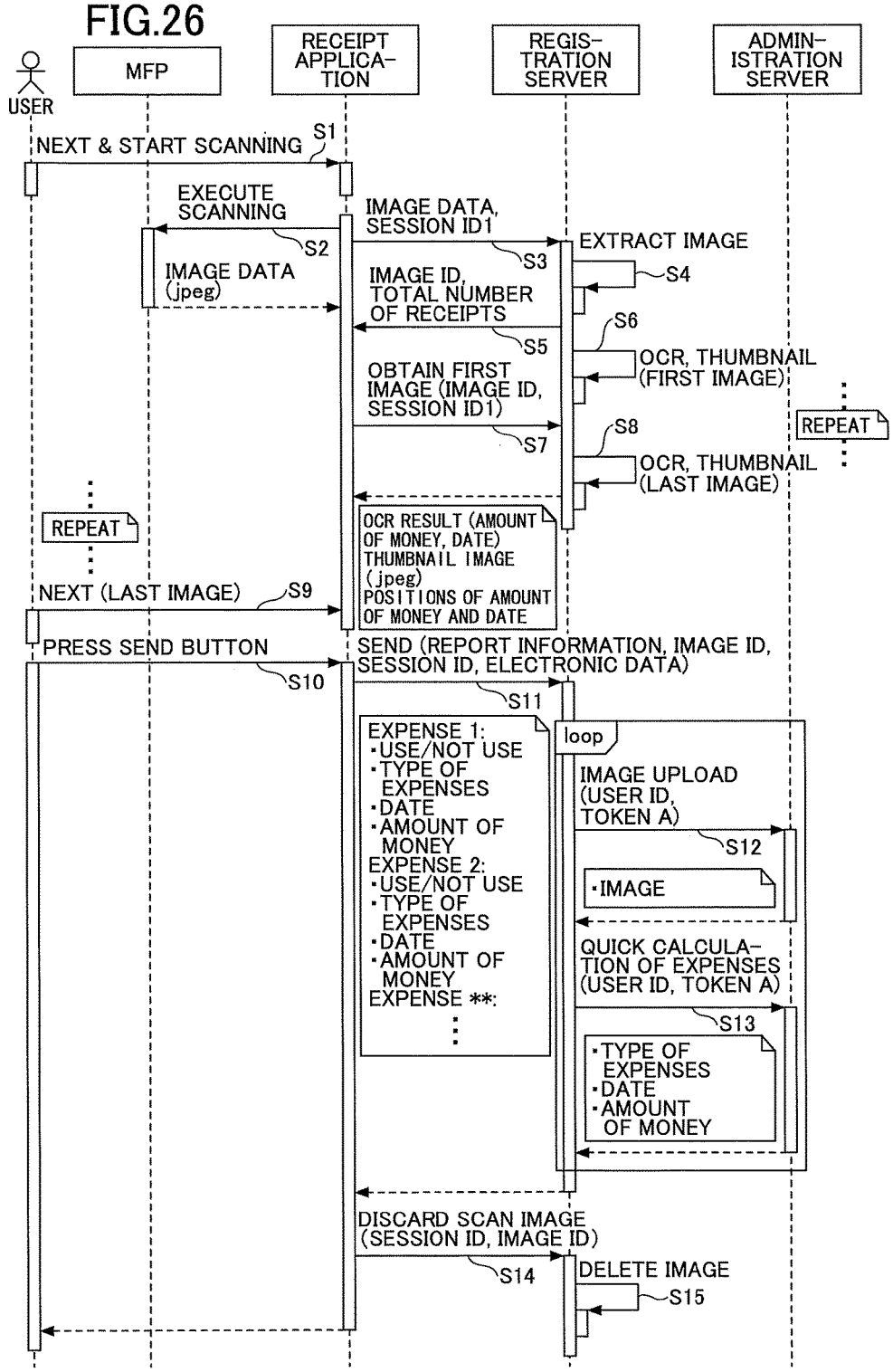
FIG. 26 is a sequence diagram illustrating an example of a procedure of the multifunction peripheral to register electronic data of a receipt to the administration server.

FIG. 26 is a sequence diagram illustrating an example of a procedure for the multifunction peripheral 9 to register the electronic data of the receipt to the administration server 40. Note that, the operation of this process is the same for the agent and the principle. Accordingly, the process is described while assuming that a usual user U operates the multifunction peripheral 9.

S1: Among the three buttons on the menu screen 441, the user U presses the "send expenses" button 444, and the operation receiver 34 receives the information indicating that the button is pressed.

S2 through S9: As no report is required, the multifunction peripheral controller 35 of the receipt application 60 starts reading a receipt. The process of steps S2 through S9 may be the same as the process of S15 through S27 in FIG. 11.

S10 through S15: The process may be the same as the process of S28 through S34 of FIG. 12. However, at steps S11 and S12, the registration server 30 transmits electronic data (the image, the type of expenses, the date, and the amount of money) without specifying a report ID. The reason is that no report is selected. The information registration unit 54 of the administration server 40 registers electronic data of the receipt with the electronic data DB 5902 while associating the electronic data of the receipt with the user ID. Namely, the report ID can be left blank.

<Submission of a Receipt>

As described above, a receipt associated with a report or a receipt not associated with a report is registered with the administration server 40. The user U can submit a receipt to a company using the user terminal 50.

Figure 27:
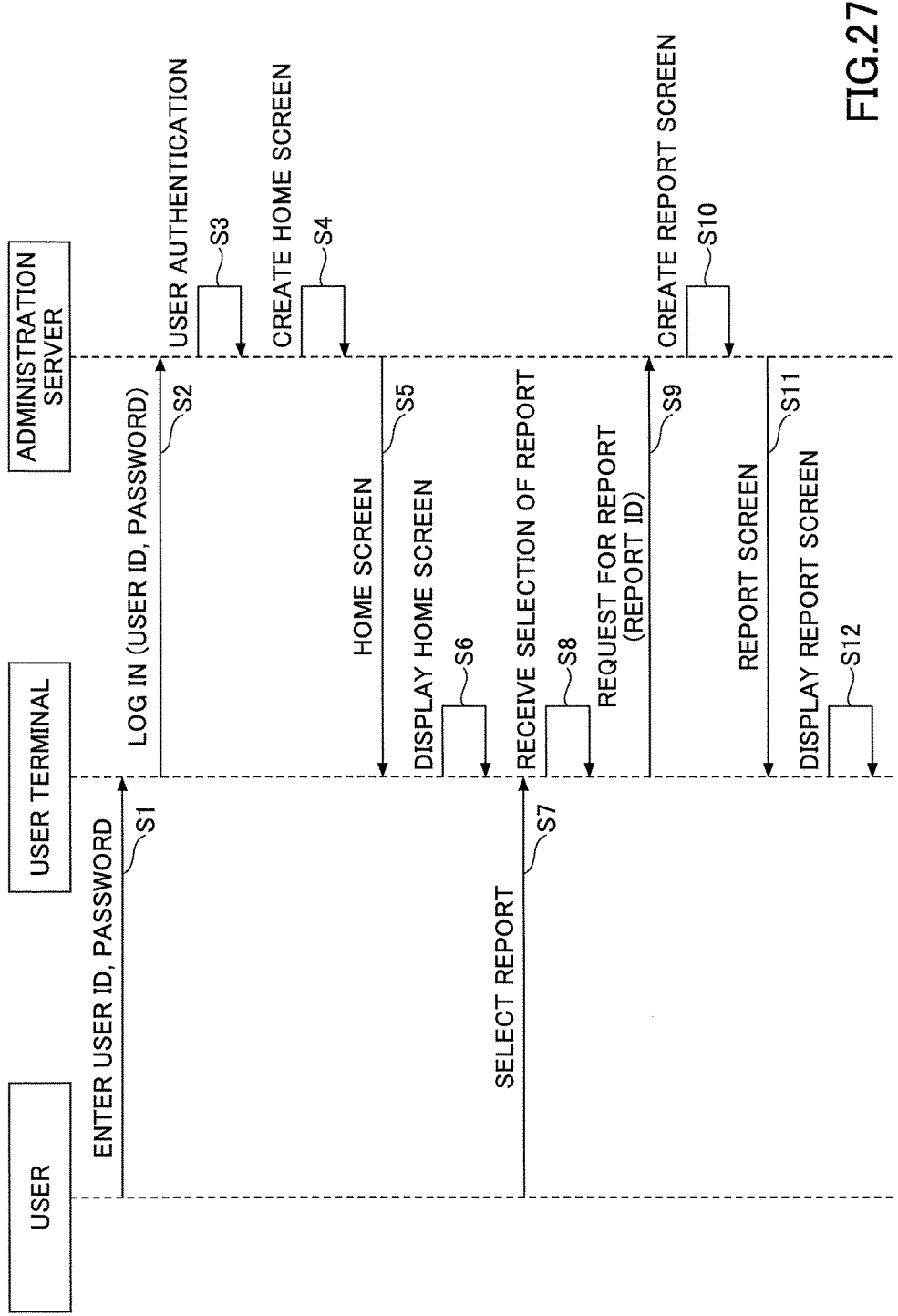
FIG. 27 is a flowchart illustrating an example of a procedure of the user terminal to communicate with the administration server to display a report.

FIG. 27 is a flowchart illustrating an example of a procedure for the user terminal 50 to communicate with the administration server 40 to display a report.

S1: The user U operates the user terminal 50 to access the administration server 40 and to display a login screen. Then, the user U operates the user terminal 50 to input the user ID and the password for the administration server 40.

S2: The operation receiver 62 of the user terminal 50 receives the user ID and the password, and the server communication unit 61 transmits a login request to the administration server 40 together with the user ID and the password.

S3: Upon receiving the login request, the server unit 55 of the administration server 40 authenticates the user U using the user ID and the password. In response to detecting that the user ID and the password received from the user terminal 50 is registered with the customer information DB 5901, the user authentication unit 51 determines that the authentication is established. When the user ID or the password received from the user terminal 50 is not registered with the customer information DB 5901, the user authentication unit 51 determines that the authentication is not established. In FIG. 27, the process is described while assuming that the authentication is established.

Next, the server unit 55 creates a Web home screen 531. First, the server unit 55 retrieves report information associated with the user ID from the electronic data DB 5902, and the server unit 55 arranges the retrieved report information in a predetermined configuration to create the Web home screen 531.

S4: The server unit 55 of the administration server 40 creates the Web home screen 531.

S5: The server unit 55 of the administration server 40 transmits the Web home screen 531 to the user terminal 50.

Figure 28A:
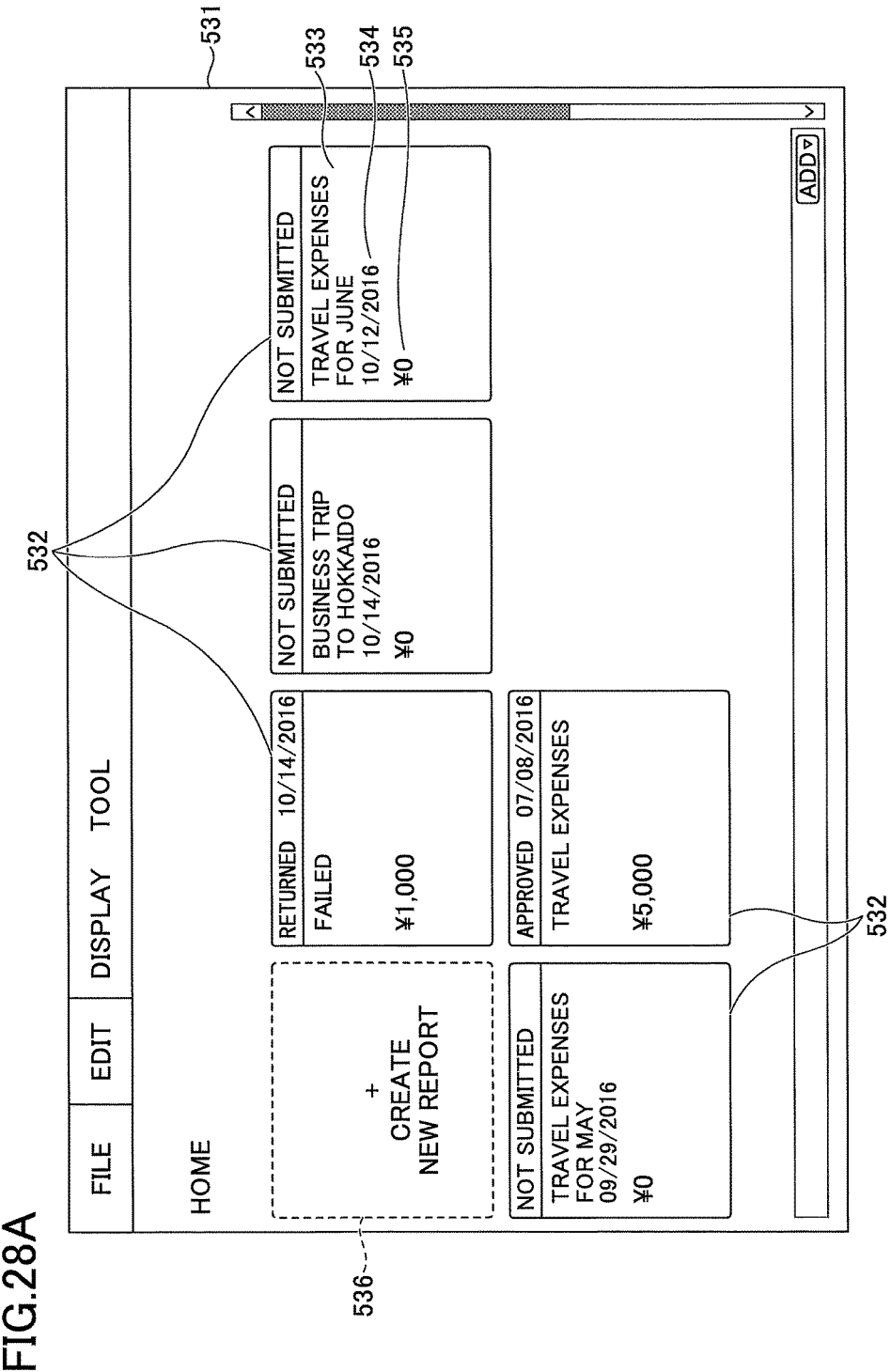
FIG. 28A is a diagram illustrating an example of a Web home screen.

S6: The server communication unit 61 of the user terminal 50 receives the Web home screen 531, and the display controller 63 displays the Web home screen 531. FIG. 28A illustrates an example of the Web home screen 531. A report list of the user U is displayed on the Web home screen 531.

S7: The user U confirms the details and selects a report to be submitted to the company.

S8: The operation receiver 62 of the user terminal 50 receives the selected report, and the operation receiver 62 identifies the report ID.

S9: The server communication unit 61 of the user terminal 50 transmits a request for the report to the administration server 40 together with the report ID.

S10: The server unit 55 of the administration server 40 receives the request for the report, and the server unit 55 creates a report screen. Namely, the server unit 55 retrieves the electronic data of the receipt associated with the report ID from the electronic data DB 5902, and the server unit 55 creates the report screen by arranging the electronic data of the receipt in a predetermined configuration.

S11: The server unit 55 of the administration server 40 transmits the report screen to the user terminal 50.

S12: The server communication unit 61 of the user terminal 50 receives the report screen and the display controller 63 displays the report screen. FIG. 28B illustrates an example of the report screen 541.

<Examples of the Screens>

FIG. 28A is a diagram illustrating an example of the Web home screen 531. Reports created by the user U is displayed on the Web home screen 531. The displayed reports are classified by colors depending on their statuses. Each report is represented by an icon 532. The icon 532 includes a report name 533; a report creation date 534; and a total amount of money 535.

Further, a report creation icon 536 is displayed on the Web home screen 531. When the user U presses the report creation icon 536, the user terminal 50 requests the report creation screen from the administration server 40, and the report creation screen, such as that of illustrated in FIG. 13A, is displayed. As a result, the user U can create a new report on the Web home screen 531.

FIG. 28B illustrates an example of the report screen 541. On the report screen 541, a report name 542; a date 543; a type of expenses 544; an amount of money 545; a total amount of money 546; and a submission button 547 are displayed. Additionally, images of respective receipts may be displayed. The user U confirms the details of the report and the amount of money, and the user U presses the submission button 547. The operation receiver 62 receives the information indicating that the submission button 547 is pressed, and the operation receiver 62 transmits the report (the electronic data of the receipts) to a universal resource locator (URL) linked to (associated with) the submission button 547.

As the user U can correct the amount of money on the multifunction peripheral 9, the user U can submit the report without editing the amount of money, etc., on the user terminal 50. Note that the user U can edit the amount of money, etc., on the user terminal 50.

<Registration of a Receipt not Associated with a Report>

When a receipt exists that is not associated with any report, the user U can associate the receipt with a report on the Web home screen 531.

Figure 29:
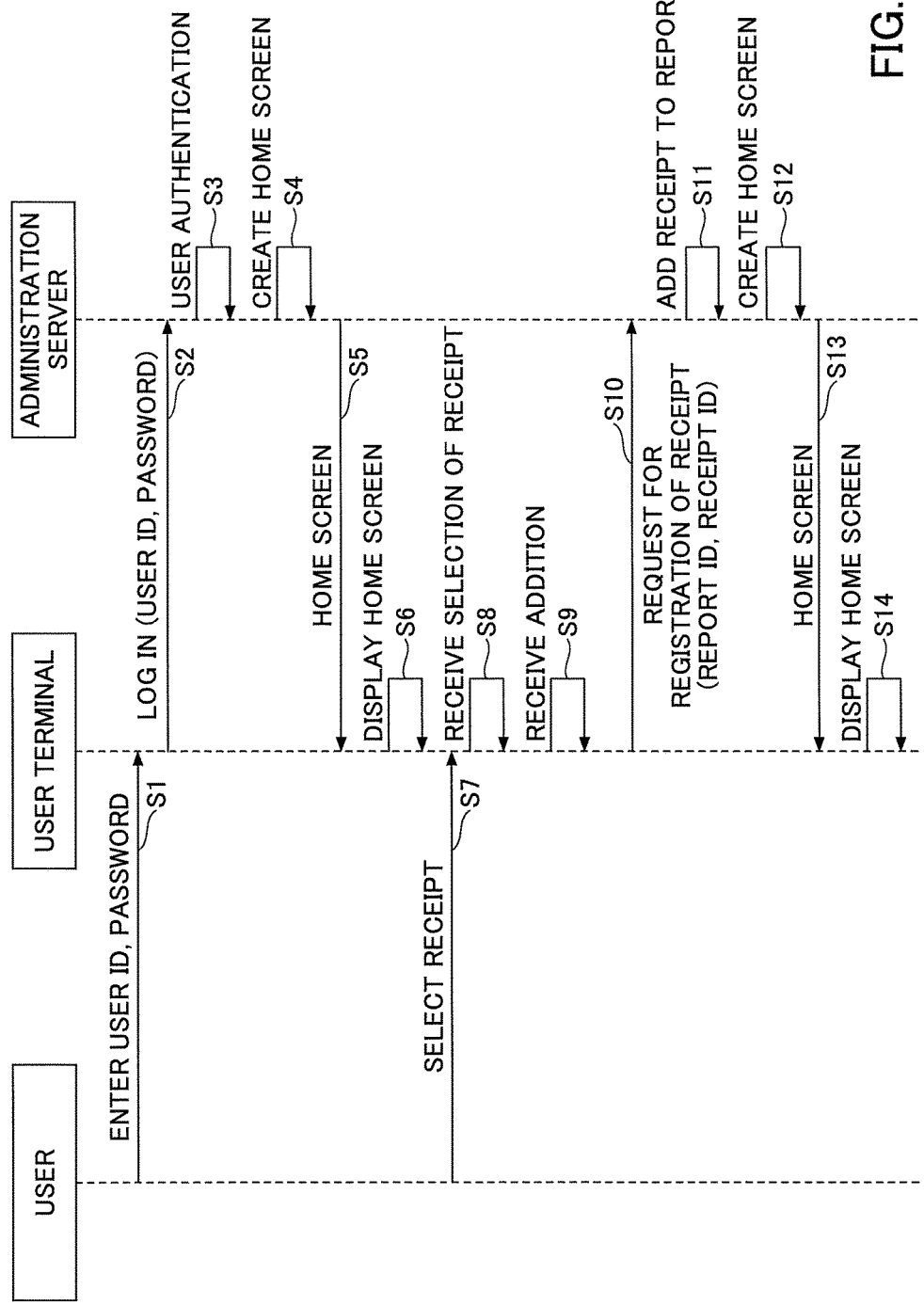
FIG. 29 is a flowchart illustrating an example of a procedure of the user terminal to communicate with the administration server to associate a receipt with a repot.

FIG. 29 is a flowchart illustrating an example of a procedure for the user terminal 50 to communicate with the administration server 40 so as to associate a receipt with a report. The process of steps S1 through S3 are the same as the process of FIG. 27.

S4: When the authentication of the user U is completed, the server unit 55 of the administration server 40 creates the Web home screen 531. Namely, the server unit 55 retrieves the report information associated with the user ID from the electronic data DB 5902, and the server unit 55 creates the Web home screen 531 by arranging the retrieved report information in a predetermined configuration. Furthermore, the server unit 55 retrieves electronic data to which no report ID is attached (blank) from the electronic data DB 5902, and the server unit 55 creates the Web home screen 531 by arranging the retrieved electronic data in a predetermined configuration.

S5: The server unit 55 of the administration server 40 transmits the Web home screen 531 to the user terminal 50.

Figure 30:
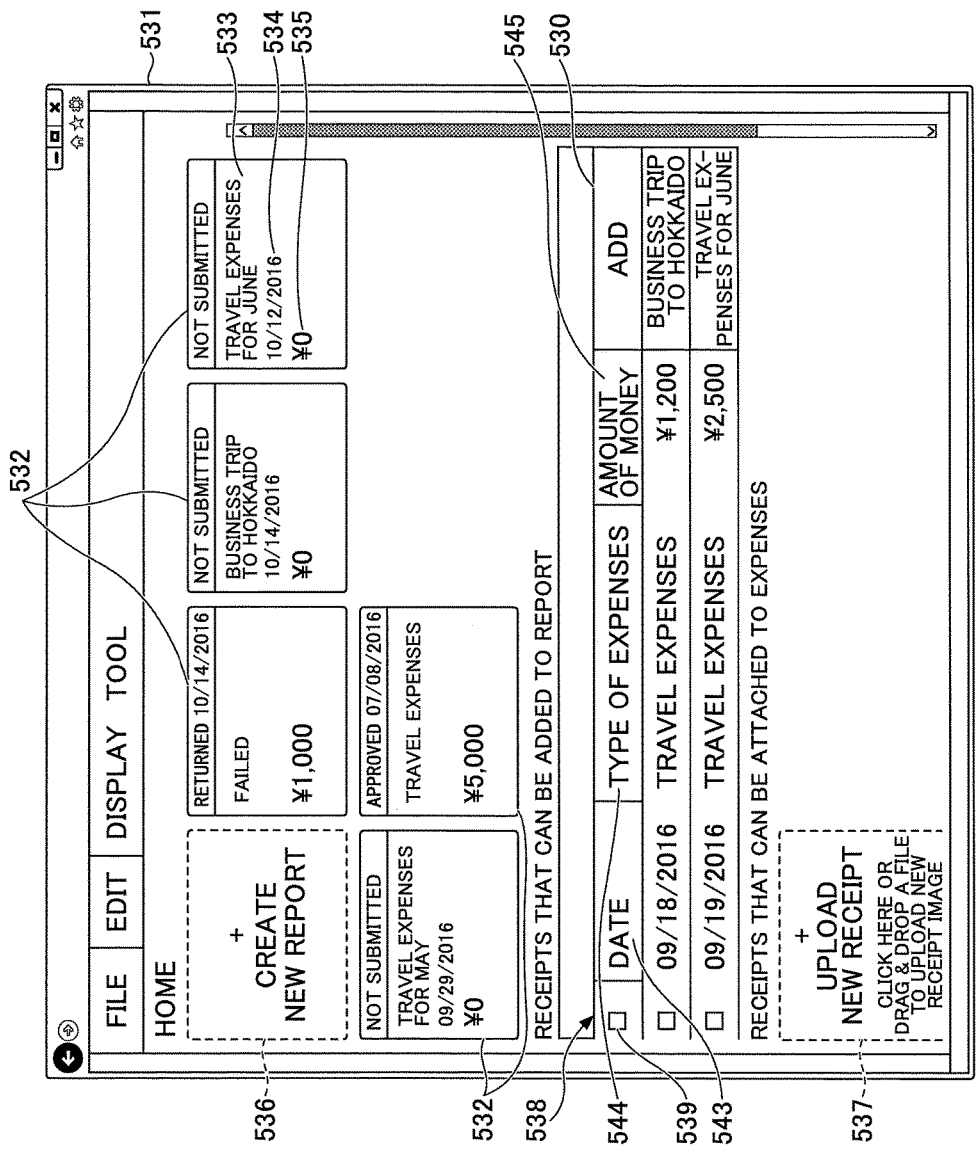
FIG. 30 is a diagram illustrating an example of the Web home screen.

S6: The server communication unit 61 of the user terminal 50 receives the Web home screen 531, and the display controller 63 displays the Web home screen 531. FIG. 30 illustrates an example of the Web home screen 531. In the Web home screen 531, in addition to the content of FIG. 28A, a list of electronic data of receipts to which no report ID is attached is displayed.

S7: When it is desirable to associate a receipt with a report, the user U selects one or more receipts to be associated with the report. Additionally, the user U selects the report to be associated with the one or more receipts.

S8: The operation receiver 62 of the user terminal 50 receives the selected one or more receipts and the report, and the operation receiver 62 identifies the one or more receipt IDs and the report ID.

S9: The user U performs an operation to add the one or more receipts to the report, and the operation receiver 62 of the user terminal 50 receives this operation.

S10: The server communication unit 61 of the user terminal 50 transmits a receipt registration request to the administration server 40 together with the report ID and the one or more receipt IDs.

S11: The server unit 55 of the administration server 40 receives the receipt registration request, and the server unit 55 associates the electronic data of the one or more receipts with the report. Namely, the server unit 55 registers the electronic data of the one or more receipts with the electronic data DB 5902 while associating the electronic data with the report ID.

S12: The server unit 55 of the administration server 40 updates the Web home screen 531. As the number of the electronic data items to which no report ID is attached is decreased, a Web home screen 531 is created that reflects the decrease in the number of the electronic data items.

S13: The server communication unit 61 of the user terminal 50 receives the Web home screen 531.

S14: The display controller 63 displays the Web home screen 531. As described above, the user U can register only the receipts with the administration server 40 from the multifunction peripheral 9, and, after that, the user U can associate the receipts with a report. Accordingly, the time to occupy the multifunctional peripheral 9 can be reduced.

<Example of the Screen>

FIG. 30 is a diagram illustrating an example of the Web home screen 531. In the description of FIG. 30, mainly the difference from FIG. 28A is described. In the Web home screen 531 of FIG. 30, in addition to the icons 532 of the reports, a receipt list 538 is displayed. In the receipt list 538, a check button 539, a date 543, and an amount of money 545 are displayed. Additionally, text that can be obtained by applying the character recognition process to the receipt may be displayed. The user U presses the check button 539 (causes the check button 539 to be in a checked state) corresponds to the receipt to be associated with a report.

Subsequently, the user U presses an addition button 530 so that the report names are pull-down displayed, as depicted. The report names that are pull-down displayed are names of the reports associated with the user ID of the user U. In other words, a list of the report names of the reports for which the icons 532 are displayed is pull-down displayed.

When the user U selects one report name of the pull-down displayed report names, the selected report name is highlighted. Then, when the user U presses a transmission button, the operation receiver 62 identifies the report ID and the checked receipt ID. The report ID and the checked receipt ID are transmitted to the administration server 40.

Additionally, the Web home screen 531 of FIG. 30 includes an upload reception unit 537 for receiving an image of a receipt. When the user U drags and drops an image of a receipt, the image of the receipt is transmitted to the administration server 40 together with the user ID, and the transmitted image of the receipt is registered with the administration server 40 in a state in which the image of the receipt is not associated with any report.

<Conclusion>

As described above, the information registration system 100 according to the embodiment is capable of converting a plurality of receipts 7 into image data items at once. As the electronic data items of the receipts 7 on which the character recognition process has been completed are sequentially transmitted to the multifunction peripheral 9, the shortest waiting time of the user U can be reduced to the time required for the character recognition process of one receipt 7. The user U can confirm the result of the character recognition of the receipts 7 in the order in which the receipts 7 are sequentially displayed. As the images of the receipts 7 are transmitted one by one while confirming the result of the character recognition, the confirmation and the character recognition process can be performed in parallel. Consequently, during conversion of the receipts 7 into the electronic data items, the waiting time of the user U can be reduced.

Additionally, as the state in which the administrator logs in to the administration server 40 continues, a user can use the multifunction peripheral 9 and the administration server 40 by a single authentication operation. When an operator operating the administration server 40 is different from an operator operating the multifunction peripheral 9, management of the user password can be facilitated. When a user is to represent a principal, once the user is authenticated by the administration server 40, the user can use the administration server 40 with the administrator authority, without requiring authentication of the principal.

<Other Application Examples>

The preferred embodiments are described above. However, the present invention is not limited to the above-described embodiments, and various modification and substitutions can be made without departing from the gist of the present invention.

For example, in the embodiments, the registration of the receipt is described. However, the embodiments are not limited to the registration of the receipt, and the embodiments can be suitably applied to registration of various types of slips. For example, the embodiments can be applied to order slips, order forms, and invoices.

Further, in FIG. 6, in order to facilitate understanding of the processes executed by the multifunction peripheral 9, the registration server 30, the administration server 40, and the user terminal 50, the components are divided based on the main functions. However, the present invention is not limited by the division of the processing units and the names. The processes executed by the multifunction peripheral 9, the registration server 30, the administration server 40, and the user terminal 50 may be divided into more processing units depending on details of processing. Furthermore, a single processing unit may be divided to include more processes.

Further, at least one of the registration server 30 and the administration server 40 may be implemented by a plurality of servers. The registration server 30 and the administration server 40 may be implemented by a single server. Furthermore, there may be a plurality of registration servers 30 and a plurality of administration servers 40.

The present application is based on and claims the benefit of priority of Japanese priority application No. 2017-007445 filed Jan. 19, 2017, the entire contents of which are hereby incorporated herein by reference.

What is claimed is:

1. An information analysis system comprising:
a reading device configured to read data;
an analyzer configured to analyze the data read by the reading device; and
a display device configured to display an analysis result by the analyzer,
wherein the reading device includes
a scanner;
a transmitter;
a first processor; and
a first memory that includes instructions, which when executed, cause the first processor to execute the following steps:
causing the scanner to scan one or more receipts placed in a reading area; and
causing the transmitter to transmit image data to the analyzer, the image data including data of the one or more receipts scanned by the scanner,
wherein the analyzer includes
a first transceiver;
a second processor; and
a second memory that includes instructions, which when executed, cause the second processor to execute the following steps:
causing the first transceiver to receive the image data;
extracting one or more images of the one or more receipts from the image data, and counting a number of the one or more images;
executing a character recognition process on each of the one or more images extracted by the step of extracting to obtain text data;
causing the first transceiver to transmit, to the display device, a number of all of the one or more images, and to sequentially transmit, to the display device, each image of the one or more images for which the character recognition process has been completed, together with at least a part of the text data of the image;
wherein the display device includes
a display;
a receiver;
a third processor; and
a third memory that includes instructions, which when executed, cause the third processor to execute the following steps:
causing the display to sequentially display each image of the one or more images received from the analyzer, together with the at least the part of the text data of the image;
causing the receiver to receive an edit on the at least the part of the text data displayed; and
upon detecting that the number of all of the one or more images transmitted from the analyzer matches a number of the sequentially transmitted one or more images of the one or more receipts, configuring the display to be in a state in which the display is capable of receiving a command for indicating the display device to report to the analyzer that the reception of all of the one or more images is completed.

2. The information analysis system according to claim 1, wherein the steps executed by the third processor further include:
counting a number of the images sequentially transmitted from the analyzer, and displaying the counted number and the number of all of the images transmitted from the first transceiver.

3. The information analysis system according to claim 2, wherein the steps executed by the third processor further include:
updating the counted number each time the image and the at least the part of the text data are received from the analyzer, and causing the display to display the updated counted number and the number of all of the one or more images transmitted from the first transceiver.

4. The information analysis system according to claim 3, wherein the steps executed by the second processor further include:
detecting a character related to a date and a character related to an amount of money from the obtained text data, and
wherein the steps executed by the third processor further include:
causing the display to display the image, together with the date and the amount of money.

5. The information analysis system according to claim 4, wherein the steps executed by the second processor further include:
attaching a position of the character related to the date and a position of the character related to the amount of money to the image, and
wherein the steps executed by the third processor further include:
upon detecting that the receiver receives the edit on the date or the amount of money, controlling a display position of the date or the amount of money in the display using the position of the date or the position of the amount of money attached to the image.

6. The information analysis system according to claim 1, wherein the steps executed by the third processor further include:
upon detecting that the number of all of the one or more images transmitted from the analyzer matches a number of the sequentially transmitted one or more images of the one or more receipts, causing the display to display a button for transmitting the at least the part of the text data to an external device in a state in which the button is capable of being pressed.

7. The information analysis system according to claim 6, wherein the steps executed by the second processor further include:
upon detecting that a size of the image is greater than a first threshold value, reducing the size of the image to be the first threshold value, and
upon detecting that the size of the image is less than a second threshold value, the second threshold value being less than the first threshold value, magnifying the size of the image to be the second threshold value.

8. The information analysis system according to claim 1, wherein the steps executed by the first processor further include:
authenticating a user; and
upon detecting that the authentication is established, causing the transmitter to transmit identification information of the user to the analyzer,
wherein the analyzer further includes a second transceiver, and the steps executed by the second processor further include:
causing the second transceiver to transmit, to an external device, login completion information that is retained after an administrator logs in to the external device and identification information of the user; and
causing the second transceiver to transmit, to the external device, the one or more images of the one or more receipts and the at least the parts of the text data of the one or more images, together with the login completion information and the identification information of the user.

9. The information analysis system according to claim 8, wherein the steps executed by the second processor further include:
causing the second transceiver to transmit, to the external device, the identification information of the user to query whether the identification information of the user is registered; and
wherein, upon detecting that the identification information of the user is registered, causing the external device to register, with administrator authority, the one or more images of the one or more receipts and the at least the parts of the text data of the one or more images, while associating the one or more images of the one or more receipts and the at least the parts of the text data of the one or more images with the identification information of the user.

10. The information analysis system according to claim 8, wherein the steps executed by the first processor further include:
upon detecting that the reading device receives information indicating that the user represents a principal and authentication information of the user for the external device, causing the transmitter to transmit the authentication information of the user to the analyzer;
wherein the steps executed by the second processor further include:
causing the first transceiver to receive the authentication information of the user, and causing the second transceiver to transmit the authentication information of the user to the external device to obtain identification information of the principal who designates the user associated with the authentication information of the user as an agent;

upon detecting that the first transceiver receives, from the reading device, information indicating that the one or more images of the one or more receipts and the at least the parts of the text data of the one or more images are to be registered with the external device, causing the external device to register the one or more images of the one or more receipts and the at least the parts of the text data of the one or more images, while associating the one or more images of the one or more receipts and the at least the parts of the text data of the one or more images with the identification information of the principal.

11. An information analysis method executed by a reading device, an analyzer, and a display device, wherein the analyzer analyzes data read by the reading device to display an analysis result on a display device, the method comprising:

scanning, by the reading device, one or more receipts placed in a reading area;

transmitting, by the reading device, image data to the analyzer, the image data including data of the one or more receipts read by the reading device;

receiving, by the analyzer, the image data;

extracting, by the analyzer, one or more images of the one or more receipts from the image data, and counting, by the analyzer, a number of the one or more images;

executing, by the analyzer, a character recognition process on each of the one or more images extracted by the extracting to obtain text data;

transmitting, to the display device by the analyzer, a number of all of the one or more images, and sequentially transmitting, to the display device by the analyzer, each image of the one or more images for which the character recognition process has been completed, together with at least a part of the text data of the image of the one or more images;

sequentially displaying, by the display device, each image of the one or more images received from the analyzer, together with the at least the part of the text data of the image of the one or more images;

receiving, by the display device, an edit on the at least the part of the text data displayed; and upon detecting, by the display device, that the number of all of the one or more images transmitted from the analyzer matches a number of the sequentially transmitted one or more images of the one or more receipts, configuring, by the display device, a display of the display device to be in a state in which the display is capable of receiving a command for indicating the display device to report to the analyzer that the reception of all of the one or more images is completed.

* * * * *